(12) United States Patent
Hu et al.

(10) Patent No.: US 10,996,496 B2
(45) Date of Patent: May 4, 2021

(54) COMPOSITE FILM, DEVICE INCLUDING, AND METHOD OF FORMING THE SAME

(71) Applicant: NANYANG TECHNOLOGICAL UNIVERSITY, Singapore (SG)

(72) Inventors: Xiao Hu, Singapore (SG); Heng Yeong Lee, Singapore (SG)

(73) Assignee: Nanyang Technological University, Singapore (SG)

( * ) Notice: Subject to any disclaimer, the term of this patent is extended or adjusted under 35 U.S.C. 154(b) by 142 days.

(21) Appl. No.: 16/323,984

(22) PCT Filed: Aug. 18, 2017

(86) PCT No.: PCT/SG2017/050410
§ 371 (c)(1),
(2) Date: Feb. 7, 2019

(87) PCT Pub. No.: WO2018/034621
PCT Pub. Date: Feb. 22, 2018

(65) Prior Publication Data
US 2019/0179176 A1 Jun. 13, 2019

(30) Foreign Application Priority Data
Aug. 19, 2016 (SG) .......................... 10201606933U

(51) Int. Cl.
*G02F 1/01* (2006.01)
*E06B 9/24* (2006.01)
(Continued)

(52) U.S. Cl.
CPC .............. *G02F 1/0147* (2013.01); *B32B 5/16* (2013.01); *B32B 5/30* (2013.01); *B32B 5/32* (2013.01);
(Continued)

(58) Field of Classification Search
CPC .... B32B 5/16; B32B 5/30; B32B 5/32; B32B 15/16; B32B 15/043; B32B 17/00;
(Continued)

(56) References Cited

U.S. PATENT DOCUMENTS

2008/0241262 A1* 10/2008 Lee ....................... B22F 1/0018
424/490
2010/0246009 A1* 9/2010 Polley .................... C23C 16/30
359/578

(Continued)

FOREIGN PATENT DOCUMENTS

CN   105153864 A   12/2015
CN   105713238 A    6/2016
(Continued)

OTHER PUBLICATIONS

Abdelsayed et al., "Photothermal Deoxygenation of Graphite Oxide with Laser Excitation in Solution and Graphene-Aided Increase in Water Temperature," *J. Phys. Chem. Lett.* 1:2804-2809, 2010.
(Continued)

*Primary Examiner* — Mahidere S Sahle
(74) *Attorney, Agent, or Firm* — Seed IP Law Group LLP

(57) ABSTRACT

In present invention, various embodiments provide a photothermotropic composite film. The composite film comprises a matrix and one or more nanostructures comprising a metal oxide semiconductor which is configured to convert radiant energy to thermal energy. The matrix has a property which is changeable based on the thermal energy received by the matrix from the metal oxide semiconductor. In a preferred embodiment, hybridization of the poly(N-isopropylacrylamide) (PNIPAM) hydrogel and antimony-tin oxide (ATO) is provided as the composite film. In this film, the ATO absorbs at near-infrared (NIR) region and acts as nanoheater to induce the optical switching of the hydrogel. The behaviour of this composite film can be used as a new
(Continued)

generation of autonomous passive smart windows for climate-adaptable solar modulation.

14 Claims, 58 Drawing Sheets

(51) Int. Cl.
| | |
|---|---|
| B32B 25/04 | (2006.01) |
| B32B 25/14 | (2006.01) |
| B32B 5/16 | (2006.01) |
| B32B 17/00 | (2006.01) |
| B32B 27/30 | (2006.01) |
| B32B 27/28 | (2006.01) |
| B32B 15/16 | (2006.01) |
| B32B 27/36 | (2006.01) |
| B32B 5/30 | (2006.01) |
| B32B 27/06 | (2006.01) |
| B32B 15/04 | (2006.01) |
| B32B 5/32 | (2006.01) |
| B32B 27/34 | (2006.01) |
| B32B 27/38 | (2006.01) |
| B32B 27/08 | (2006.01) |
| B32B 27/14 | (2006.01) |
| B82Y 30/00 | (2011.01) |

(52) U.S. Cl.
CPC ............ *B32B 15/043* (2013.01); *B32B 15/16* (2013.01); *B32B 17/00* (2013.01); *B32B 25/042* (2013.01); *B32B 25/047* (2013.01); *B32B 25/14* (2013.01); *B32B 27/06* (2013.01); *B32B 27/08* (2013.01); *B32B 27/14* (2013.01); *B32B 27/28* (2013.01); *B32B 27/283* (2013.01); *B32B 27/302* (2013.01); *B32B 27/306* (2013.01); *B32B 27/34* (2013.01); *B32B 27/36* (2013.01); *B32B 27/38* (2013.01); *E06B 9/24* (2013.01); *G02F 1/0126* (2013.01); *B32B 2255/06* (2013.01); *B32B 2255/10* (2013.01); *B32B 2255/102* (2013.01); *B32B 2255/205* (2013.01); *B32B 2260/025* (2013.01); *B32B 2260/046* (2013.01); *B32B 2260/048* (2013.01); *B32B 2264/102* (2013.01); *B32B 2264/105* (2013.01); *B32B 2264/108* (2013.01); *B32B 2264/12* (2013.01); *B32B 2266/122* (2016.11); *B32B 2270/00* (2013.01); *B32B 2307/41* (2013.01); *B32B 2307/412* (2013.01); *B32B 2307/414* (2013.01); *B32B 2457/00* (2013.01); *B82Y 30/00* (2013.01); *E06B 2009/2417* (2013.01); *E06B 2009/2464* (2013.01); *G02F 2201/083* (2013.01); *G02F 2201/086* (2013.01); *G02F 2202/36* (2013.01)

(58) Field of Classification Search
CPC ..... B32B 25/042; B32B 25/14; B32B 25/047; B32B 27/302; B32B 27/28; B32B 27/36; B32B 27/283; B32B 27/06; B32B 27/34; B32B 27/306; B32B 27/38; B32B 27/08; B32B 27/14; G02F 1/0147; G02F 1/0126; E06B 9/24
USPC ................................................. 359/288, 289
See application file for complete search history.

(56) References Cited

U.S. PATENT DOCUMENTS

| | | |
|---|---|---|
| 2011/0207603 A1 | 8/2011 | Kawahara et al. |
| 2016/0168407 A1 | 6/2016 | Jarvis |
| 2017/0028763 A1* | 2/2017 | Arsenault ............... B32B 5/16 |

FOREIGN PATENT DOCUMENTS

| | | |
|---|---|---|
| EP | 2 848 989 A2 | 3/2015 |
| KR | 10-2015-0101121 A | 3/2015 |
| WO | 2008/087077 A1 | 7/2008 |

OTHER PUBLICATIONS

Buonsanti et al., "Tunable Infrared Absorption and Visible Transparency of Colloidal Aluminum-Doped Zinc Oxide Nanocrystals," *Nano Lett.* 11:4706-4710, 2011.
Cheon et al., "Reduced Graphene Oxide Nanosheet for Chemo-photothermal Therapy," *Langmuir* 32:2731-2736, 2016.
Fang et al., "Evolution of Light-Induced Vapor Generation at a Liquid-Immersed Metallic Nanoparticle," *Nano Lett.* 13:1736-1742, 2013.
Feng et al., "Gasochromic smart window: optical and thermal properties, energy simulation and feasibility analysis," *Solar Energy Materials & Solar Cells* 144:316-323, 2016.
Gao et al., "$VO_2$-$Sb:SnO_2$ composite thermochromic smart glass foil," *Energy Environ. Sci.* 5:8234-8237, 2012.
Goebbert et al., "Wet chemical nanodeposition of ATO and ITO coatings using crystalline nanoparticles redispersable in solutions," *Thin Solid Films* 351:79-84, 1999.
Gong et al., "Copolymer solution-based 'smart window,'" *Appl. Phys. Lett.* 95:251907, 2009. (4 pages).
Guo et al., "Facile synthesis of homogeneous $Cs_xWO_3$ nanorods with excellent low-emissivity and NIR shielding property by a water controlled-release process," *J. Mater. Chem.* 21:5099-5105, 2011.
Gyenes et al., "Electrically Adjustable Thermotropic Windows Based on Polymer Gels," *Polym. Adv. Technol.* 14:757-762, 2003.
Huang et al., "$MoO_{3-x}$-Based Hybrids with Tunable Localized Surface Plasmon Resonances: Chemical Oxidation Driving Transformation from Ultrathin Nanosheets to Nanotubes," *Chem. Eur. J.* 18:15283-15287, 2012.
Huang et al., "Solvothermal synthesis of $Sb:SnO_2$ nanoparticles and IR shielding coating for smart window," *Materials and Design* 88:384-389, 2015.
Inoue et al., "Thermotropic glass with active dimming control for solar shading and daylighting," *Energy and Buildings* 40:385-393, 2008.
Izumi et al., "Preparation of electrically conductive nano-powder of zinc oxide and application to transparent film coating," *Journal of Alloys and Compounds* 480:123-125, 2009.
Katagiri et al., "Robust Infrared-Shielding Coating Films Prepared Using Perhydropolysilazane and Hydrophobized Indium Tin Oxide Nanoparticles with Tuned Surface Plasmon Resonance," *ACS Appl. Mater. Interfaces* 5:10240-10245, 2013.
Kim et al., "Energy Efficient Glazing for Adaptive Solar Control Fabricated with Photothermotropic Hydrogels Containing Graphene Oxide," *Scientific Reports* 5:7646, 2015. (7 pages).
Lee et al., "A Dual-Responsive Nanocomposite toward Climate-Adaptable Solar Modulation for Energy-Saving Smart Windows," *ACS Appl. Mater. Interfaces* 9:6054-6063, 2017.
Li et al., "A hierarchically porous anatase $TiO_2$ coated-$WO_3$ 2D IO bilayer film and its photochromic properties," *Chem. Commun.* 52:892-895, 2016.
Lu et al., "Preparation of ATO nanorods and electrical resistivity analysis," *Materials Letters* 68:237-239, 2012.
Luo et al., "Preparation and Optical Properties of Novel Transparent Al-Doped-ZnO/Epoxy Nanocomposites," *J. Phys. Chem. C* 111(21):9406-9411, 2009.

(56) References Cited

OTHER PUBLICATIONS

Manthiram et al., "Tunable Localized Surface Plasmon Resonances in Tungsten Oxide Nanocrystals," *J. Am. Chem. Soc.* 134:3995-3998, 2012.
Mattox et al., "Low Temperature Synthesis and Surface Plasmon Resonance of Colloidal Lanthanum Hexaboride ($LaB_6$) Nanocrystals," *Chem. Mater.* 27:6620-6624, 2015.
Mei et al., "Transparent ATO/epoxy nanocomposite coating with excellent thermal insulation property," *Micro & Nano Letters* 7(1):12-14, 2012.
Müller et al., "Highly Conducting Nanosized Monodispersed Antimony-Doped Tin Oxide Particles Synthesized via Nonaqueous Sol-Gel Procedure," *Chem. Mater.* 21:5229-5236, 2009.
Neumann et al., "Solar Vapor Generation Enabled by Nanoparticles," *ACS Nano.* 7(1):42-49, 2013.
Patil et al., "Efficient electrochromic smart windows of one-dimensional pure brookite $TiO_2$ nanoneedles," *Solar Energy Materials & Solar Cells* 147:240-245, 2016.
Raicu et al., "Facade Systems With Variable Solar Control Using Thermotropic Polymer Blends," *Solar Energy* 72(1):31-42, 2002.
Resch et al., "Thermotropic layers for flat-plate collectors—A review of various concepts for overheating protection with polymeric materials," *Solar Energy Materials & Solar Cells* 93:119-128, 2009.
Robinson et al., "Ultrasmall Reduced Graphene Oxide with High Near-Infrared Absorbance for Photothermal Therapy," *J. Am. Chem. Soc.* 133:6825-6831, 2011.
Schneider et al., "Natural Thermotropic Materials for Solar Switching and Glazing," *Mat.-wiss. u. Werkstofftech.* 32:231-237, 2001.
Szilágyi et al., "Thermotropic Polymer Gels: Smart Gel Glass," *Macromol. Symp.* 227:357-366, 2005.
Tandon et al., "Colloidal transparent conducting oxide nanocrystals: A new infrared plasmonic material," *Pramana—J. Phys.* 84(6):1087-1098, 2015. (13 pages).
Wang et al., "Binary Solvent Colloids of Thermosensitive Poly(N-isopropylacrylamide) Microgel for Smart Windows," *Ind. Eng. Chem. Res.* 53:18462-18472, 2014.
Wang et al., "Graphene-based Recyclable Photo-Absorbers for High-Efficiency Seawater Desalination," *ACS Appl. Mater. Interfaces* 8:9194-9199, 2016.
Wang et al., "Preparation and characterization of NIR cutoff antimony doped tin oxide/hybrid silica coatings," *Materials Letters* 87:35-38, 2012.
Watanabe, "Intelligent window using a hydrogel layer for energy efficiency," *Solar Energy Materials and Solar Cells* 54:203-211, 1998.
Xiong et al., "Solar energy conversion with tunable plasmonic nanostructures for thermoelectric devices," *Nanoscale* 4:4416-4420, 2012. (6 pages).
Xu et al., "Influence of Sb doping on the structural and optical properties of tin oxide nanocrystals," *CrystEngComm* 15:3296-3300, 2013.
Yuan et al., "Thermotropic Color Changing Nanoparticles Prepared by Encapsulating Blue Polystyrene Particles with a Poly-N-Isopropylacrylamide Gel," *Journal of Applied Polymer Science* 105:446-452, 2007.
Zhou et al. "Temperature-responsive hydrogel with ultra-large solar modulation and high luminous transmission for 'smart window' applications," *J. Mater. Chem. A.* 2:13550-13555, 2014.
Zhou et al., "$VO_2$/hydrogel hybrid nanothermochromic material with ultra-high solar modulation and luminous transmission," *J. Mater. Chem. A* 3:1121-1126, 2015.
Supplementary European Search Report dated Feb. 14, 2020 for European Application No. 17841767, 9 pages.

\* cited by examiner

| | Specific examples | | IR region |
|---|---|---|---|
| 1 | Indium Tin Oxide | ITO | >1100 nm |
| 2 | Antimony Tin Oxide | ATO | >1500 nm |
| 3 | Fluorine Tin Oxide | FTO | >1700 nm |
| 4 | Aluminum Zinc Oxide | AZO | >1500 nm |
| 5 | Gallium Zinc Oxide | GZO | >1700 nm |
| 6 | Indium Zinc Oxide | IZO | >1700 nm |
| 7 | Reduced Tungsten Oxide | $W_{18}O_{49}/WO_{3-x}$ | 780 – 2500 nm |
| 8 | Tungsten suboxide | $WO_{2.72}$ | 780 – 2500 nm |
| 9 | Hexagonal Tungsten Bronze Oxide | $M_xWO_3$ (0 < x < 1) / $M_{0.33}WO_3$ (M = H, $NH_4$, Li, Na, K, Rb, Cs) | 780 – 2500 nm |

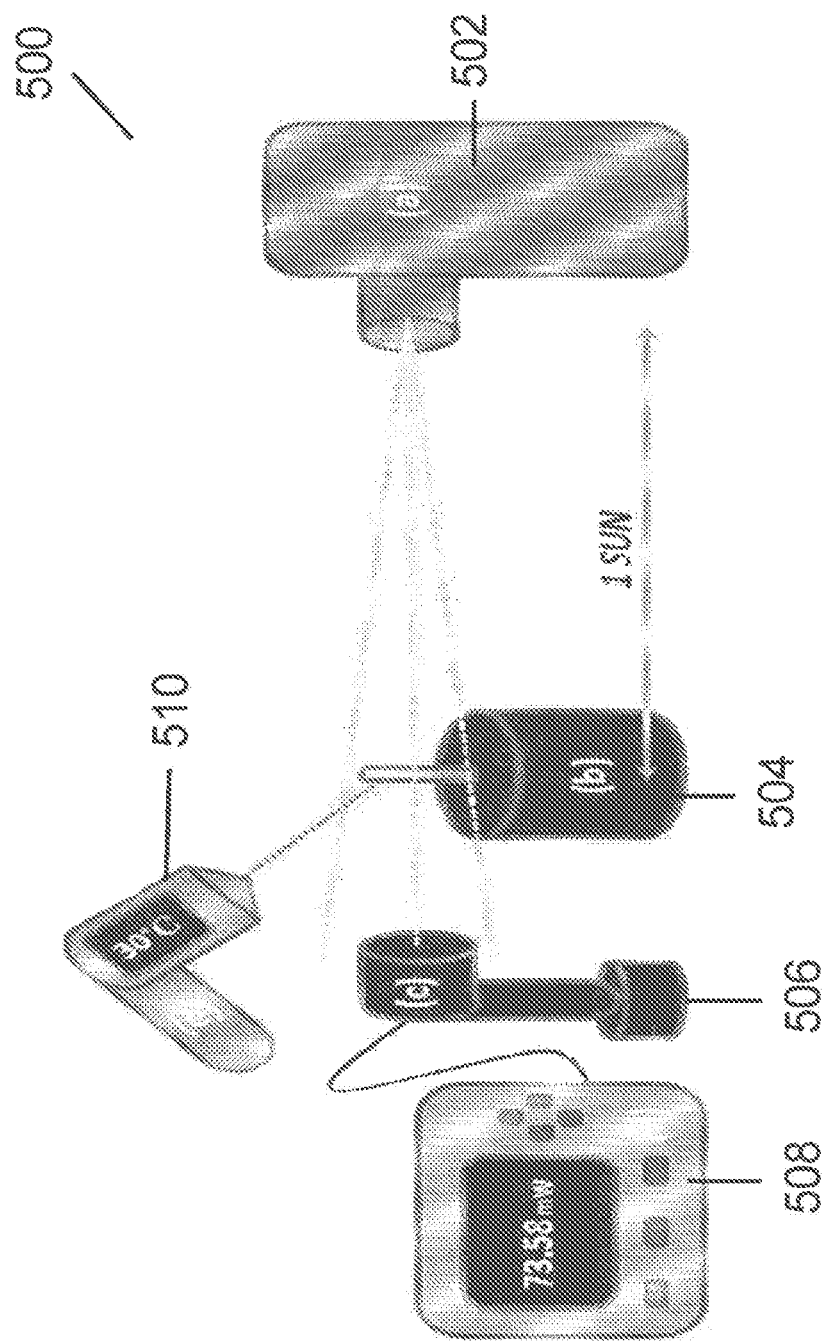

| Nominal Sb (at%) | 0 | 5 | 10 | 15 |
|---|---|---|---|---|
| Actual Sb (at%) | 1.0 | 3.0 | 11.5 | 13.8 |

| 180 μm PATO films | VIS Modulation (%) | | | NIR Modulation (%) | | |
|---|---|---|---|---|---|---|
| | 200 s | 400 s | 600 s | 200 s | 400 s | 600 s |
| Neat PNIPAM | 7.2 | 12.2 | 16.7 | 3.0 | 5.0 | 6.5 |
| 0 at% Sb | 6.6 | 12.3 | 16.5 | 2.8 | 5.0 | 6.8 |
| 5 at% Sb | 8.2 | 16.8 | 23.5 | 3.3 | 5.8 | 7.4 |
| 10 at% Sb | 11.5 | 23.4 | 27.7 | 2.8 | 6.2 | 8.7 |

| 180 μm PATO films | VIS Modulation (%) | | | NIR Modulation (%) | | |
|---|---|---|---|---|---|---|
| | 200 s | 400 s | 600 s | 200 s | 400 s | 600 s |
| Neat PNIPAM | 7.2 | 12.2 | 16.7 | 3.0 | 5.0 | 6.5 |
| PATO-2 | 12.2 | 25.4 | 32.1 | 5.0 | 9.5 | 13.9 |
| PATO-5 | 25.6 | 54.4 | 58.9 | 5.1 | 27.4 | 33.9 |

| 80 μm PATO films | VIS Modulation (%) | | | NIR Modulation (%) | | |
|---|---|---|---|---|---|---|
| | 200 s | 400 s | 600 s | 200 s | 400 s | 600 s |
| Neat PNIPAM | 3.9 | 7.8 | 10.3 | 2.8 | 4.5 | 6.1 |
| PATO-2 | 5.1 | 11.4 | 14.4 | 2.8 | 5.1 | 7.4 |
| PATO-5 | 6.2 | 24.3 | 42.6 | 3.7 | 6.8 | 14.7 |

| Nanocomposite hydrogel | Improvement over PATO-0-80 film (no. of time) Response Rate | | | | | |
|---|---|---|---|---|---|---|
| | Solar Modulation Ability | | | Response Rate | | |
| | VIS | NIR | Avg | VIS | NIR | Avg |
| PATO-2-80 | 1.4 | 1.2 | 1.3 | 1.4 | 1.2 | 1.3 |
| PATO-5-80 | 4.1 | 2.4 | 3.3 | 2.2 | 1.7 | 2 |
| PATO-0-180 | 1.6 | 1.1 | 1.4 | 1.6 | 1.1 | 1.4 |
| PATO-2-180 | 3.1 | 2.3 | 2.7 | 3.7 | 2.3 | 3 |
| PATO-5-180 | 5.7 | 5.6 | 5.7 | 7.7 | 3.4 | 5.6 |

FIG. 21

| Solid Weight Content (%) | 10 | | | | 15 | | | 35 | | |
|---|---|---|---|---|---|---|---|---|---|---|
| %Sb | 0 | 5 | 10 | 15 | 0 | 5 | 10 | 0 | 5 | 10 |
| ATO (mg) | 100 | 100 | 100 | 100 | 100 | 100 | 100 | 100 | 100 | 100 |
| TMAH (μL) | 50 | 100 | 150 | 200 | 200 | 250 | 300 | 126 | 156 | 186 |
| $H_2O$ (μL) | 850 | 800 | 750 | 700 | 367 | 317 | 267 | 60 | 30 | 0 |

| Classification | Specific examples (including but not exclusively) | |
|---|---|---|
| Inherent | Conjugated Polymers | Polyacetylenes |
| | | Polythiophenes |
| | | Poly (phenylene vinylidenes) |

| Classification | Specific examples (including but not exclusively) | | |
|---|---|---|---|
| Doped with non TC additives | Photonic Crystals [1D] | Poly (N-isopropylacrylamide-co-acrylic acid) | Poly (p-methyl styrene) |
| | | Poly (Acrylamide)-Poly (Acrylic Acid) | Poly (dodecylglyceryl itaconate) |
| | | 3-n-pentadecylphenol | Polystyrene-block-poly(4-vinylpyridinium methanesulfonate) |
| | Photonic Crystals [3D] | Poly (N-isopropylacrylamide) | Polystyrene |
| | | Poly (N-isopropylacrylamide-co-acrylic acid) | Bisacrylamide |

FIG. 23C            2300c

| Classification | Specific examples (including but not exclusively) | | |
|---|---|---|---|
| Doped with non TC additives | Nanoparticle LSPR | Au | Poly (N-isopropylacrylamide) |
| | | Ag | Poly (N-isopropylacrylamide) |
| | | Ag | Polystyrene |
| | Aggregachromic Dyes | Poly(ethylene terephthalate glycol) | 1,4-bis(α-cyano-4-octadecyloxystyryl)-2,5-dimethoxybenzene (Cyano OPV) |
| | | Poly(methyl methacrylate) | |
| | | Poly(ethylene-co-norbornene) | |
| | | Low-density polyethylene | N,N'-bis-(R)-(1-phenylethyl)-perylene-3,4,9,10-tetracarboxyldiimide (R-pery) |
| | | Poly (ethylene-co-vinyl alcohol) | N,N'-bis(2-(1-piperazino)ethyl]-3,4,9,10-perylenetetracarboxylic acid diimide dichloride (PZPER) |

FIG. 23D  2300d

| Classification | Specific examples (including but not exclusively) | | |
|---|---|---|---|
| Doped with non TC additives | Polymer-Dye Interaction | Polyvinylalcohol-sodium borate | 2,6-diphenyl-4-2,4,6-(triphenyl-1-pyridinio)-phenolate (DTPP) |
| | | | o-cresolsulfonephthalein |
| | | Poly (lactic acid) | cyanidin chloride (E163) |
| | Charge Transfer Complex | Poly (ethylene imine) | $K1_{2.5}Na_{1.5}[NaP_5W_{30}O_{110}]$ $(NaP_5W_{30})$ |

FIG. 23E                                      2300e

| Classification | Specific examples (including but not exclusively) | | |
|---|---|---|---|
| Doped with TC additives | Leuco Dye Developer Solvent System | Polypropylene | crystal violet lactone |
| | | Polypropylene | 3,3-bis-(1-n-butyl-2-methyl-3-indolyl)-phthalide |
| | Conjugated Polymers | Polyvinylalcohol | Polydiacetylenes |
| | Inorganic TC Complexes | Poly (vinylidene fluoride) | 1-butyl-3-methylimidazolium nickel tetrachloride |

FIG. 24    2400

| Classification | Specific examples (including but not exclusively) |
|---|---|
| Alloys | Copper-Zinc |
| | Silver-Zinc |
| | Gold-Zinc |
| | Silver-Cadmium |
| | Gold-Cadmium |
| Metal Halides | MX, (M = copper, silver, mercury, gold, cobalt, iron, nickel, magnese, X = halogen) |
| Mercury Compounds | $HgI_2$ |
| | $Ag_2HgI_4$ |
| | $Cu_2HgI_4$ |
| Boracites | $Me_3B_7O_{13}X$, (Me = divalent metal, X = halogen) |
| Oxides | $VO_2$ |
| | $TiO_{1.94}$ |
| | $SrMnO_3$ |
| | $La_{0.7}Ca_{0.3-x}Sr_xMnO_3$ |
| | $La_{1-x}A_xMnO_3$ (A = Ca, Ba) |

FIG. 26    2600

| Classification | | Specific examples (including but not exclusively) | |
|---|---|---|---|
| Transparent Shape Memory Polymers (SMP) | | Polyurethane | |
| | | Polyvinyl alcohol | |
| | | Polyimide | |
| | | Poly (ε-caprolactone) | |
| | | Poly (ethylene-co-vinyl-acetate) | |
| Polymeric Actuators Materials | Volume Phase Transition Hydrogel | Poly (N-isopropylacrylamide) | |
| | Liquid Crystal Elastomer | Polymethylhydrosiloxane | (4-methoxyphenyl-4-(1-buteneoxy) benzoate (reactive mesogen) |
| | Biopolymers | Elastin Like Polypeptides (ELP) | |

FIG. 27A 2700a

| Classification | Specific examples (including but not exclusively) | | |
|---|---|---|---|
| | Polymer (A) | | Solvent (B) |
| Synthetic | vinyl or acrylic polymers | Polyvinylmethylether | Aqueous, non-aqueous, ionic-liquid or multi component solvent system |
| | | Polyvinylalcohol | |
| | | Poly (N-isopropylacrylamide) | |
| | | Poly (N-vinylcaprolactames) | |
| | | Poly-2-isopropyl-2-oxazoline | |
| | | Polymethyl-2-acetamidoacrylate | |
| | polyethers | Polyalkoxide (ethyleneoxide/propyleneoxide) - Pluronic® | |
| | | Polyglycidols | |
| | others | Polyethyleneglycol | |
| Biopolymer | cellulose | Hydropropylcellulose | |

| Classification | Specific examples (including but not exclusively) | |
|---|---|---|
| | Polymer (A) | Polymer (B) |
| Acrylate based | Polymethylmethacrylate | Chlorinated rubber |
| | Polyisobutylmethacrylate | |
| Styrene based | Poly(styrene-hydroxyethylmethacrylate) | Polypropylen eoxide |

FIG. 27C                                    2700c

| Classification | Specific examples (including but not exclusively) | |
|---|---|---|
| | Polymer (A) | Compounds (B) |
| Amorphous thermoplastic | Copolyesters | Octadecane |
| | Polystyrene | Ester types |
| Semi-crystalline thermoplastic | Thermoplastic polyamide | Ester types |
| | | Poly(Methacrylate-butadiene-styrene) |
| Silicone | Silicone | Waxy polymers $(C_2F_3Cl)_x$ |
| Thermoset | Polyesters | Ester types |
| Peroxide curable resins | Epoxy | Eicosane |
| UV curable resins | Polyesteracrylate | Eicosane |

FIG. 27D  2700d

| Classification | Specific examples (including but not exclusively) | |
| --- | --- | --- |
| | Component (A) | Component (B) |
| Core-Shell | Poly (N-isopropylacrylamide) | Polystyrene |
| Aggregation | Pluronic® | sodium dodecyl sulfate |
| Salt solution | Inorganic salt | Solvent |

FIG. 27E          2700e

| Classification | Specific examples (including but not exclusively) | |
|---|---|---|
| | IL/Organic Salt/PIL (A) | Solvent/Polymer (B) |
| IL-Solvent | 1-butyl-3-methylimidazolium hexafluorophosphate ([$C_4$mim]$PF_6$) | Water-Ethanol |
| | Tetrabutylphosphonium styrenesulfonate ([$P_{444}$][SS]) | Water |
| | Tetrabutylammonium Bromide ([$N_{4444}$]Br) | Toluene |
| Homo-PIL-Solvent | Poly [(1,8-octanediyl-bis(tri-n-butylphosphonium) 4-styrene sulfonate] [Poly (SS-P2)] | Water |
| | Poly [2-(vinyloxy)ethyl-1-butylimidazolium chloride] (Poly [BuIm][Cl]) | Chloroform |
| | Poly (benzylbutylimidazolium-chloride) (Poly [BBI-Cl] | Chloroform-Ethanol |
| Copo-PIL | Poly (ILBr)-b-PPO-b-poly(ILBr) | |
| | Poly (NIPAAm)-b-Poly (PVI-Br) | Water |

FIG. 27F          2700f

| Classification | Specific examples (including but not exclusively) | |
|---|---|---|
| IL-Polymer | Poly benzyl methacrylate (PBnMA) | 1-alkyl-3-methylimidazolium bis(trifluoromethane sulfonyl)imide [$C_n$mim][$NTf_2$] |
| | Poly (ethyl glycidyl ether) (PEGE) | 1-butyl- 2,3- dimethylimidazolium bis(trifluoromethylsulfonyl)imide ([$C_4$dmim][$NTf_2$]) |
| | Poly propylene oxide (PPO) | 1-butyl-3- methylimidazolium bis(trifluoromethylsulfonyl)amide [$C_4$mim][$NTf_2$] |

FIG. 27G                                      2700g

| Classification | Specific examples (including but not exclusively) | |
| --- | --- | --- |
| | Polymer (A) | Solvent (B) |
| Polymer-Alcohol | Poly (methyl 4-(2-(acryloyloxy)propanamido) butanoate | Ethanol |
| | Poly (1-(benzylamino)-1-oxopropan-2-ylacrylate) | Ethanol |
| | Polyethylene glycol | Ethanol |
| | Poly [di(ethylene glycol) methyl ether methacrylate] | Isopropanol |
| | Poly ((isobutyl vinyl ether)-r-(2-4,4,5,5,6,6,7,7,8,8,9,9,9-tridecafluorononyloxy) ethyl vinyl ether)) | Ethanol |
| | Poly [N-(4-vinyl benzyl)-N,N-dibutylamine | Isopropanol |
| Polymer-Water | Poly (vinyl methyl ether) | Water |
| | Poly (ethylene-co-vinyl alcohols) | Water |
| | Poly (hydroxyethylmethacrylate) | Water |
| | Poly-3-dimethyl(metharyloyloxyethyl) ammonium propane sulfonate | Water |
| | Poly (6-acryloyloxymethyluracil) | Water |
| | Poly (N-acryloylglycinamide) | Water |
| | Polyethylene glycol | Water |

FIG. 27H  2700h

| Classification | Specific examples (including but not exclusively) | |
|---|---|---|
| | Polymer (A) | Solvent (B) |
| Polymer-Cosolvent | Poly (N-isopropylacrylamide) | Ethanol-Water |
| | Poly (methylmethacrylate) | Ethanol-Water |
| | Poly (methylacrylate-b-polystyrene) | Ethanol-Water |
| | Poly(2-alkyl/aryl-2-oxazoline) | Ethanol-Water |
| | Poly (acetoacetoxyethyl methacrylate) | Ethanol-Water |
| | Poly (N-alkyl-2-cyanohex-4-enamide) | Ethanol-Water |
| | Poly [N-(4-vinyl benzyl)-N,N-dibutylamine | Propanol-Water |

FIG. 27I                              2700i

| Classification | Specific examples (including but not exclusively) | |
| --- | --- | --- |
| | Component (A) | Component (B) |
| Polymer-IL | Poly (N-isopropylacrylamide) | 1-Ethyl-3-methylimidazolium bis(trifluoromethylsulfonyl)imide [$C_2$mim][$NTf_2$] |
| IL-Solvent | Betaine bis-(triflimide) [Bet][$Tf_2$N] | Water |
| | Tetra-n-butylphosphonium fumarate [$P_{444}$][Fum] | Water |
| | 1-butyl-3-methylimidazolium bis(trifluoromethylsulfonyl)imide [$C_4$mim][$NTf_2$] | Chloroform |
| | 1-decyl-3-methylimidazolium bis(trifluoromethylsulfonyl)imide [$C_{10}$mim][$NTf_2$] | Benzene |
| PIL-Solvent | Poly (N-acryloylasparaginamide) | Water |
| | Poly (acrylamide-co-acrylonitrile) | Water |
| | Poly [2-(vinyloxy)ethyl-4-methyl-pyridinium chloride] [Poly ([MePy][Cl])] | Chloroform-Methanol |

FIG. 27J                                              2700J

| Classification | Specific examples (including but not exclusively) |
|---|---|
| Nematic (Opaque-Transparent) | para-azoxyanisole |
| | N-(p-methoxybenzylidene)-p'-butylaniline |
| | p-pentyl-p'-cyanobiphenyl (5-CB) |
| | p-pentylphenyl-trans-p'-pentylcyclohexylcarboxylate |
| | 4-(4-pentylcyclohexyl)benzonitrile (5-PCH) |
| | 4'(hexyloxy)-4-biphenylcarbonitrile (HOBC) |
| | N-(4-ethoxybenzylidene)-4-butylaniline (EBBA) |
| Chiral Nematic (Thermochromic) | N-(p-ethoxybenzylidene)-p'-(-β-methylbutyl) aniline |
| | Cholesteryl myristate |
| | Cholesteryl chloride |
| | Cholesteryl benzoate |
| | Cholesteryl pelargonate |
| | Cholesteryl oleyl carbonate |
| Sematic | p,p'-dinonylazobenzene |
| | p,p'-diheptyloxyazoxybenzene (HOAB) |
| | Terephthalylidene-bis-(p-butylaniline) (TBBA) | ns
COMPOSITE FILM, DEVICE INCLUDING, AND METHOD OF FORMING THE SAME

CROSS-REFERENCE TO RELATED APPLICATION

This application claims the benefit of priority of Singapore application No. 10201606933U filed on Aug. 19, 2016, the contents of it being hereby incorporated by reference in its entirety for all purposes.

TECHNICAL FIELD

Various aspects of this disclosure relate to a composite film. Various aspects of this disclosure relate to a device including a composite film. Various aspects of this disclosure relate to a method of forming a composite film.

BACKGROUND

It has been reported that 43% of the world primary energy had been spent on heating, ventilation and air-conditioning (HVAC). One solution to reduce this energy consumption is to utilize windows that can selectively retain or block out near infrared light (NIR). Conventional low emissivity (low-e) coatings of silver tend to result in relatively low transmittance for visible light and oxidize easily. Although multilayer optical films (MOFs) that aim to stabilize the temperature of a highly glazed room have been implemented, many of them are either unresponsive to surrounding ambient temperature changes or require extra energy inputs for dynamic control.

Hence, there is an opportunity to provide passive and dynamic control of solar heat gain, with a substantial reduction of heat and dimming of glaring sunlight. For energy conservation, immense efforts had been channeled into development of smart windows with different modes of activation, such as photochromic, gasochromic, electrochromic, thermochromic, and thermotropic smart windows. Amongst them, thermotropic (TT) systems are incredibly attractive since solar energy itself can be used as a promoter for solar shielding. Also, in the context of smart windows, it is highly desirable that both the transmittance of the visible (VIS) and near infrared (NIR) spectra can be modulated autonomously in order to control the solar luminance intensity as well as thermal comfort of the interior architecture.

Numerous forms of TT materials such as polymer gels, polymer blends, block copolymers, and even nanoparticles have been explored for smart window applications. A lot of thermally responsive aqueous polymer gels have been studied for TT smart window applications, but the primary problem of the optical switching behavior has yet to be resolved. The TT smart window switching problem was first reported in 2005. It was reported that optical switching could not take place in cold climates even in the presence of high intensity solar luminance. This is because the TT material is only thermoresponsive, resulting in the switching being mostly dependent on surrounding temperature, instead of sunlight intensity. If surrounding temperature is below the critical transition temperature, despite intense solar irradiation, the optical transition would not take place. Since then, several solutions such as reducing transition temperature of the gel, switching by electrical means, and addition of solar absorber materials have been proposed and studied. However, each of them has their own limitations and drawbacks.

The transition temperature of the hydrogel could be tuned lower for optical switching to occur. Wang et al (Industrial & Engineering Chemistry Research, 2014, 53, 18462) synthesized modified poly(N-isopropylacrylamide) (PNIPAM) microgel by suspension polymerization, as well as replacing water with binary solvent system. It was reported that although the microgel lowered the lower critical solution temperature (LCST) from 32° C. to 20° C., both the solar modulation ability as well as the response speed were compromised with the increase of cross linkers and glycerol content.

Besides reducing the transition temperature, the switching of thermotropic window can also be facilitated by joule-heating. Electrically adjustable thermotropic (EAT) windows with tunable transition temperatures based on PNI-PAM as well as poly(vinyl alcohol)-poly(methyl vinyl ether) (PVA-PMVE) gels have been reported by Gyenes et al. (Polymer for Advanced Technologies 2003, 14, 757, and Macromolecular Symposia 2005, 227, 357). Their study demonstrated that with an optimized electrical signal, a minimum switching time of 97 s could be obtained. However, for such EAT window to realize its functions, compromises have to be made due to the additional integration of conductive substrate. Firstly, the conductive substrate limits the visible transmittance to only 45-55% due to the dense layer of indium-tin oxide ($In_2O_3$:Sn, ITO). Secondly, the response rate of the optical transition would be limited by both the thermal capacity and heat conductivity of the ITO glass. Furthermore, a constant energy supply in maintaining the opaque state is required, and ramping up of energy inputs is also needed in order to improve the response speed of the EAT window.

In recent years, graphene based materials functioning as nano heaters have been reported for their photothermal properties in various biomedical and environmental applications. A photothermotropic system with graphene oxide (GO) as solar absorber in PNIPAM hydrogel was reported for the first time by Kim et al. (Scientific Reports 2015, 5, 7646). Actual outdoor switching test was performed under sunlight and due to the addition of GO, the temperature of the hydrogel rose significantly compared with neat PNI-PAM, and the hydrogel showed opacity due to optical switching. Although the hydrogel-GO composite responded to both sunlight as well as temperature, GO is also known to exhibit low optical absorption in the NIR region. Hence, efficient NIR shielding in summer and thermal insulation in winter applications could not be achieved using the hydrogel-GO composite. Besides, other important optical properties such as response speed and solar modulation ability of the hydrogel-GO composite have not been clearly investigated.

SUMMARY

Various embodiments may provide a composite film. The composite film may include a matrix. The composite film may also include one or more nanostructures including a metal oxide semiconductor configured to convert radiant energy to thermal energy. The matrix may have a property which is changeable based on the thermal energy received by the matrix from the metal oxide semiconductor.

Various embodiments may provide a device including a composite film as described herein.

Various embodiments may provide a method of forming a composite film. The method may include forming a matrix. The method may also include forming one or more nanostructures including a metal oxide semiconductor configured to convert radiant energy to thermal energy. The matrix may have a property which is changeable based on the thermal energy received by the matrix from the metal oxide semiconductor.

BRIEF DESCRIPTION OF THE DRAWINGS

The invention will be better understood with reference to the detailed description when considered in conjunction with the non-limiting examples and the accompanying drawings, in which:

FIG. 2 shows a table showing some examples of metal oxide semiconductors according to various embodiments and the specific infrared regions in which these metal oxide semiconductors exhibit plasmonic absorption.

FIG. 5 is a schematic showing a setup to study the switching behaviour, the response rate, and the modulation ability of the film according to various embodiments.

FIG. 6B is an energy-dispersive X-ray spectroscopy (EDX) table showing nominal and actual antimony (Sb) doping content (in atomic percent or at %) in the synthesized antimony tin oxide (ATO) according to various embodiments.

FIG. 14A shows a table showing effect of various antimony (Sb) dopant concentration on solar modulation for 180 µm thick composite films with 1.2 mg mL$^{-1}$ antimony tin oxide (ATO) according to various embodiments.

FIG. 14B shows a table illustrating the effect of different antimony tin oxide (ATO) content on solar modulation for 180 µm thick composite films according to various embodiments.

FIG. 14C shows a table 1400c illustrating the effect of different antimony tin oxide (ATO) content on solar modulation for 80 µm thick composite films according to various embodiments.

FIG. 17 shows a table showing the improvement of composite films according to various embodiments over a neat 80 µm thick poly(N-isopropylacrylamide) (PNIPAM) film.

FIG. 21 shows a table illustrating formulations of 10, 15 and 35 weight percent (wt %) aqueous dispersions of different antimony (Sb)-doped Antimony Tin Oxide (ATO) for use to prepare nanocomposite films according to various embodiments.

FIG. 23A shows a table illustrating examples of inherent reversible organic thermochromic materials which may be included in a composite film according to various embodiments. The thermochromic material may be a conjugated polymer such as polyacetylene, polythiophene, or poly (phenylene vinylidene).

FIG. 23B shows a table illustrating examples of thermochromic (TC) photonic crystals which may be included in a composite film according to various embodiments, the photonic crystals including materials doped with non-thermochromic (TC) additives.

FIG. 23C shows a table illustrating examples of thermochromic systems including localized surface plasmon resonance (LSPR) nanoparticles or aggregachromic dyes doped with non-thermochromic (TC) additives according to various embodiments.

FIG. 23D shows a table illustrating examples of systems involving polymer-dye interactions or charge transfer complexes according to various embodiments.

FIG. 23E shows a table illustrating examples of systems including thermochromic additives according to various embodiments.

FIG. 24 shows a table illustrating reversible inorganic thermochromic materials according to various embodiments.

FIG. 26 shows a table illustrating non-limiting examples of thermomechanical systems according to various embodiments.

FIG. 27A is a table showing non-limiting examples of thermotropic (lower critical solution temperature or LCST) polymer gel systems, including hydrogels, which may be included in the matrix of a composite film according to various embodiments.

FIG. 27B is a table showing non-limiting examples of thermotropic (lower critical solution temperature or LCST) polymer blends according to various embodiments.

FIG. 27C is a table showing non-limiting examples of thermotropic (lower critical solution temperature or LCST) polymer systems with fixed domains according to various embodiments.

FIG. 27D is a table showing non-limiting examples of atypical thermotropic (lower critical solution temperature or LCST) systems according to various embodiments.

FIG. 27E is a table showing non-limiting examples of thermotropic (lower critical solution temperature or LCST) ionic liquid or poly ionic liquid and solvent systems according to various embodiments.

FIG. 27F is a table showing non-limiting examples of thermotropic (lower critical solution temperature or LCST) ionic liquid and polymer systems according to various embodiments.

FIG. 27G is a table showing non-limiting examples of thermotropic (upper critical solution temperature or UCST) polymer systems according to various embodiments.

FIG. 27H is a table showing further non-limiting examples of thermotropic (upper critical solution temperature or UCST) polymer systems according to various embodiments.

FIG. 27I is a table showing non-limiting examples of thermotropic (upper critical solution temperature or UCST) ionic liquid (IL)/poly ionic liquid (PIL) systems according to various embodiments.

FIG. 27J is a table showing non-limiting examples of thermotropic liquid crystal systems according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or one of the composite films/devices is analogously valid for the other methods or composite films/devices. Similarly, embodiments described in the context of a method are analogously valid for a composite film/device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regard to a deposited material formed "over" a side or surface, may be used herein to mean that the deposited material may be formed "directly on", e.g. in direct contact with, the implied side or surface. The word "over" used with regard to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address one or more issues highlighted above. Various embodiments may relate to a smart window. However, various other embodiments may relate to other applications, such as thermochromic devices, and/or shape memory devices.

Figure 1:
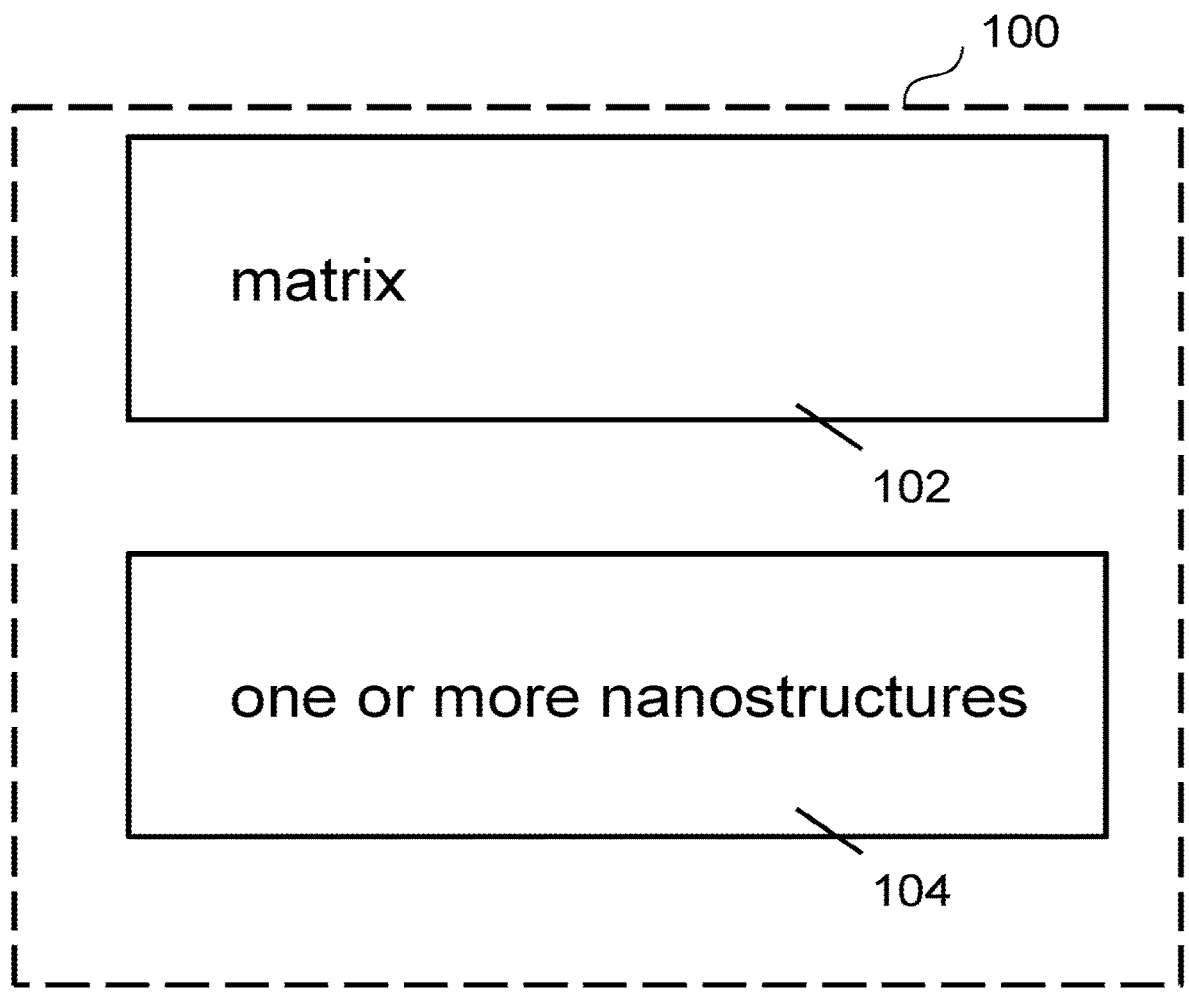
FIG. 1 shows an illustration of a composite film according to various embodiments.

FIG. 1 shows an illustration of a composite film 100 according to various embodiments. The composite film 100 may include a matrix 102. The composite film 100 may also include one or more nanostructures 104 including a metal oxide semiconductor configured to convert radiant energy to thermal energy. The matrix 102 may have a property which is changeable based on the thermal energy received by the matrix 102 from the metal oxide semiconductor.

In other words, the film 100 may include one or more nanostructures 104, which contain or are made of a metal oxide semiconductor, and a matrix 102. The metal oxide semiconductor may exhibit a photothermal effect. The heat generated by the metal oxide semiconductor may be transferred or transmitted to the matrix 102, and a property of the matrix 102 changes due to the heating up of the matrix 102.

The matrix 102 may be or may include a thermally responsive system. In various embodiments, the matrix 102 may be or may include, but is not limited to, a thermotropic system, a thermochromic system, or a thermomechanical system. In other words, the matrix 102 may be thermotropic, thermochromic, or thermomechanical. The thermal energy generated by the one or more nanostructures 104 may be transferred or transmitted to the matrix 102 via conduction.

The one or more nanostructures 104 may be configured to receive electromagnetic waves so that the radiant energy included in the electromagnetic waves is converted to thermal energy. Radiant energy as described herein may refer to energy carried by electromagnetic waves. In various embodiments, electromagnetic waves may refer to waves in the infrared-visible-ultraviolet (IR-vis-UV) region.

In various embodiments, the matrix 102 may be configured to undergo a phase transition based on the thermal energy received by the matrix from the metal oxide semiconductor.

In various embodiments, the property which is changeable may, for instance, be a transparency of optical light or visible light at a certain wavelength or range of wavelengths. The matrix 102 may be a thermotropic system.

In various embodiments, the property which is changeable may be a colour of the matrix 102 (e.g. in a thermochromic system), a shape of the matrix 102 (e.g. in a thermomechanical system), a resistivity of the matrix 102, or any other suitable property. The change in property of the matrix 102 may be due to the phase transition undergone by the matrix 102.

In various embodiments, the one or more nanostructures 104 may be nanoparticles. Each nanoparticle may have a diameter selected from a range of 1 nm to 100 nm. In various other embodiments, the one or more nanostructures 104 may be of any other suitable shapes. In various embodiments, the one or more nanostructures 104 may be a single nanolayer having a thickness selected from a range of 1 nm to 100 nm.

In various embodiments, the one or more nanostructures 104 may be embedded or may be dispersed in the matrix 102. One nanostructure 104 may be separated from another nanostructure 104 by the matrix 102. In various other embodiments, the one or more nanostructures 104, e.g. a nanolayer or a plurality of nanostructures, may be coated or laminated onto the matrix. In various embodiments, the metal oxide semiconductor may be incorporated into the matrix 102 as embedded particles or structures (with various sizes and form factors), coatings, or laminates.

In various embodiments, the metal oxide semiconductor may be any one selected from a group consisting of aluminium zinc oxide (AZO), gallium zinc oxide (GZO), indium tin oxide (ITO), antimony tin oxide (ATO), fluorine tin oxide (FTO), indium zinc oxide (IZO), reduced tungsten oxide (e.g. $W_{18}O_{49}/WO_{3-x}$), tungsten suboxide (e.g. $WO_{2.72}$), hexagonal tungsten bronze oxide ($M_xWO_3$ (0<x<1)/$M_{0.33}WO_3$ (M=H, $NH_4$, Li, Na, K, Rb, or Cs)), and any combination thereof. The metal oxide semiconductor may be a transparent conducting material.

The metal oxide semiconductor may be configured to convert radiant energy of electromagnetic waves in infrared (IR) region, i.e. electromagnetic waves having a wavelength or range of wavelengths selected from a range of about 700 nm to about 1 mm, to thermal energy. In various embodiments, the metal oxide semiconductor 104 may be configured to convert radiant energy of electromagnetic waves in near infrared (near IR) region, i.e. electromagnetic waves having a wavelength or range of wavelengths selected from a range of about 0.75 μm to about 1.4 μm.

The metal oxide semiconductor may be configured to convert radiant energy to thermal energy based on a localized surface plasmon resonance effect. In various embodiments, the infrared (IR) active plasmonic metal oxide semiconductor may function as an effective driver or tuner to modulate thermally responsive systems, materials or devices present in the matrix. The thermally responsive systems may include but are not limited to optically transparent systems. In various embodiments, the composite film 100 may be configured to allow at least some visible light to pass through. The composite film 100 may be transparent.

FIG. 2 shows a table 200 showing some examples of metal oxide semiconductors according to various embodiments and the specific infrared regions in which these metal oxide semiconductors exhibit plasmonic absorption. FIG. 2A shows that ITO has a plasmonic absorption region of >1100 nm, ATO and AZO have a plasmonic absorption region of >1500 nm, FTO, GZO and IZO have a plasmonic absorption region of >1700 nm. $W_{18}O_{49}/WO_{3-x}$, $WO_{2.72}$, and ($M_xWO_3$ (0<x<1)/$M_{0.33}WO_3$ (M=H, $NH_4$, Li, Na, K, Rb, or Cs) have a plasmonic absorption region of about 780 nm to about 2500 nm.

In various embodiments, a concentration of the metal oxide semiconductor relative to the matrix 102 may be above 1 milligrams per milliliter (mg $mL^{-1}$), or above 2 mg $mL^{-1}$, or above 5 mg $mL^{-1}$, or above 8 mg $mL^{-1}$.

In various embodiments, the metal oxide semiconductor may be antimony tin oxide. Antimony tin oxide may be tin oxide doped with antimony (Sb). In the current context, x % Sb doped ATO may refer to tin oxide including a nominal doping of x % of Sb. In various embodiments, the metal oxide semiconductor may be a metal oxide, e.g. tin oxide, doped with a suitable dopant, e.g. Sb. The stoichiometric ratio doping in the metal oxide semiconductor may be controlled, resulting in degenerate semiconductors that exhibit broad wavelength absorption in NIR/IR region due to localized surface plasmon resonance (LSPR). In various embodiments, a doping of the dopant in the metal oxide semiconductor may be above 3 atomic percent (at %), or above 5 at %, or above 10 at %.

In various embodiments, the metal oxide semiconductor may be dispersed in the matrix 102. In various embodiments, the metal oxide semiconductors may function as a heater or heaters to impart heat to the surrounding medium by photothermal means. Various embodiments may relate to a heat and light dual responsive hybrid film 100.

The metal oxide semiconductor may affect the tuning of thermal responsiveness behavior (e.g., response time or speed) via absorbing the NIR region and/or IR region of the optical irradiation spectrum (e.g., solar spectrum), and may be configured to cause local heating of the thermally responsive system, i.e. the matrix 102. One of the advantages of using metal oxide semiconductors may be that the film 100 may be made optically transparent in the visible region, i.e. from about 400 nm to about 700 nm. In various embodiments, different metal oxide semiconductors may be combined in different proportions with the matrix 102 or thermally responsive system to effect a suitable photothermal driving or tuning function as required by different specific applications.

The metal oxide semiconductor may additionally or alternatively be configured to convert radiant energy of electromagnetic waves in ultraviolet region, i.e. electromagnetic waves having a wavelength or range of wavelengths selected from a range of about 10 nm to about 400 nm, to thermal energy.

In various embodiments, the metal oxide semiconductor may be configured to absorb electromagnetic waves in the infrared region and the ultraviolet region, but not electromagnetic waves in the visible region. In various embodiments, the metal oxide semiconductor may be configured to absorb electromagnetic waves in the infrared region and the ultraviolet region more strongly than electromagnetic waves in the visible region.

In various embodiments, a degree of transparency or opacity of the film 100 to predetermined wavelengths or predetermined range of wavelengths may change in response to the radiant energy provided to the film 100.

As described in greater detail below, the matrix 102 may include a material selected from a group consisting of a polymer (e.g. a hydrogel), a metal-based compound, a metal-based alloy, an ionic liquid, and a liquid crystal. In various embodiments, the matrix 102 may include any suitable material that has a property changeable based on thermal energy. In various embodiments, the polymer may be formed via free-radical polymerization.

In various embodiments, the matrix 102 may include more than one material selected from the group consisting of a polymer, a metal-based compound, a metal-based alloy, an ionic liquid, and a liquid crystal. For instance, the matrix 102 may include two or more polymers. The two or more polymers may form an interpenetrating polymer network (IPN). An IPN may include two or more different polymers, which may at least be partially interlaced with one another, but may not be covalently bonded to each other.

Various embodiments may provide a device including a composite film 100 as described herein. The device may be, but is not limited to, any one selected from a group consisting of a smart window, a thermochromic device, and a shape memory device.

While some applications such as the ones given in the examples herein are intended for photothermal effect under solar irradiation, the same principle may be applied for other irradiation sources including artificial sources, e.g., solar simulator, Xeon lamps, mercury lamps, light emitting diodes (LEDs) or lasers etc. Various embodiments may relate to a system which includes a device including the composite film 100, and an artificial light source configured to provide radiant energy or electromagnetic waves to the composite film 100.

Figure 3:
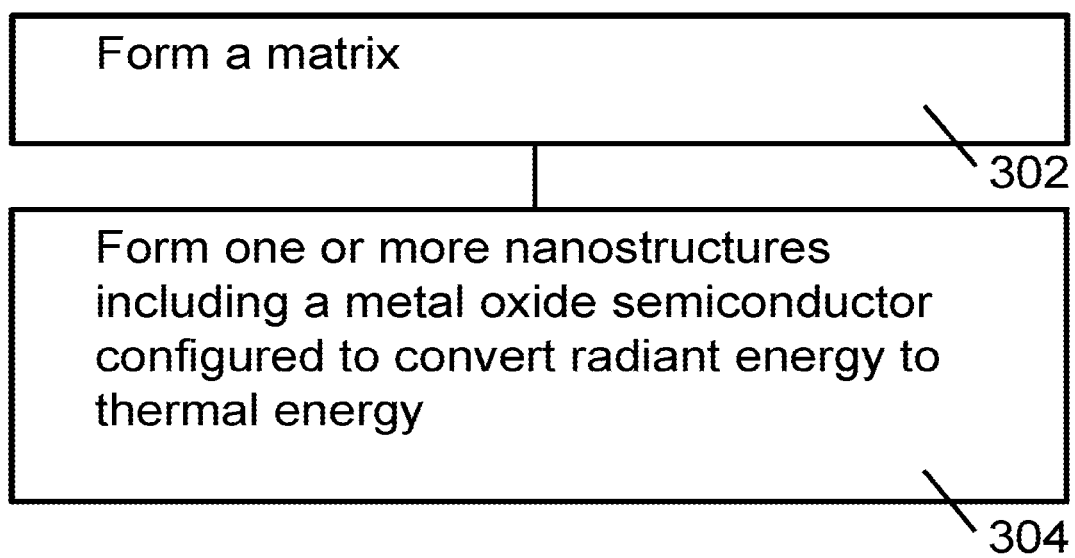
FIG. 3 shows a schematic of a method of forming a composite film according to various embodiments.

FIG. 3 shows schematic 300 of a method of forming a composite film according to various embodiments. The method may include, in 302, forming a matrix. The method may also include, in 304, forming one or more nanostructures including a metal oxide semiconductor configured to convert radiant energy to thermal energy. The matrix may have a property which is changeable based on the thermal energy received by the matrix from the metal oxide semiconductor.

The method may include dispersing or embedding the one or more nanostructures in the matrix, or may include coating or laminating the one or more nanostructures onto the matrix.

Various embodiments may relate to a composite film formed by a method as described herein.

As highlighted above, various embodiments may be suitable for different applications. Some non-limiting applications as well as related experimental data are provided below.

Smart Window Applications

Various embodiments may relate to a film including a thermotropic system (in solid, liquid, semisolid, or combination of these states) and a metal oxide semiconductor functioning as a driver for the thermotropic system. The film may be used in smart windows for energy saving and light dimming.

From a material design point of view, coupling a photothermal material that only absorbs in UV and NIR regions to a material such as thermotropic poly(N-isopropylacrylamide) (TT PNIPAM) may have advantages.

Apart from carbon rich materials which are good solar absorbers, nanoparticles which exhibit localized surface plasmon resonance (LSPR) are also commonly exploited as nano heaters. For smart window applications, different kinds of nanomaterials which preferably absorb in the UV and NIR regions have been studied. One material is rare earth hexaboride, such as lanthanum hexaboride ($LaB_6$). However, stringent conditions such as high temperature of around 1500° C. and vacuum are required for synthesis of $LaB_6$. Other candidates may be noble metal nanostructures, such as gold (Au) or silver (Ag) nanostructures with high aspect ratios, so that their plasmon absorption could be tuned to the NIR region. However, these noble metal nanostructures are costly and tend to oxidize easily.

Since the LSPR peak positions of the metal oxide semiconductor (or transparent conducting oxide) are affected by the electron concentration, the peak positions as well as the absorption efficiency may thus be tuned during the synthesis process by controlling the stoichiometric ratio of the constituents, i.e. controlling the amount of dopant relative to the amount of metal oxide. Due to wide bandgap of the metal oxide semiconductor, the metal oxide semiconductor may also exhibit UV absorption and may be highly transparent.

Various embodiments may relate to a fully autonomous photothermotropic poly(N-isopropylacrylamide)/antimony tin oxide (PNIPAM/ATO or PATO) prepared via free radical polymerization. Various embodiments may address the switching behavior problem of hydrogel smart windows. The addition of a metal oxide semiconductor such as antimony tin oxide (ATO) may not only aid in optical switching, but may also enhance solar modulation ability as well as response rate.

Figure 4:
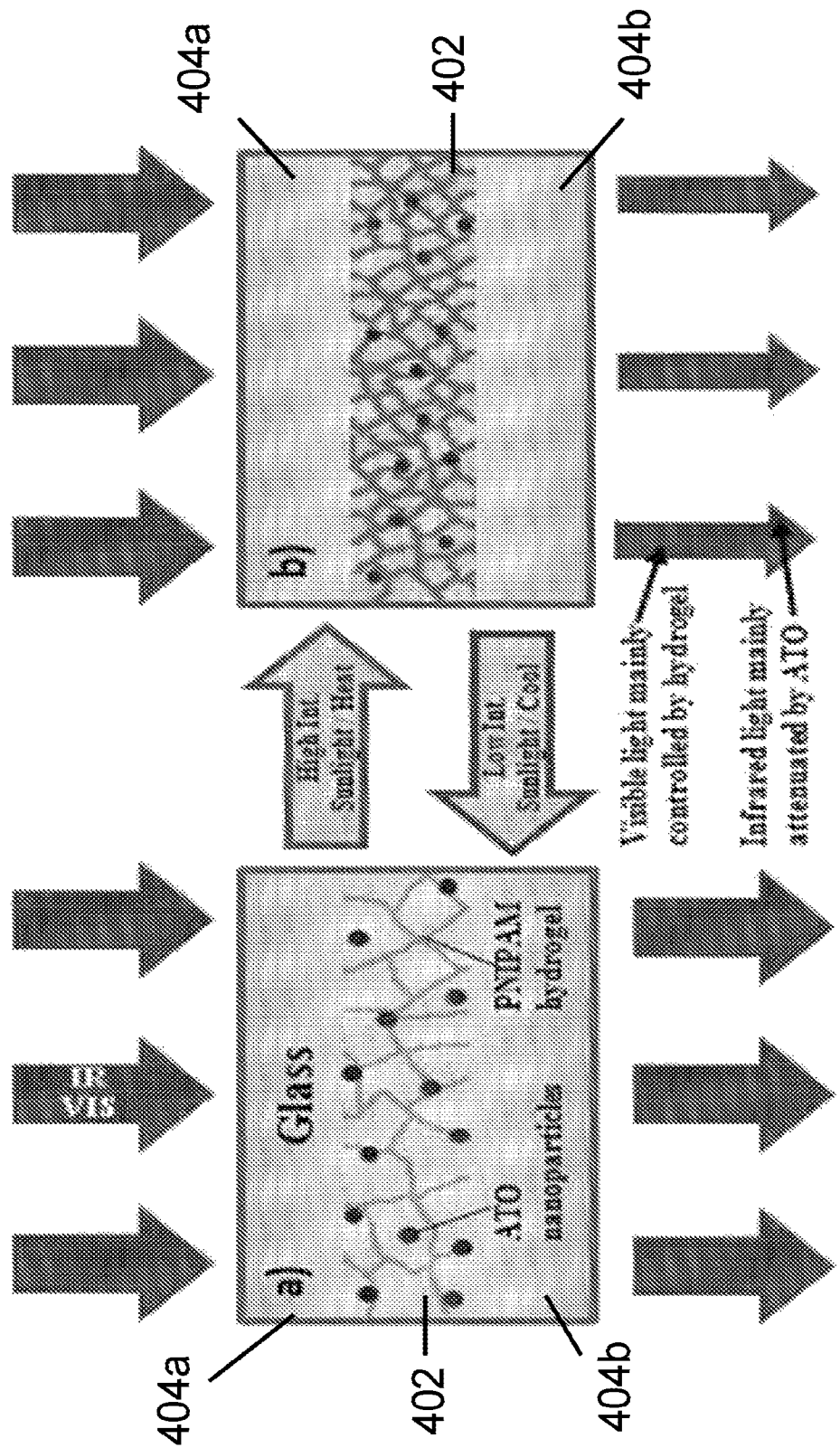
FIG. 4 is a schematic illustrating an operating mechanism of a thin film according to various embodiments.

FIG. 4 is a schematic illustrating an operating mechanism of a thin film 402 according to various embodiments. The film 402 may include ATO nanoparticles embedded in a PNIPAM matrix. The film 402 may be sandwiched between two glass layers 404a, 404b. Under high intensity sunlight, the ATO nanoparticles may absorb IR radiation and may convert the absorbed IR radiation to heat based on the photothermal effect. The converted heat may cause phase switching of the PNIPAM hydrogel. The phase switching may cause the hydrogel to become less transparent to visible light, thus allowing less visible light to pass through the film 402. Under low intensity sunlight, the ATO nanoparticles may absorb less IR radiation. As such, less heat may be converted, and the hydrogel may be in a phase that is more transparent to visible light.

In other words, the matrix or hydrogel may be configured to be switched to a first phase when the matrix or hydrogel receives thermal energy beyond a predetermined level, and may be configured to be switched to a second phase when the matrix or hydrogel receives thermal energy less than the predetermined level. The first phase of the matrix or hydrogel may be configured to allow less visible light to pass through, and may be referred to as the "translucent phase" or "opaque phase". The second phase of the matrix or hydrogel may be configured to allow more visible light to pass through, and may be referred to as the "transparent phase". The photothermal effect provided by the metal oxide semiconductor may provide additional thermal energy under high intensity irradiation so that the matrix or hydrogel receives thermal energy beyond the predetermined level to switch to the translucent/opaque phase from the transparent phase.

Accordingly, the film 402 may achieve or provide dimming control in times of glaring sunlight in both summer and winter. For thermal control in tropical climates, NIR shielding and improvement in both solar modulation ability as well as response rate may be highly desired. In winter climates, the metal oxide semiconductor in the film 402 may absorb NIR and act as heat insulators, so that radiation of heat from the indoor environment is prevented from escaping.

Additionally, when the ambient temperature is high, the ambient temperature may provide sufficient thermal energy, i.e. thermal energy exceeding the predetermined level, so that the matrix or hydrogel switches to the translucent/opaque phase from the transparent phase. Conversely, when the ambient temperature becomes lower, the thermal energy provided may be less than the predetermined level, so the matrix or hydrogel switches to the transparent phase from the translucent/opaque phase.

As shown in FIG. 4, the transmittance of visible light through the film 402 may be controlled by the matrix or hydrogel, while the infrared radiation may be attenuated by the metal oxide semiconductor.

Effects of different atomic percent (at %) Sb doped tin oxide in PNIPAM may be investigated using UV-Vis-NIR spectrophotometer and a modified Xe lamp optical system. The optical switching behaviour, response rate, and solar modulation ability may be calculated based on the percentage power transmittance spectrum generated by the modified optical system. The influences of film thickness and different ATO content on the above parameters may also be investigated and evaluated at bench scale.

FIG. 5 is a schematic showing a setup 500 to study the switching behaviour, the response rate, and the modulation ability of the film according to various embodiments. The setup 500 may be an optical system including Xenon (Xe) lamp irradiation light source 502 (e.g. an UV enhanced 300 W Xe lamp), a sample holder 504 for holding the composite film, visible/near infrared (VIS/NIR) detector with attenuator 506, an optical power meter 508 connected to the detector 506, and a pyrometer or IR thermometer 510.

Figure 6A:
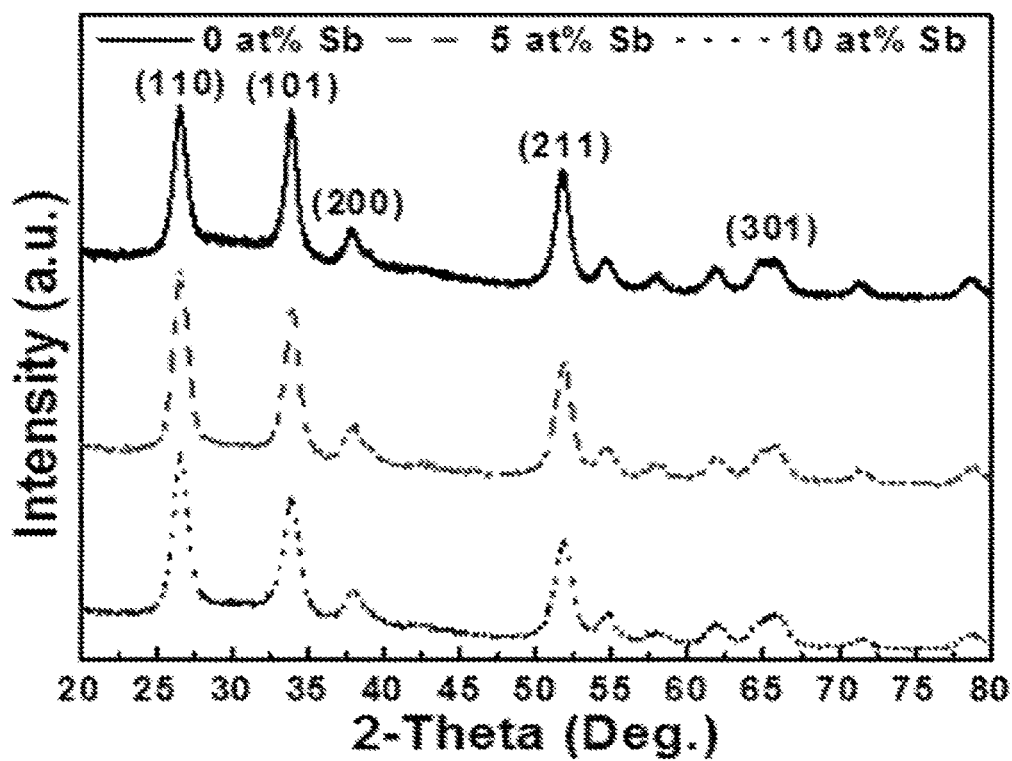
FIG. 6A is a plot of intensity (in arbitrary units or a.u.) as a function of 2-theta (in degrees or deg.) showing the X-ray Diffraction (XRD) patterns of various tin oxide doped with different percentages of antimony (Sb) according to various embodiments.

In this particular study, 0, 5, 10 and 15 atomic percent (at %) Sb doped ATO, i.e. including tin oxide or ATO with 0%, 5%, 10%, or 15% Sb, were prepared. The Sb doping was verified with X-ray Diffraction (XRD) as well as energy-dispersive X-ray spectroscopy (EDX) analysis. FIG. 6A is a plot 600a of intensity (in arbitrary units or a.u.) as a function of 2-theta (in degrees or deg.) showing the X-ray Diffraction (XRD) patterns of various tin oxide doped with different percentages of antimony (Sb) according to various embodiments. FIG. 6A shows the presence of only one crystalline phase, which is identified as bulk cassiterite ($SnO_2$) according to JCPDS card number 41-1445. Average crystallite size of 11.8, 10.3 and 8.9 nm are calculated for 0, 5 and 10 at % Sb doped tin oxide according to Scherrer's equation using full width at half maximum (FWHM) of (110) plane.

FIG. 6B is an energy-dispersive X-ray spectroscopy (EDX) table 600b showing nominal and actual antimony (Sb) doping content (in atomic percent or at %) in the synthesized antimony tin oxide (ATO) according to various embodiments. Antimony (Sb) and tin (Sn) are normalized in order to determine the actual Sb content present in ATO. The lower row may represent the actual atomic percentages of Sb present in the ATO films corresponding to the nominal atomic percentages highlighted in the upper row. Unless otherwise stated, the atomic percentage doping of a dopant, e.g. Sb, described herein may refer to the nominal atomic percentage doping. For instance, 15 at % Sb doped ATO may refer to a nominal 15% of Sb present in ATO.

Even with the addition of oleylamine as dispersion aid, it was found that 15 at % Sb doped ATO (i.e. nominal 15% Sb present in the ATO) could not be well dispersed in perchloroethylene for UV-Vis-NIR absorbance test. The aqueous dispersion of the ATO (with different amounts of doping of Sb) was then used for the preparation of PATO for similar optical characterization.

Figure 7:
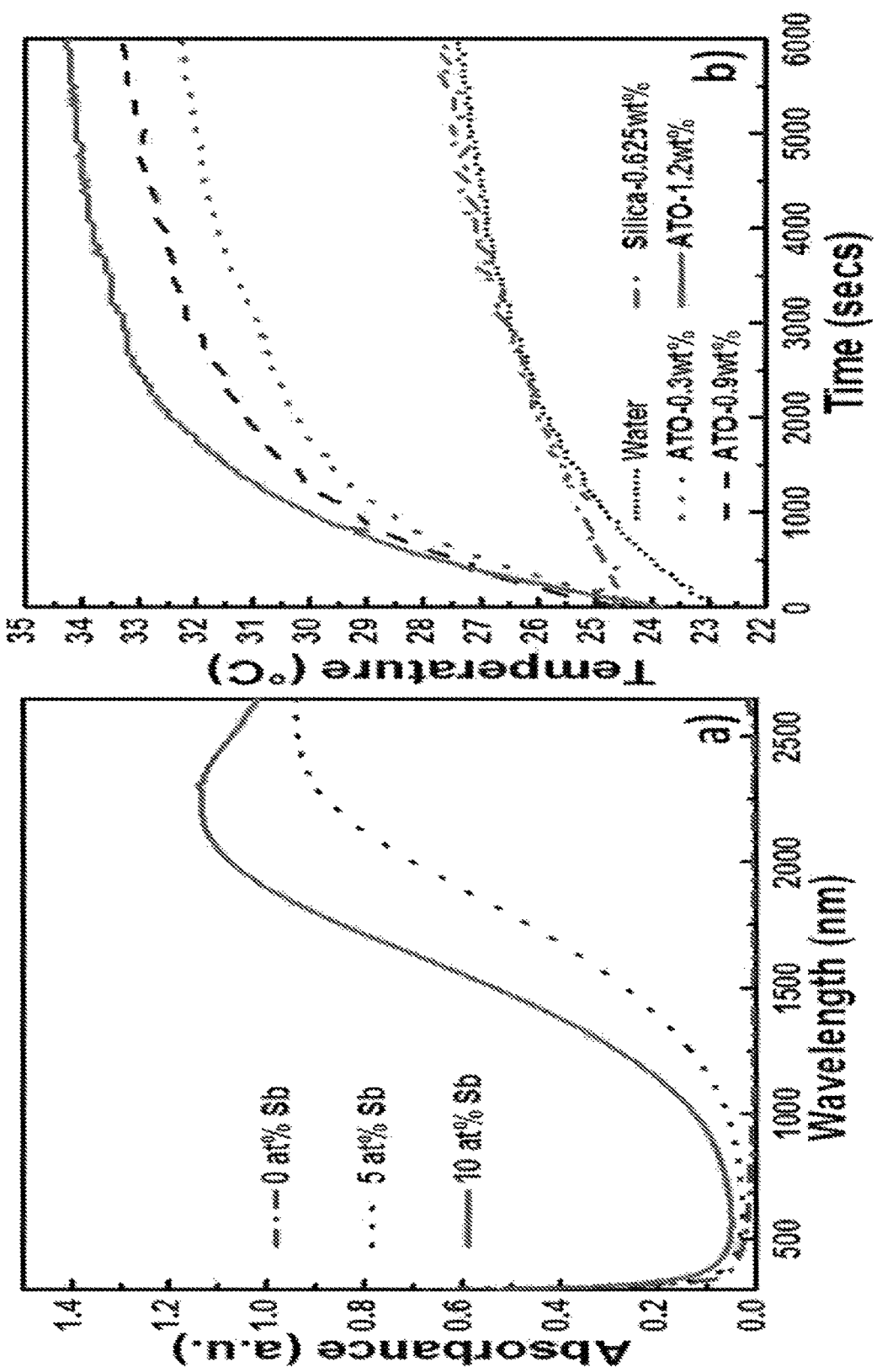
FIG. 7 shows (a) a plot of absorbance (in arbitrary units or a.u.) as a function of wavelength (in nanometers or nm) illustrating ultraviolet-visible-near infrared (UV-Vis-NIR) absorbance spectra of tin oxide ($SnO_2$) dispersed in perchloroethylene solvent with antimony (Sb) doping contents of 0 atomic percent, 5 atomic percent, and 10 atomic percent (at %) according to various embodiments, and (b) a plot of temperature (in degree Celsius or ° C.) as a function of time (seconds or secs) illustrating photothermal heating temperature profiles for de-ionized water, aqueous dispersion of silica and aqueous dispersions of different weight percentage (wt %) of antimony tin oxide (ATO) according to various embodiments exposed to irradiation at 1 sun intensity.

FIG. 7 shows (a) a plot of absorbance (in arbitrary units or a.u.) as a function of wavelength (in nanometers or nm) illustrating ultraviolet-visible-near infrared (UV-Vis-NIR) absorbance spectra of tin oxide ($SnO_2$) dispersed in perchloroethylene solvent with antimony (Sb) doping contents of 0 atomic percent, 5 atomic percent, and 10 atomic percent (at %) according to various embodiments, and (b) a plot of temperature (in degree Celsius or ° C.) as a function of time (seconds or secs) illustrating photothermal heating temperature profiles for de-ionized water, aqueous dispersion of silica and aqueous dispersions of antimony tin oxide (ATO of different weight percentage (wt %)) according to various embodiments exposed to irradiation at 1 sun intensity.

From FIG. 7(a), ATO absorbs at (>1500 nm) in the NIR region and this absorption can be attributed to the LSPR in ATO as a result of n-type doping. This implies that ATO absorbs the NIR portion of the Xe lamp irradiation (200 to 2400 nm) and converts the absorbed radiation to heat in order to induce PNIPAM optical switching. It is important to note that by increasing the Sb dopant content in tin oxide ($SnO_2$) till 10 at %, free electron concentration increases, leading to enhanced NIR absorption efficiency as evident from FIG. 7(a).

It is also found that 10 at % Sb doped ATO generally shows a better NIR shielding effect as compared to 15 at % Sb doped ATO. This observation shows that 10 at % Sb doped ATO may be the optimum doping ratio for NIR shielding applications, which is in line with previous reports relating to ATO. Hence, the solar modulation ability as well as response rate of 15 at % Sb doped ATO are not further investigated. 10 at % Sb doped ATO is then chosen for further investigations of photothermal heating. In various embodiments, the composite film may include or may be poly(N-isopropylacrylamide) (PNIPAM) hydrogel with 10 atomic percent (at. %) doped antimony tin oxide (ATO), i.e. tin oxide doped with 10 at. % antimony.

As depicted in FIG. 7(b), both pure water and silica aqueous dispersion shows similar mild increment in temperature of about 3 to 4° C. at 1 sun irradiation intensity, whereas the temperature of the 1.2 wt % aqueous ATO dispersion increased from 23.8 to 34.2° C. ($\Delta T=10.4°$ C.). This implies that ATO is capable of converting the absorbed solar irradiation into heat, otherwise known as the photothermal effect. Furthermore, with the increment in ATO content from 0.3 to 1.2 wt %, an increase in the saturation temperature is also observed.

Optical properties such as the switching behavior, solar modulation ability and response rate have been evaluated based on the transmittance spectra generated based on the setup shown in FIGS. 5A-B. For sample identification, symbols of x and y in PATO-x-y respectively represents different ATO content and film thickness. For example, PATO-2-80 indicates 2 mg mL$^{-1}$ of ATO in 80 μm thick PNIPAM-antimony tin oxide composite film. A similar notation applies for PNIPAM/GO (PGO) nanocomposite films.

Figure 8A:
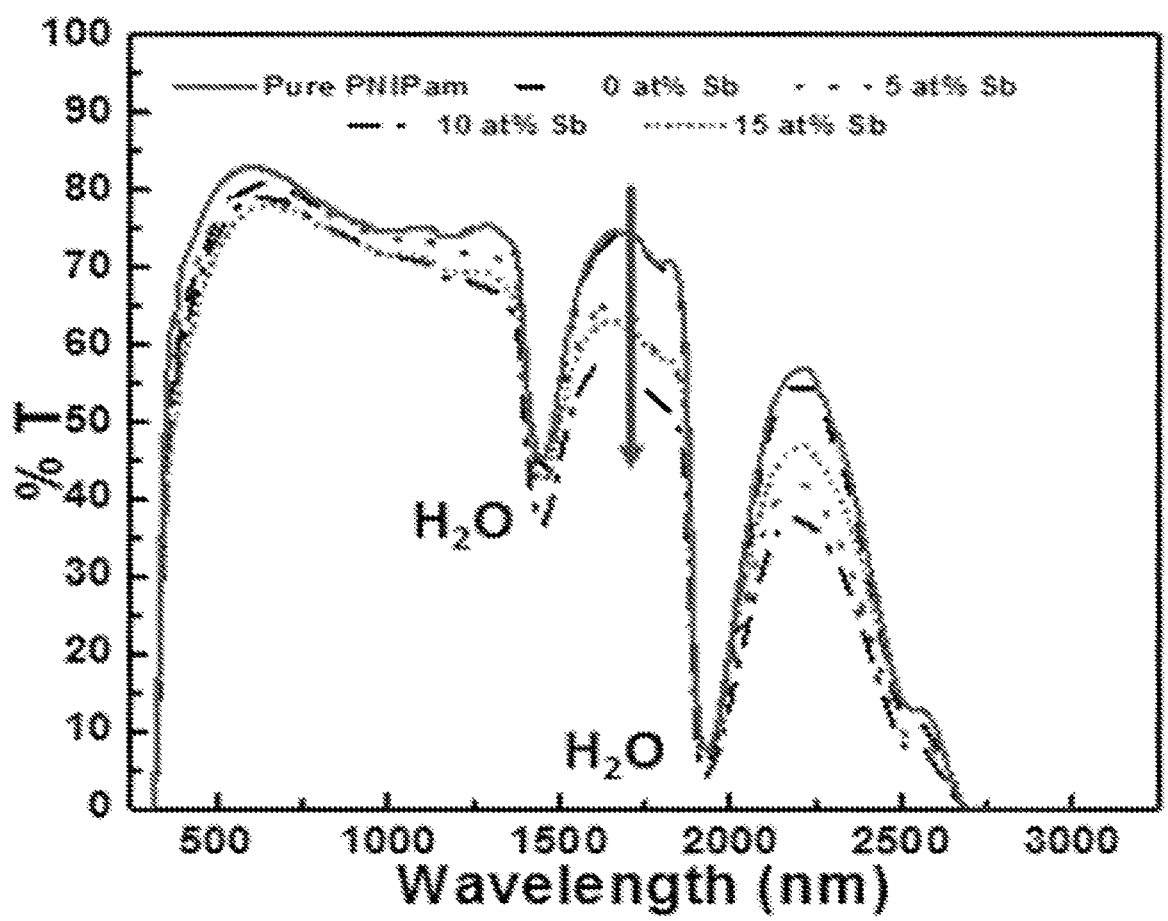
FIG. 8A is a plot of percentage transmittance (% T) as a function of wavelength (in manometers or nm) showing the ultraviolet-visible-near infrared (UV-Vis-NIR) spectra of nanocomposite films with different antimony doping content according to various embodiments in the clear or transparent state.
Figure 8B:
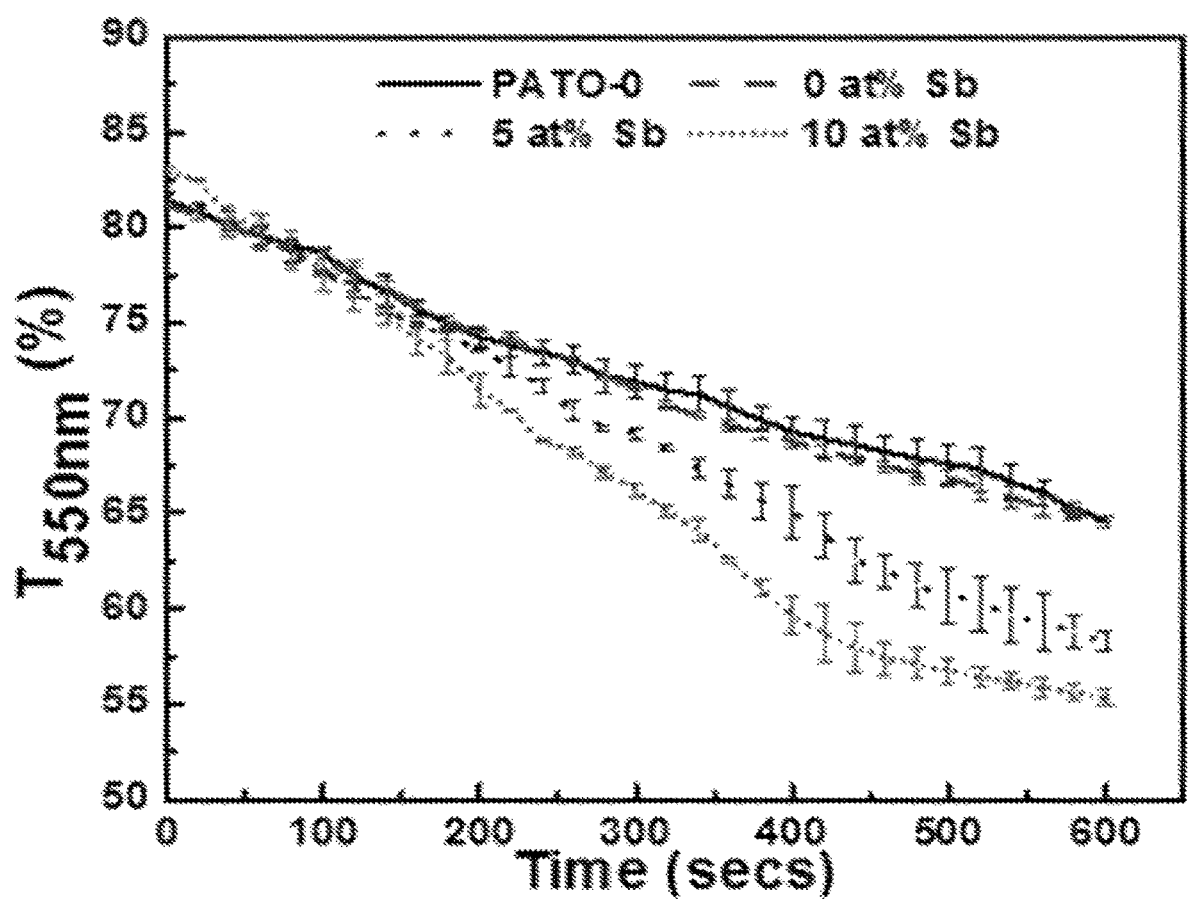
FIG. 8B is a plot of percentage transmittance (% T) as a function of time (in seconds or secs) showing the transmittance of 550 nm light through the nanocomposite films with different antimony doping content according to various embodiments with time.
Figure 8C:
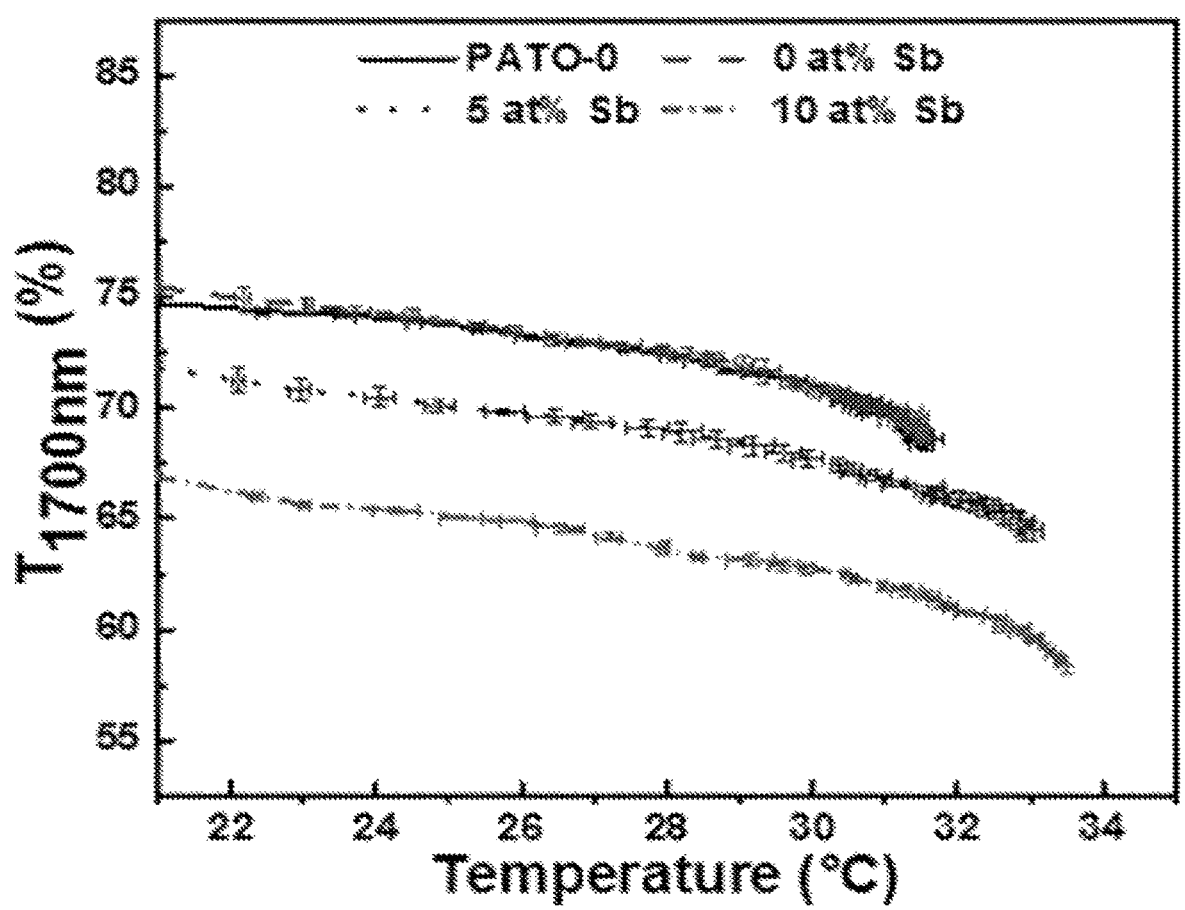
FIG. 8C is a plot of percentage transmittance (% T) as a function of temperature (in degree Celsius or ° C.) showing the transmittance of 1700 nm light through the nanocomposite films with different antimony doping content according to various embodiments with temperature.

FIGS. 8A-C show optical properties of 180 μm thick hydrogel films incorporating 1.2 mg mL$^{-1}$ of ATO with different at % Sb doping and irradiated with Xe lamp at 1 sun intensity for 10 min. PATO-0 in FIGS. 8B and 8C refers to neat or pure PNIPAM without antimony tin oxide.

FIG. 8A is a plot 800a of percentage transmittance (% T) as a function of wavelength (in nanometers or nm) showing the ultraviolet-visible-near infrared (UV-Vis-NIR) spectra of nanocomposite films with different antimony doping content according to various embodiments in the clear or transparent state. In other words, the tin oxide may be doped with different amounts of antimony. The nanocomposite films may be in the clear or transparent state when the matrix or hydrogel are in the transparent phase. The nanocomposite films may be in the translucent/opaque state when the matrix or hydrogel are in the translucent/opaque phase.

FIG. 8B is a plot 800b of percentage transmittance (% T) as a function of time (in seconds or secs) showing the transmittance of 550 nm light through the nanocomposite films with ATO of different antimony doping content according to various embodiments with time.

FIG. 8C is a plot 800c of percentage transmittance (% T) as a function of temperature (in degree Celsius or ° C.) showing the transmittance of 1700 nm light through the nanocomposite films with ATO of different antimony doping content according to various embodiments with temperature.

Figure 9:
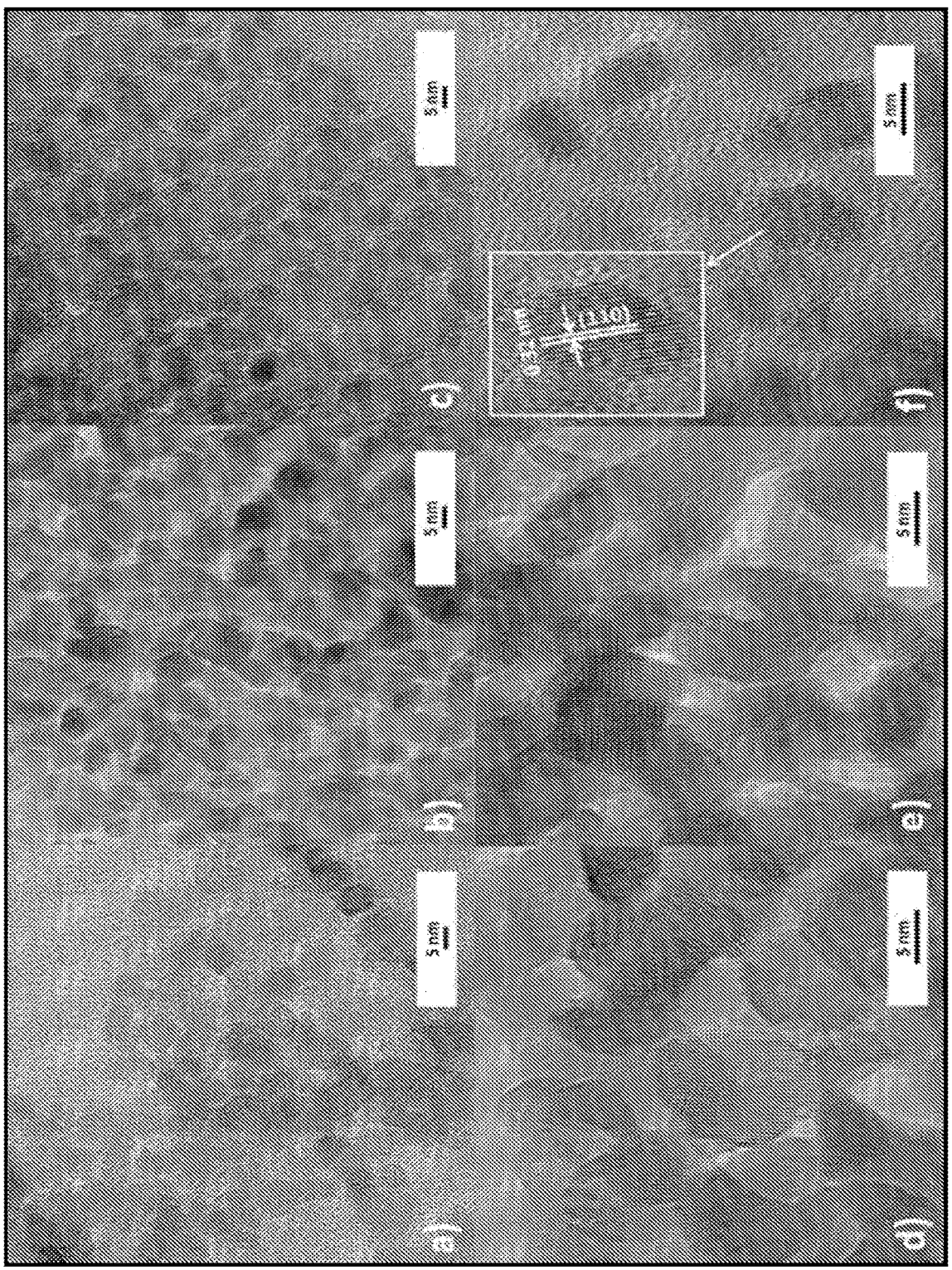
FIG. 9 shows high resolution-transmission electron microscopy (HR-TEM) images of as synthesized a) 0, b) 5 and c) 10 atomic percent (at %) antimony (Sb) doped antimony tin oxide (ATO) at 25 k magnification as well as d) 0, e) 5 and f) 10 at % antimony (Sb) doped antimony tin oxide (ATO) at 60 k magnification.

FIG. 9 shows high resolution-transmission electron microscopy (HR-TEM) images of as synthesized a) 0, b) 5 and c) 10 atomic percent (at %) antimony (Sb) doped antimony tin oxide (ATO) at 25 k magnification as well as d) 0, e) 5 and f) 10 at % antimony (Sb) doped antimony tin oxide (ATO) at 60 k magnification. FIG. 9 shows the different at % Sb doped ATO are single crystalline and predominantly spherical. ATO nanoparticles with average size of about 12.1, 11.4 and 9.0 nm for Sb doping content of 0, 5 and 10 at % are observed respectively, which agrees well with the calculated crystallite size from XRD pattern. An interplanar distance of 3.0 Å is measured for 10 at % Sb doped ATO particles (FIG. 9f). This corresponds well with the reported interplanar distance for (110) plane in cassiterite $SnO_2$.

High initial visible transmittance for PATO films including tin oxide or antimony tin oxide having different atomic percentages doping of Sb can be seen from FIG. 8A. This can be attributed to the small ATO nanoparticle size of less than 13 nm as well as the good dispersion state. The 0 at % Sb doped PATO (i.e. film including pure tin oxide nanostructures without Sb) UV-Vis-NIR spectra overlaps with that of neat PNIPAM (i.e. film without nanostructures containing metal oxide semiconductors) especially in the NIR region and shows little or no enhanced NIR shielding effect as evident from FIG. 8A.

Furthermore, with increases in Sb doping content till 10 at %, $SnO_2$ transmittance monotonically decreases in the NIR region. However, further increases of Sb doping till 15 at % result in a higher transmittance in the NIR region. This phenomenon can be attributed to the multivalent nature of Sb dopant which exists in both $Sb^{3+}$ acceptor and $Sb^{5+}$ donor states. Higher Sb doping content may tend to result in higher concentration of $S^{3+}$ ions, creating acceptor states which trap the electrons and reduce the effective charge carrier concentration contributed by $Sb^{5+}$ ions. The 2 prominent peaks observed at 1460 nm and 1935 nm may arise from the hydrogen bonds due to the water that is entrapped within PNIPAM. Hence, for the subsequent photo responsive characterization, the detector may be set to detect at 550 nm and 1700 nm in order to avoid any interference from the hydrogen bond peaks.

Figure 10A:
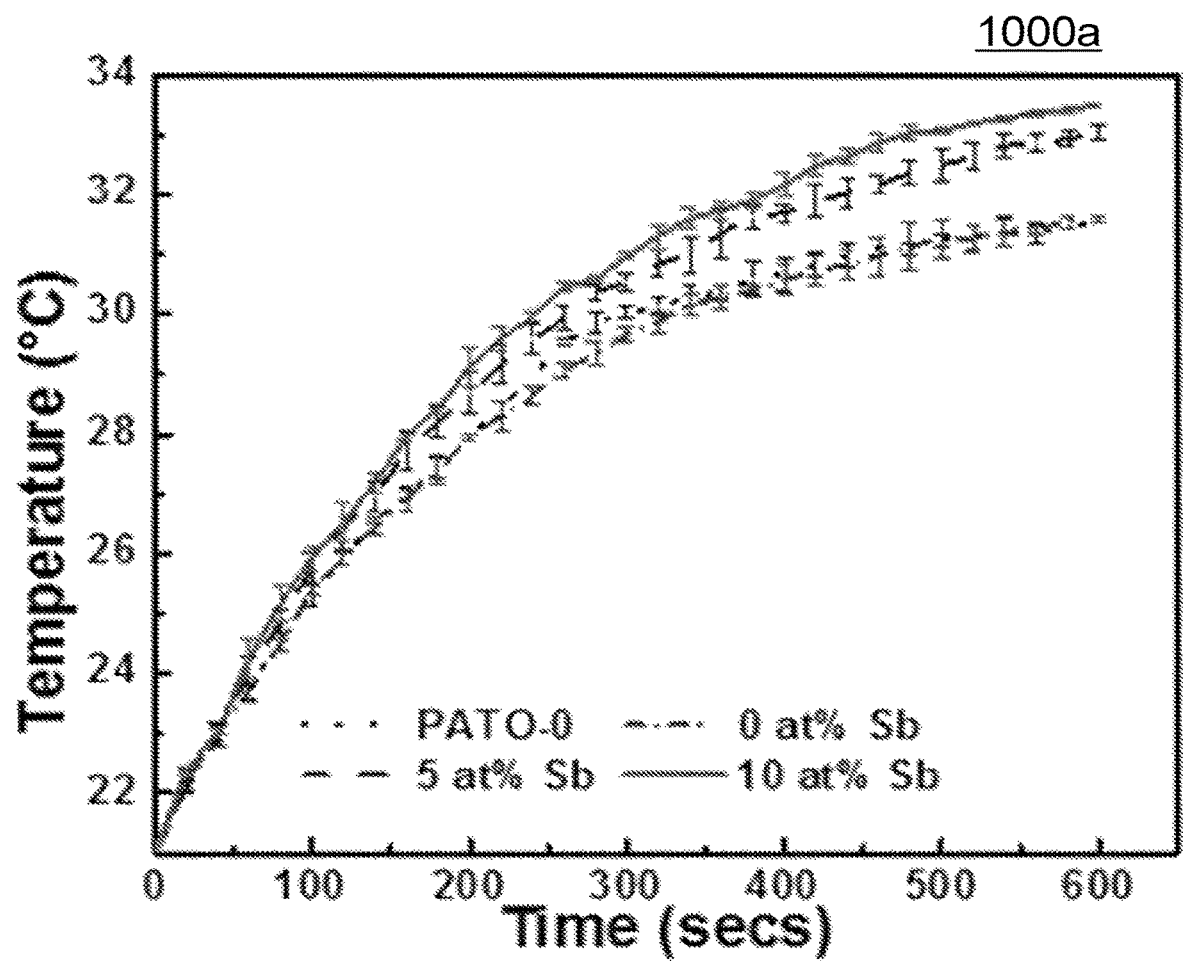
FIG. 10A is a plot of temperature (in degree Celsius or ° C.) as a function of time (in seconds or secs) showing the photothermal heating temperature profile of composite photothermotropic poly(N-isopropylacrylamide)/antimony tin oxide (PATO) films with 1.2 mg $mL^{-1}$ of antimony tin oxide (ATO) in 180 μm thick of poly(N-isopropylacrylamide) (PNIPAM), i.e. PATO-1.2-180, in which the antimony tin oxide (ATO) are doped with different amounts of antimony (Sb) according to various embodiments.

FIG. 10A is a plot 1000a of temperature (in degree Celsius or ° C.) as a function of time (in seconds or secs) showing the photothermal heating temperature profile of composite photothermotropic poly(N-isopropylacrylamide)/antimony tin oxide (PATO) films with 1.2 mg mL$^{-1}$ of antimony tin oxide (ATO) in 180 μm thick poly(N-isopropylacrylamide) (PNIPAM), i.e. PATO-1.2-180, in which the antimony tin oxide (ATO) are doped with different amounts of antimony (Sb) according to various embodiments. PATO-0 refers to neat or pure PNIPAM without antimony tin oxide, and 0% Sb refers to a film including tin oxide without antimony doping. A film including 1.2 mg mL$^{-1}$ of antimony tin oxide (ATO) may refer to a film formed from a pre-gel mixture of 1.2 milligram (mg) ATO per milliliter (mL) of the pre-gel.

Figure 10B:
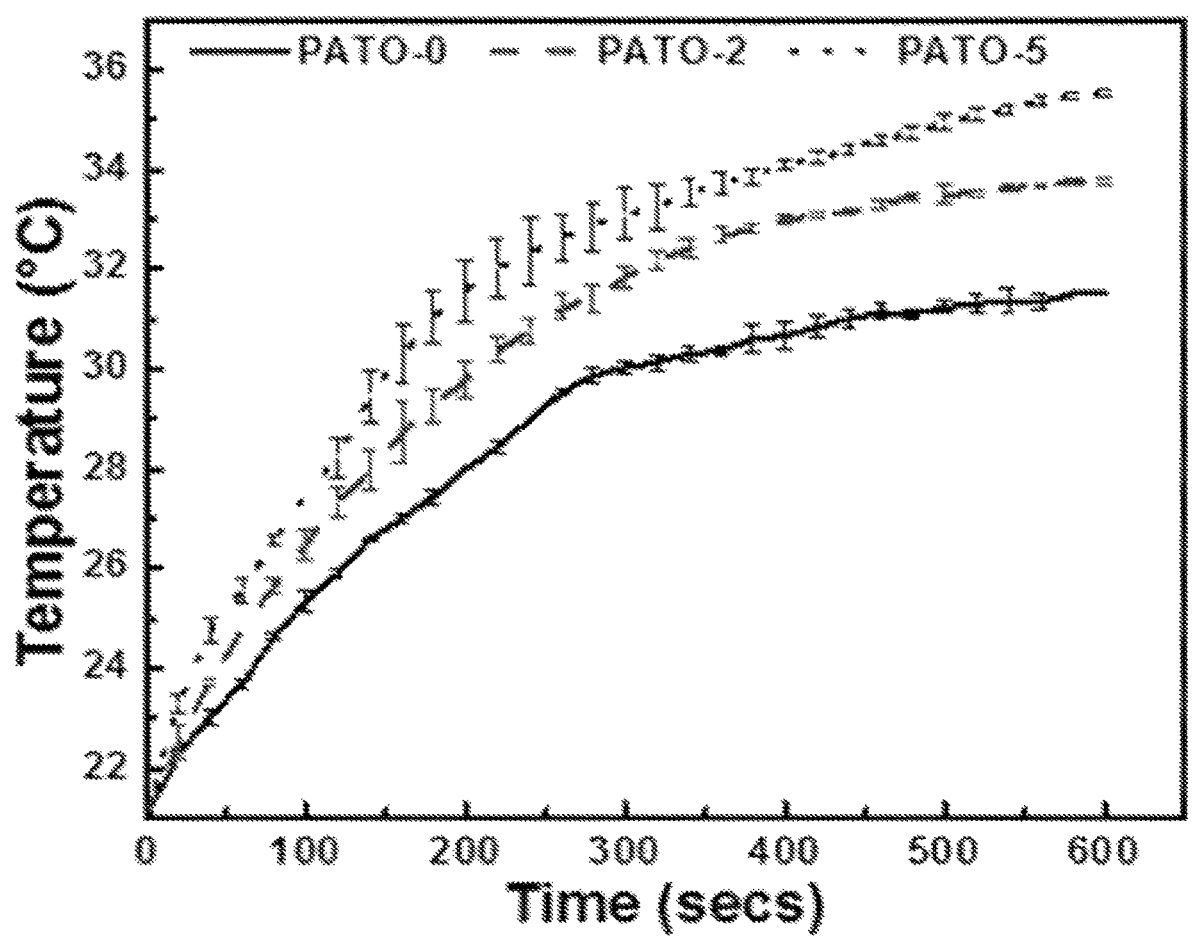
FIG. 10B is a plot of temperature (in degree Celsius or ° C.) as a function of time (in seconds or secs) showing the photothermal heating temperature profile of composite photothermotropic poly(N-isopropylacrylamide)/antimony tin oxide (PATO) films with different concentrations of antimony tin oxide (ATO) in 180 μm thick of poly(N-isopropylacrylamide), i.e. PATO-x-180, according to various embodiments.

FIG. 10B is a plot 1000b of temperature (in degree Celsius or ° C.) as a function of time (in seconds or secs) showing the photothermal heating temperature profile of composite photothermotropic poly(N-isopropylacrylamide)/antimony tin oxide (PATO) films with different concentrations (in mg mL$^{-1}$) of antimony tin oxide (ATO) in 180 μm thick poly(N-isopropylacrylamide), i.e. PATO-x-180, according to various embodiments.

Figure 10C:
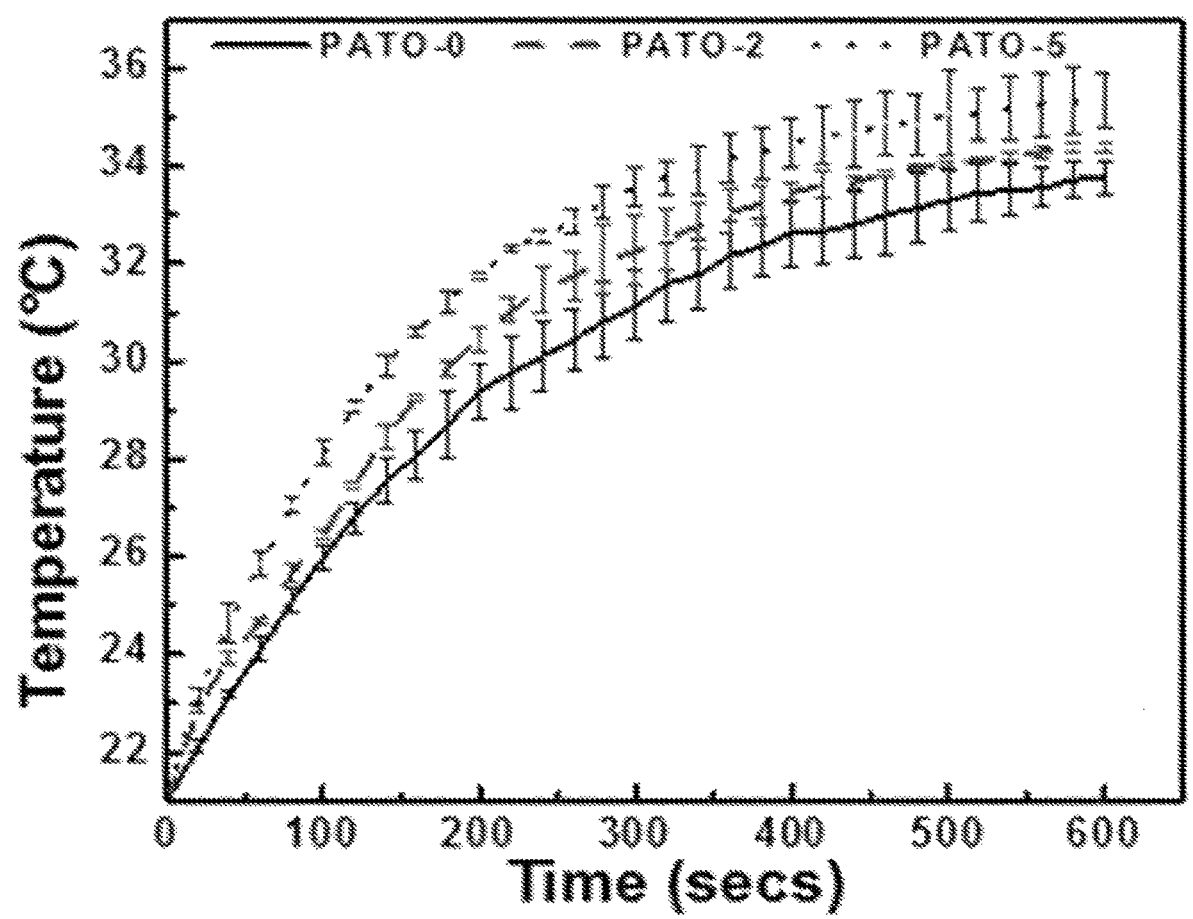
FIG. 10C is a plot of temperature (in degree Celsius or ° C.) as a function of time (in seconds or secs) showing the photothermal heating temperature profile of composite photothermotropic poly(N-isopropylacrylamide)/antimony tin oxide (PATO) films with different concentrations of antimony tin oxide (ATO) in 80 μm thick of poly(N-isopropylacrylamide), i.e. PATO-x-80, according to various embodiments.

FIG. 10C is a plot 1000c of temperature (in degree Celsius or ° C.) as a function of time (in seconds or secs) showing the photothermal heating temperature profile of composite photothermotropic poly(N-isopropylacrylamide)/antimony tin oxide (PATO) films with different concentrations (in mg mL$^{-1}$) of antimony tin oxide (ATO) in 80 μm thick poly(N-isopropylacrylamide), i.e. PATO-x-80, according to various embodiments.

Figure 10D:
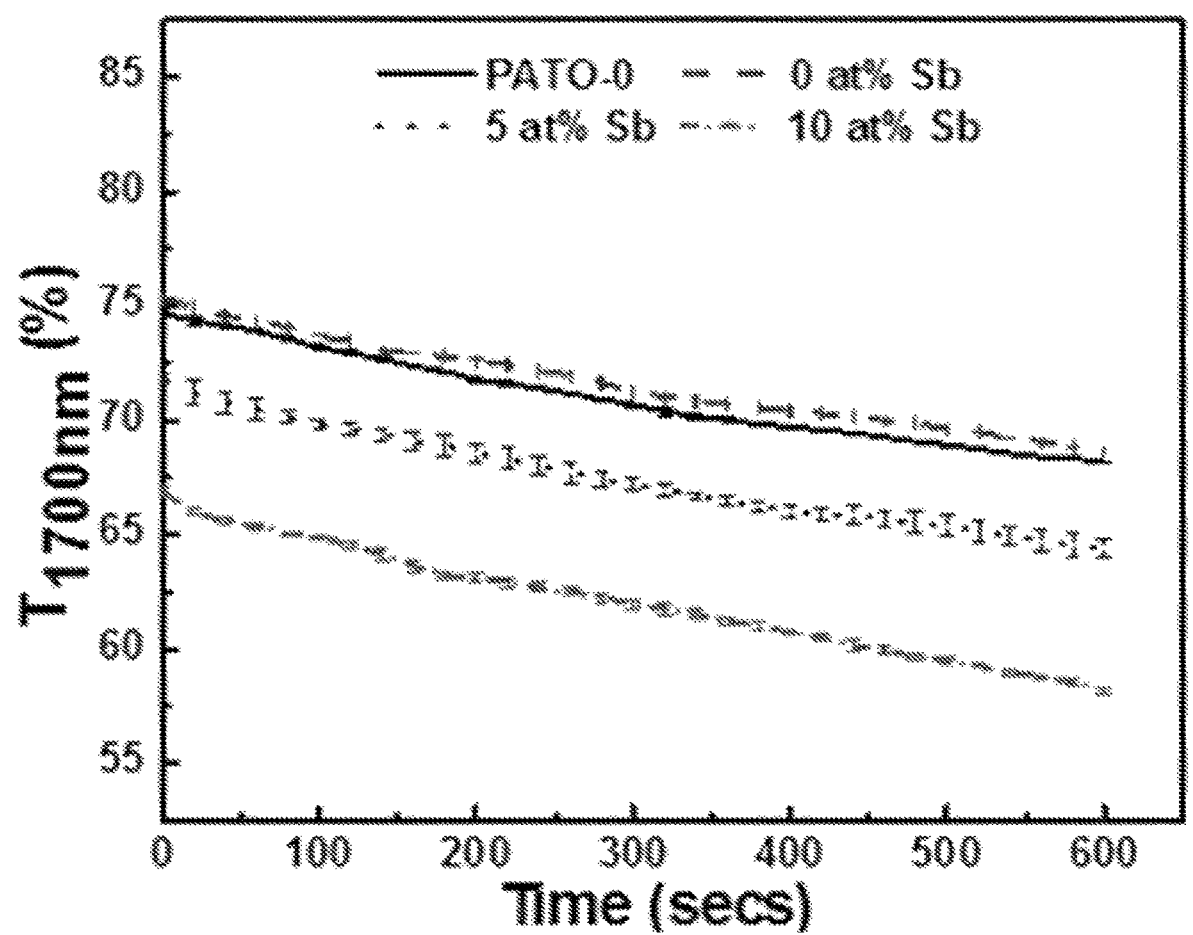
FIG. 10D is a plot of percentage transmittance (% T) as a function of time (in seconds or secs) showing the transmittance of 1700 nm light through nanocomposite films with 1.2 mg $mL^{-1}$ of antimony tin oxide (ATO) in 180 μm thick of poly(N-isopropylacrylamide) (PNIPAM), i.e. PATO-1.2-180, in which the antimony tin oxide (ATO) are doped with different amounts of antimony (Sb) according to various embodiments.

FIG. 10D is a plot 1000d of percentage transmittance (% T) as a function of time (in seconds or secs) showing the transmittance of 1700 nm light through nanocomposite films with 1.2 mg mL$^{-1}$ of antimony tin oxide (ATO) in 180 μm thick poly(N-isopropylacrylamide) (PNIPAM), i.e. PATO-1.2-180, in which the antimony tin oxide (ATO) are doped with different amounts of antimony (Sb) according to various embodiments. PATO-0 refers to neat or pure PNIPAM without antimony tin oxide, and 0% Sb refers to a film including tin oxide without antimony doping.

Figure 10E:
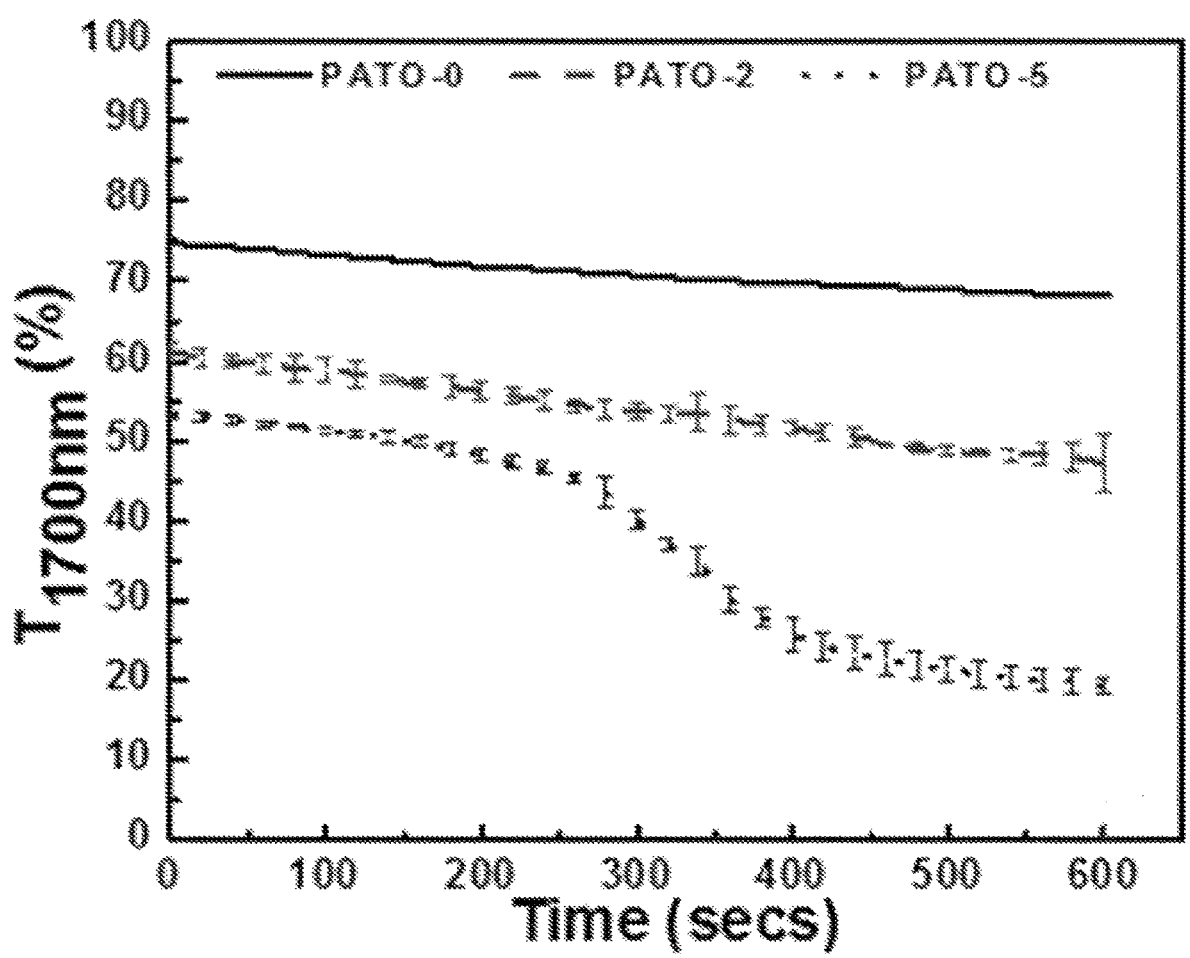
FIG. 10E is a plot of percentage transmittance (% T) as a function of time (in seconds or secs) showing the transmittance of 1700 nm light through nanocomposite films with different concentrations of antimony tin oxide (ATO) in 180 μm thick of poly(N-isopropylacrylamide), i.e. PATO-x-180, according to various embodiments.

FIG. 10E is a plot 1000e of percentage transmittance (% T) as a function of time (in seconds or secs) showing the transmittance of 1700 nm light through nanocomposite films with different concentrations (in mg mL$^{-1}$) of antimony tin oxide (ATO) in 180 μm thick poly(N-isopropylacrylamide), i.e. PATO-x-180, according to various embodiments.

Figure 10F:
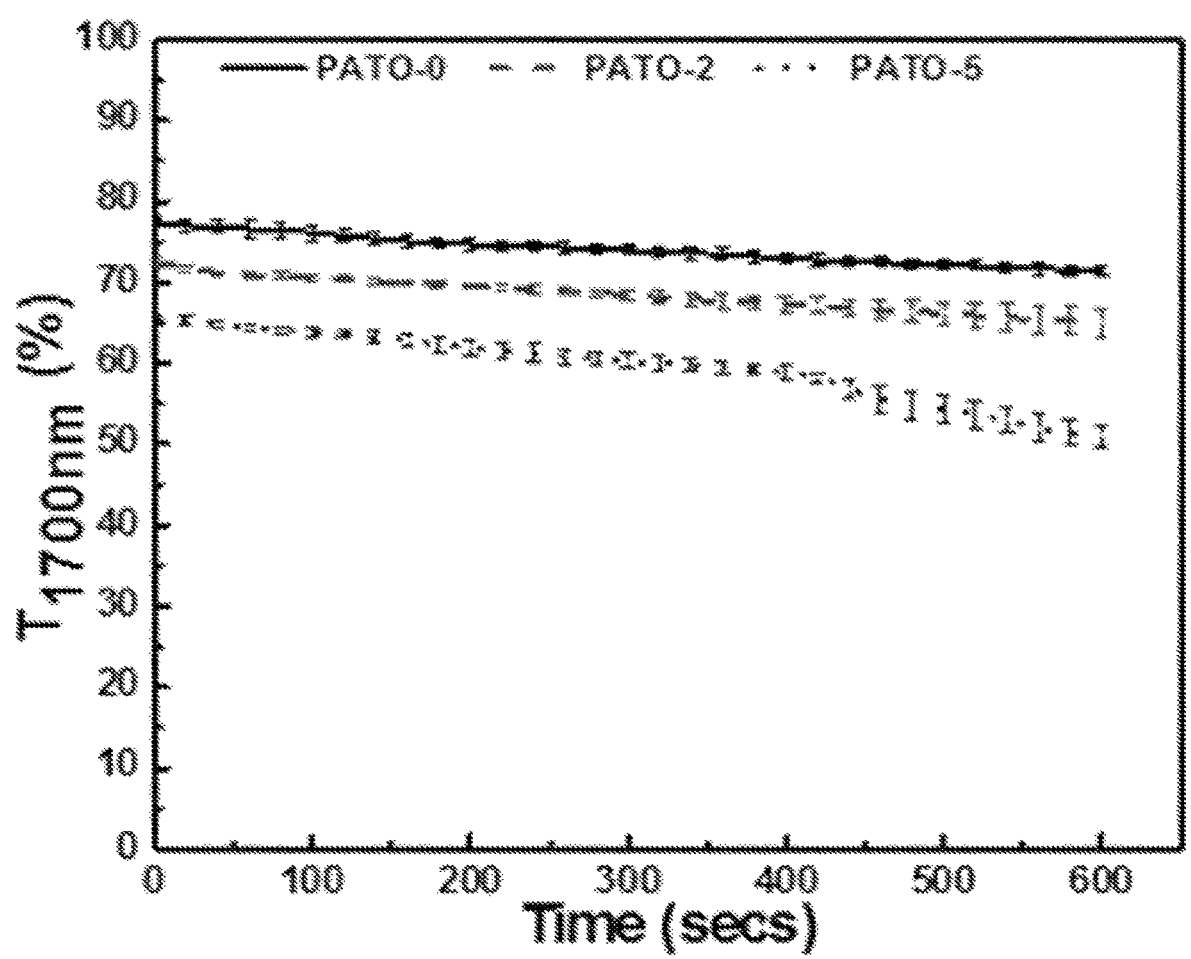
FIG. 10F is a plot of percentage transmittance (% T) as a function of time (in seconds or secs) showing the transmittance of 1700 nm light through nanocomposite films with different concentrations of antimony tin oxide (ATO) in 80 μm thick of poly(N-isopropylacrylamide), i.e. PATO-x-80, according to various embodiments.

FIG. 10F is a plot 1000f of percentage transmittance (% T) as a function of time (in seconds or secs) showing the transmittance of 1700 nm light through nanocomposite films with different concentrations (in mg mL$^{-1}$) of antimony tin oxide (ATO) in 80 μm thick poly(N-isopropylacrylamide), i.e. PATO-x-80, according to various embodiments.

FIG. 10A shows that PATO films with 10 at % Sb doped ATO exhibit the largest extent of photothermal heating. After 10 min of irradiation, films with 0, 5 and 10 at % Sb doped tin oxide or ATO show a rise of 10.6, 11.4 and 12.5° C. respectively. As expected, the PATO-1.2-180 sample including 0 at % doped tin oxide (i.e. film including pure tin oxide nanostructures without Sb) show a photothermal heating temperature profile more similar or closer to that of neat PNIPAM film (PATO-0), compared to the samples with 5 at % Sb doped ATO and 10 at % Sb doped ATO.

The PATO-1.2-180 film with 10 at % Sb doped ATO also exhibited the best solar modulation ability as well as highest response rate in both the visible and NIR region. After irradiation on the PATO-1.2-180 film with 10 at % Sb doped ATO for 10 minutes, transmittance of the film at 550 nm decreases from 83.0% to 55.3%, (ΔT %=27.7) in the visible region, and from 66.9% to 58.2%, (ΔT %=8.7) in the NIR region. This indicates that PATO predominantly modulates in the visible region rather than in the NIR region, similar to what has been previously observed. However, for the PATO-1.2-180 film with 0 at % Sb doped tin oxide, visible transmittance only decreased from 81.1% to 64.6%, (ΔT %=16.5) and from 75.4% to 68.6%, (ΔT %=6.8) for the NIR region. By changing the ATO doping content from 0 to 10 at %, a solar modulation improvement of 1.7 and 1.3 times may be observed for the visible and NIR regions respectively. Furthermore, an improved response rate of 2 times and 1.5 times may also be achieved for the visible and NIR regions respectively.

Due to PNIPAM amphilphilic behavior, it is well known that below the lower critical solution temperature (LCST), polymer-polar solvent interactions such as polymer-water interactions, e.g. hydrogen bonding of PNIPAM hydrophilic groups, dominate. Hence, polar swelling agents such as water tend to be good solvents for the PNIPAM chains as the hydrogel chains are extended in the agents. In this state, the hydrogel appears transparent. However, nearing the transition temperature, destabilization of polymer hydrogen bonding occurs and onset of coil-globule transition takes place. This phase separation between the polymer chains and swelling agent results in light scattering domains, causing a change from transparent phase to opaque or translucent phase.

From FIG. 8C, it is observed that optical switching may not have taken place even with irradiation of PATO with the optimized doping content of 10 at % Sb and 1.2 mg mL$^{-1}$ ATO filler content at 1 sun intensity. The percentage transmission decreases gradually with increase in temperature and there is no abrupt change in gradient. The photothermal effect of PATO may be enhanced by increasing the filler content of 10 at % Sb ATO in 180 μm films in order to induce the optical switching. In contrast, as highlighted below, the percentage transmittance at 550 nm shows a significant decrease (i.e. abrupt change in gradient attributed to optical switching) at around 32° C., which corresponds to the LCST of the hydrogel.

Figure 11A:
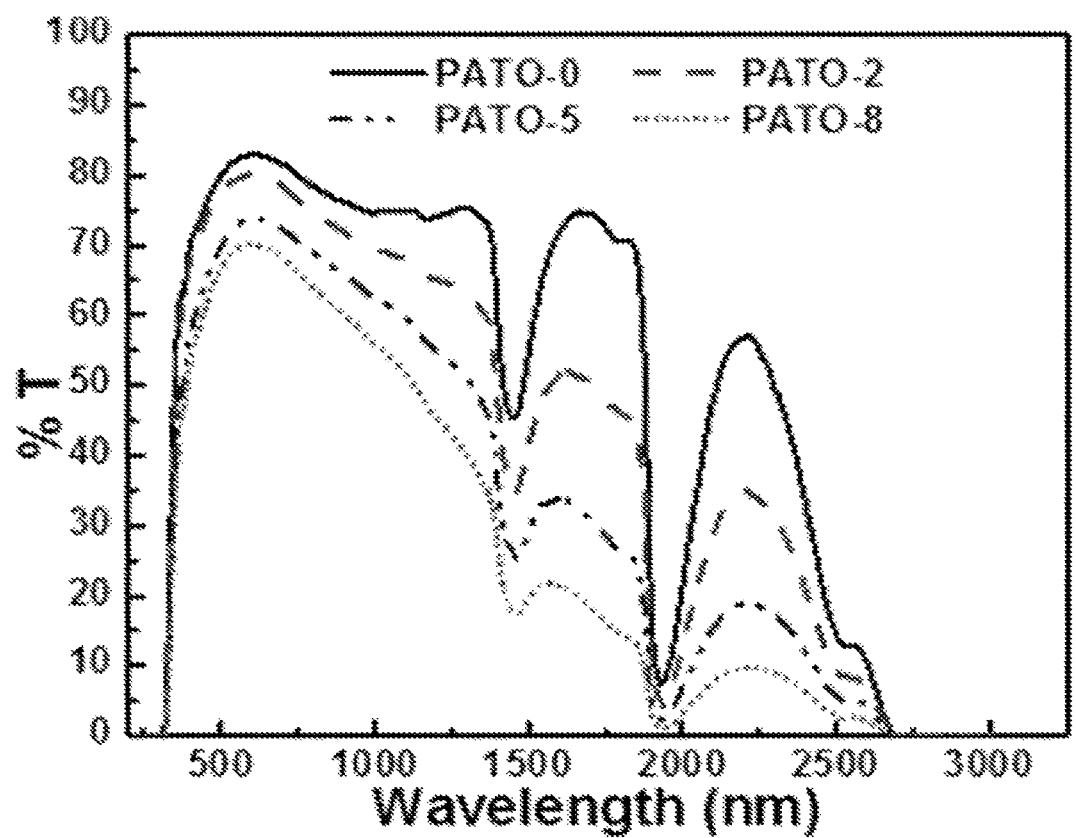
FIG. 11A is a plot of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments.

FIG. 11A is a plot 1100a of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments.

Figure 11B:
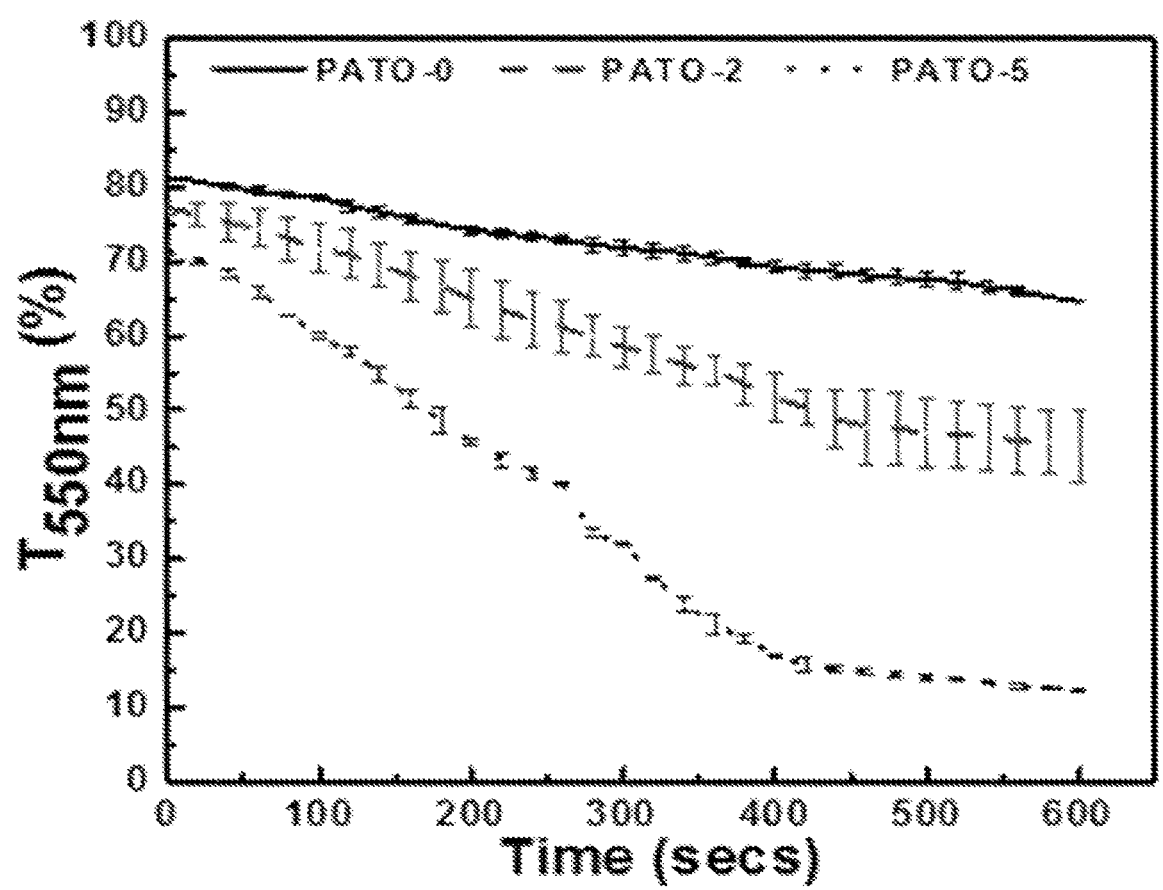
FIG. 11B is a plot of percentage transmittance (% T) as a function of time (in seconds or secs) showing the transmittance of 550 nm light through the nanocomposite films with different antimony tin oxide (ATO) filler content according to various embodiments with time.

FIG. 11B is a plot 1100b of percentage transmittance (% T) as a function of time (in seconds or secs) showing the transmittance of 550 nm light through the nanocomposite films with different antimony tin oxide (ATO) filler content according to various embodiments with time.

Figure 11C:
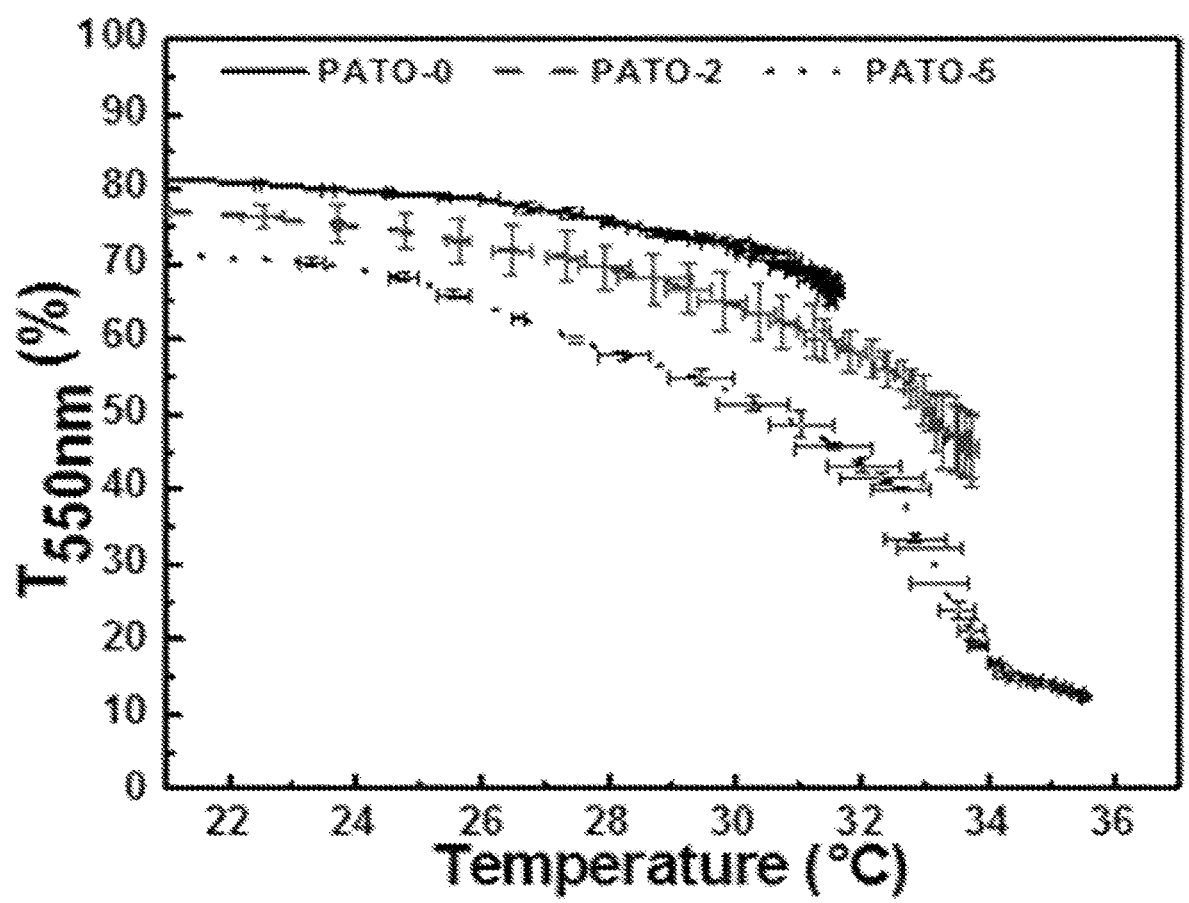
FIG. 11C is a plot of percentage transmittance (% T) as a function of temperature (in degree Celsius or ° C.) showing the transmittance of 550 nm light through the nanocomposite films with different antimony tin oxide (ATO) filler content according to various embodiments at different temperatures.

FIG. 11C is a plot 1100c of percentage transmittance (% T) as a function of temperature (in degree Celsius or ° C.) showing the transmittance of 550 nm light through the nanocomposite films with different antimony tin oxide (ATO) filler content according to various embodiments at different temperatures.

Figure 11D:
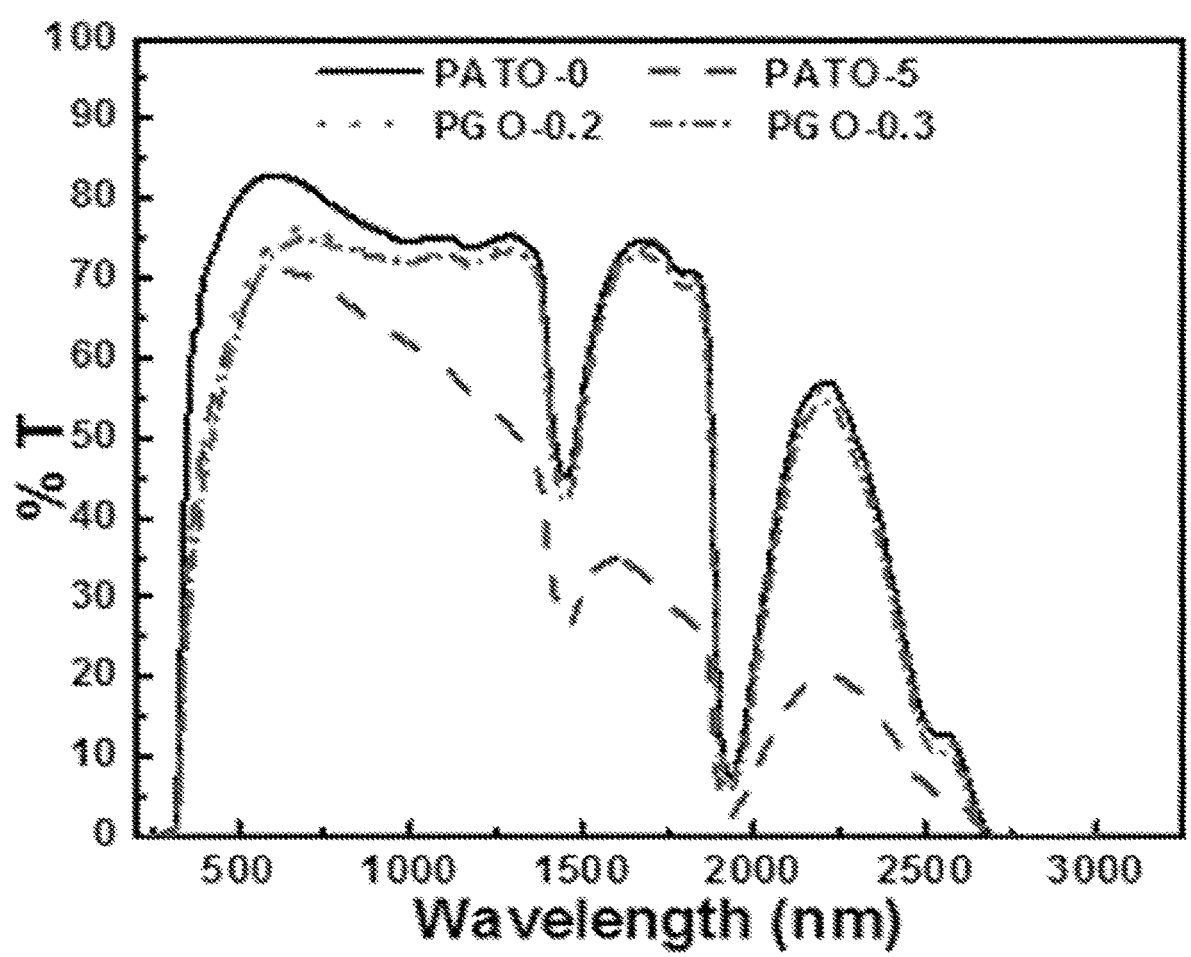
FIG. 11D is a plot of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments and poly(N-isopropylacrylamide)/graphene oxide (PGO) composite films.

FIG. 11D is a plot 1100d of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments and poly(N-isopropylacrylamide)/graphene oxide (PGO) composite films. In the NIR region, monotonically decreasing transmittance with increasing ATO content can be observed from the UV-Vis-NIR spectra in FIG. 11A.

Figure 12:
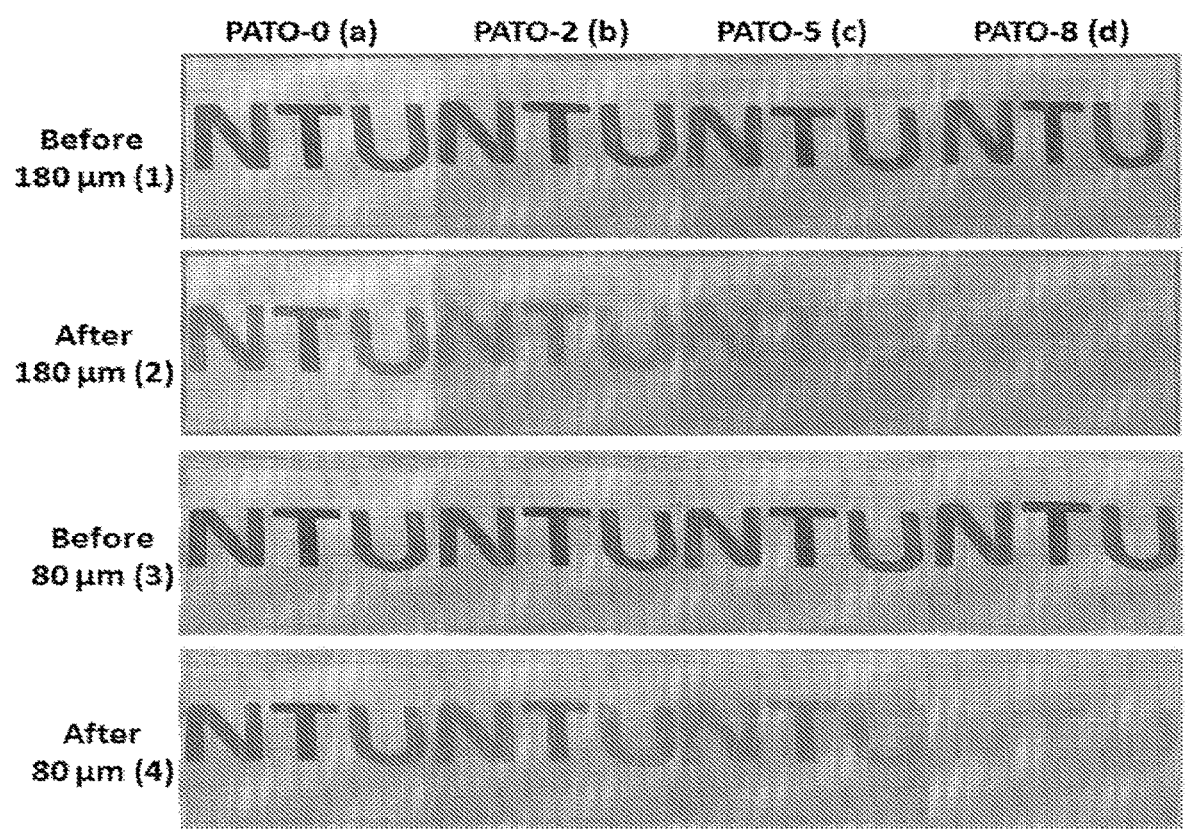
FIG. 12 show photographic images of nanocomposite hydrogel films according to various embodiments positioned over the phrase "NTU" showing the degree of transparency of the films before and after irradiation.

FIG. 12 shows photographic images of nanocomposite hydrogel films according to various embodiments positioned over the phrase "NTU" showing the degree of transparency of the films before and after irradiation. The "before" images relate to films before irradiation, and the "after" images relate to films after irradiation for 10 minutes. Columns (a-d) relate to films with ATO content of 0, 2, 5 and 8 mg mL$^{-1}$ respectively. Rows (1) and (2) depict nanocomposite hydrogel of 180 μm in the clear and translucent/opaque phase/state, while rows (3) and (4) show that of the 80 μm thick films.

Although PATO-8-180 film shows a relatively high visible transmittance and NIR shielding effect, a highly opaque or translucent state which obstructs visuality could be observed in the film after irradiation for 10 min.

Before irradiation, the neat PNIPAM appears colorless and transparent, while the PATO is transparent with a slight tint of blue due to the presence of ATO nanoparticles. This slight tint of blue can be attributed to absorption of free carrier plasma excitation at near 1.5 eV. After irradiation for 10 min, a higher degree of opacity can be observed with increasing ATO content or film thickness.

Figure 13:
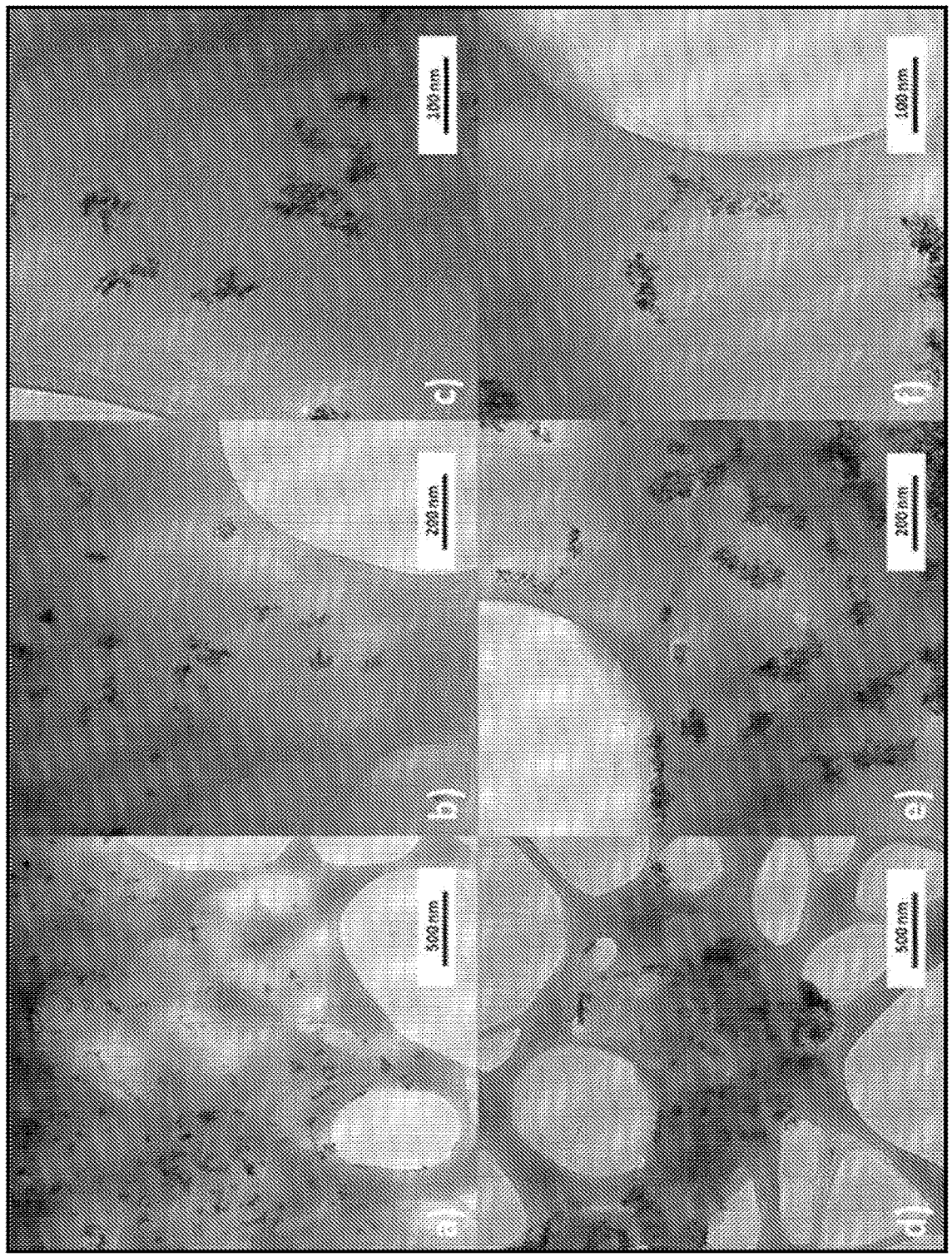
FIG. 13 shows transmission electron microscopy (TEM) images of nanocomposite hydrogel at 2 mg mL$^{-1}$ (upper row) and 5 mg mL$^{-1}$ antimony tin oxide (ATO) filler content (lower row) at magnification of 10 k for (a) and (d), 25 k for (b) and (e) as well as 50 k for (c) and (f) according to various embodiments.

FIG. 13 shows transmission electron microscopy (TEM) images of nanocomposite hydrogel at 2 mg mL$^{-1}$ (upper row) and 5 mg mL$^{-1}$ antimony tin oxide (ATO) filler content (lower row) at magnification of 10 k for (a) and (d), 25 k for (b) and (e) as well as 50 k for (c) and (f) according to various embodiments.

The high visible transmittance observed for 180 μm PATO film in the clear/transparent state could be attributed to the well dispersed ATO during the in situ polymerization of PNIPAM. As evidenced from FIG. 13 (a)-(c), most of the agglomerates only lie within the range of 60-100 nm for hydrogel with 2 mg mL$^{-1}$ of ATO filler content. For hydrogel with 5 mg mL$^{-1}$ of ATO content, agglomeration of 100-450 nm could be observed sparingly from FIG. 13 (d)-(f). Nevertheless, for PATO-5-180, 70% of NIR at 1700 nm is already being shielded and a high visible transmittance of (>70%) at 550 nm is retained in the clear/transparent state, as observed from FIG. 11A.

With the increase in ATO content, apart from lower visible transmittance in the clear/transparent state, significant increase in response rate could be observed as shown in FIG. 11B. Comparing the gradient of the transmittance profile for the first 7 min reveals a response rate improvement of 2.3 and 4.7 times for PATO-2-180 and PATO-5-180 as compared to neat PNIPAM, respectively. A clearer dependency of the optical switching on the ATO concentration can be further observed in the transmittance-temperature profile for PATO-5-180 in FIG. 11C. A rapid decrease in visual transmittance (550 nm) at around 33° C. also suggests that the LCST of the nanocomposite is preserved.

Besides the improvement in response rate, the visible modulation for PATO-2 and PATO-5 containing 10% Sb doped ATO is found to be 1.9 and 3.5 times that of neat PNIPAM, respectively. In the NIR region, an improvement of 2.1 and 5.2 times for PATO-2 and PATO-5 as compared to neat PNIPAM can also be observed. FIG. 14A shows a table 1400a showing effect of various antimony (Sb) dopant concentration on solar modulation for 180 μm thick composite films with 1.2 mg mL$^{-1}$ antimony tin oxide (ATO) according to various embodiments. FIG. 14B shows a table 1400b illustrating the effect of different antimony tin oxide (ATO) content on solar modulation for 180 μm thick composite films according to various embodiments. FIG. 14C shows a table 1400c illustrating the effect of different antimony tin oxide (ATO) content on solar modulation for 80 μm thick composite films according to various embodiments.

As such, experiments have shown that with increasing ATO content in PATO, a monotonic decrease in NIR transmittance can be achieved. The experiments also show that dual responsive PNIPAM optical switching behavior may be possible.

In order to enable the dual responsive thermotropic smart window optical switching, nano heaters which can effectively convert solar or radiant energy to heat may be of importance. By far, only GO has been explored for such application.

Various embodiments may use a metal oxide semiconductor, e.g. ATO, as an alternative to GO. Various embodiments may use the metal oxide semiconductor as a nano heater or heaters.

The optical performances between PGO and PATO are compared in FIG. 11D. Unlike PATO which shows NIR shielding effect, the spectra of PNIPAM/PGO in the NIR region remains similar to that of neat PNIPAM. PGO only shows a decrease in visible transmittance with increasing content of GO.

In the context of smart windows, NIR absorption is an important property for indoor temperature modulation. Therefore, not only is visible light transmittance sacrificed in order for GO photothermal effect to take place, PGO may also not achieve significant NIR shielding and thermal insulation. Hence, PATO may have advantages in comparison to PGO.

The effect of different intensities of sun irradiation on the photothermal heating temperature profile is also investigated for neat PNIPAM, nanocomposite films, as well as reference glass slides.

Figure 15A:
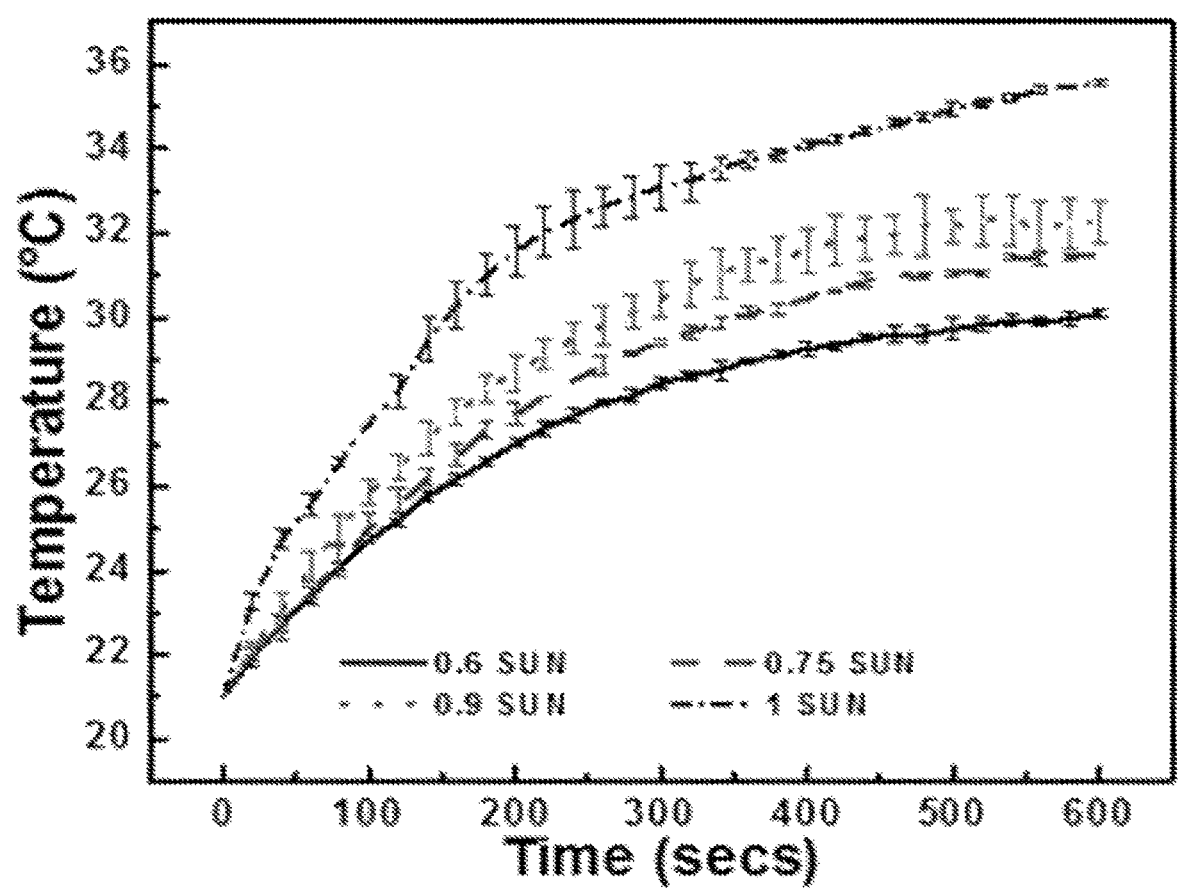
FIG. 15A shows a plot of temperature (in degrees Celsius or ° C.) as a function of time (in seconds or secs) showing photothermal heating temperature profiles of a 180 µm thick composite film with 5 mg mL$^{-1}$ antimony tin oxide (PATO-5-180) according to various embodiments under different intensities.

FIG. 15A shows a plot 1500a of temperature (in degrees Celsius or ° C.) as a function of time (in seconds or secs) showing photothermal heating temperature profiles of a 180 μm thick composite film with 5 mg mL$^{-1}$ antimony tin oxide (PATO-5-180) according to various embodiments under different intensities.

Figure 15B:
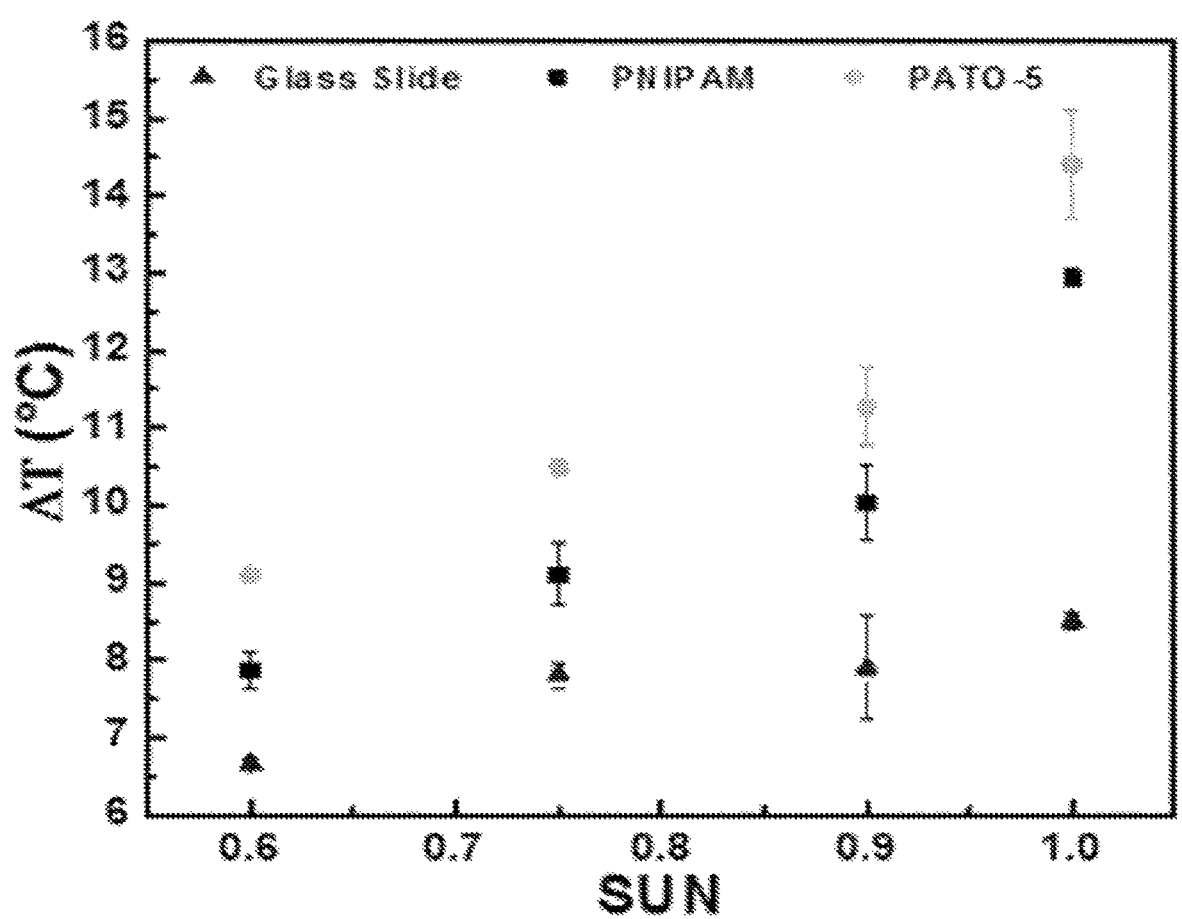
FIG. 15B shows a plot of temperature change (in degrees Celsius or ° C.) as a function of intensity (in suns) comparing temperature change of the 180 µm thick composite film with 5 mg mL$^{-1}$ antimony tin oxide according to various embodiments, neat poly(N-isopropylacrylamide) (PNIPAM) films, and reference glass slides under xenon (Xe) lamp irradiation at different sun intensities for 10 minutes.

FIG. 15B shows a plot 1500b of temperature change (in degrees Celsius or ° C.) as a function of intensity (in suns) comparing temperature change of the 180 μm thick composite film with 5 mg mL$^{-1}$ antimony tin oxide according to various embodiments, neat poly(N-isopropylacrylamide) (PNIPAM) films, and reference glass slides under xenon (Xe) lamp irradiation at different sun intensities for 10 minutes.

From FIG. 15A, it was found that both the initial rise in temperature as well as the final saturation temperature increase with increasing irradiation intensity on PATO-5-180 (containing 10% Sb doped ATO) FIG. 15B shows that with the addition of PNIPAM and ATO, a greater increase in temperature could be observed across different sun irradiation intensities. This observation may be attributed to the presence of water entrapped within PNIPAM as well as to the ATO LSPR. ATO exhibits strong absorption in the NIR region as seen from FIG. 11A, leading to good photothermal effect. These results imply that the increment of temperature can be controlled by both ATO content in PNIPAM, as well as light intensity, suggesting the optical switching of the dual responsive nanocomposite can be triggered by both sunlight as well as external temperature.

Figure 15C:
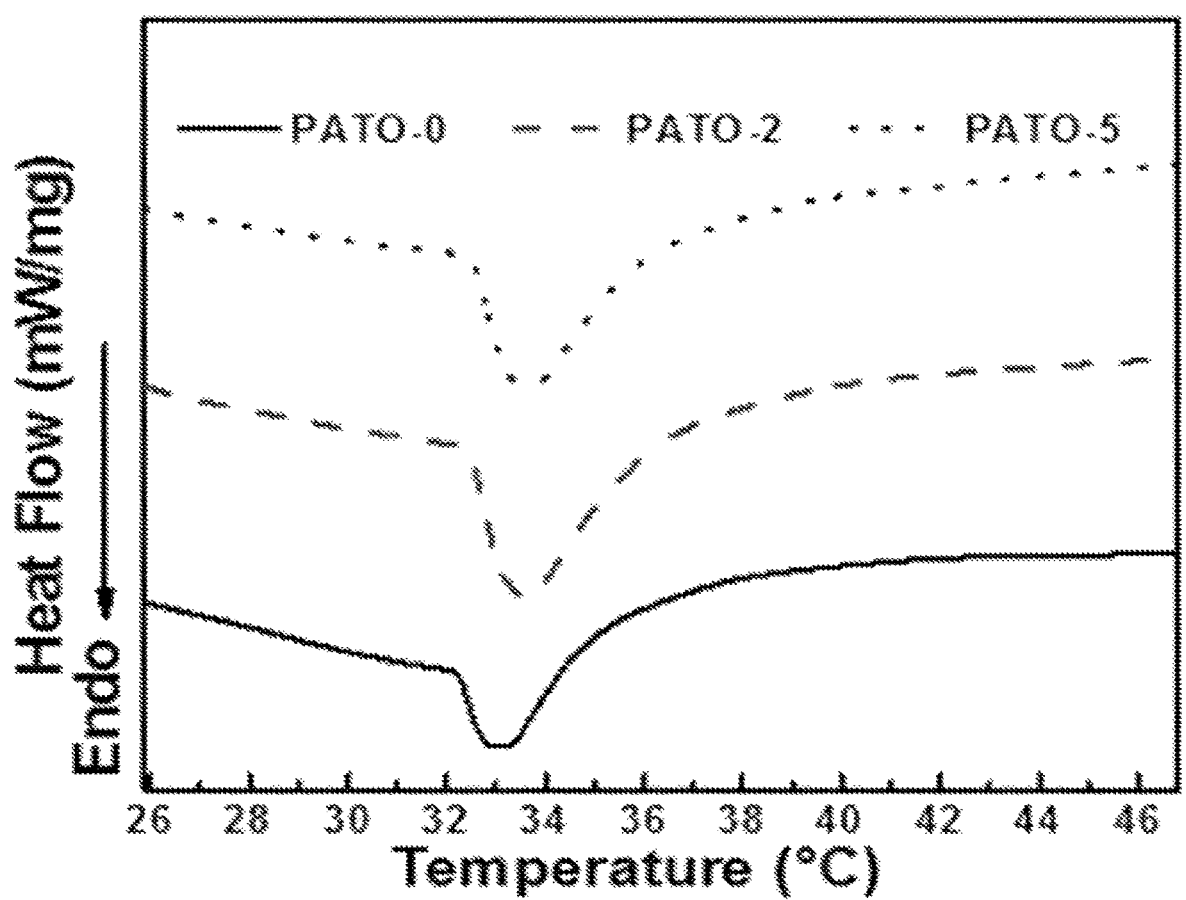
FIG. 15C shows a plot of heat flow (in milliwatts per milligram or mW/mg) as a function of temperature (in degree Celsius or ° C.) showing a differential scanning calorimetry (DSC) thermogram with similar lower critical solution temperature (LCST) for composite films including hydrogel with 0, 2 and 5 mg mL$^{-1}$ antimony tin oxide (ATO) filler content according to various embodiments.

The mechanism behind the improvement in optical properties of PATO is evaluated by means of differential scanning calorimetry (DSC) under flowing nitrogen. FIG. 15C shows a plot 1500c of heat flow (in milliwatts per milligram or mW/mg) as a function of temperature (in degree Celsius or ° C.) showing a differential scanning calorimetry (DSC) thermogram with similar lower critical solution temperature (LCST) for composite films including hydrogel with 0, 2 and 5 mg mL$^{-1}$ antimony tin oxide (ATO) filler content (doped with 10% Sb) according to various embodiments. With addition of 2 and 5 mg mL$^{-1}$ ATO filler content, the LCST endothermic peak remains at about 33.6° C., showing no significant difference to that of the neat PNIPAM at about 33.1° C. Hence, the overall improvement in the nanocomposite hydrogel optical properties may be ascribed to ATO photothermal effect.

Various embodiments may seek to strike a subtle balance between thermal properties while maintaining the visual comfort. PATO-5-180 shows an average visible transmittance of 40% at 550 nm, which could be further optimized in order to improve on its transparency. When the film thickness is reduced to 80 μm, it is found that the average visible transmittance at 550 nm increases to 56%, which may be satisfactory. For the 80 μm films, the effects of different ATO filler content on the various optical and thermal properties are investigated.

Figure 16A:
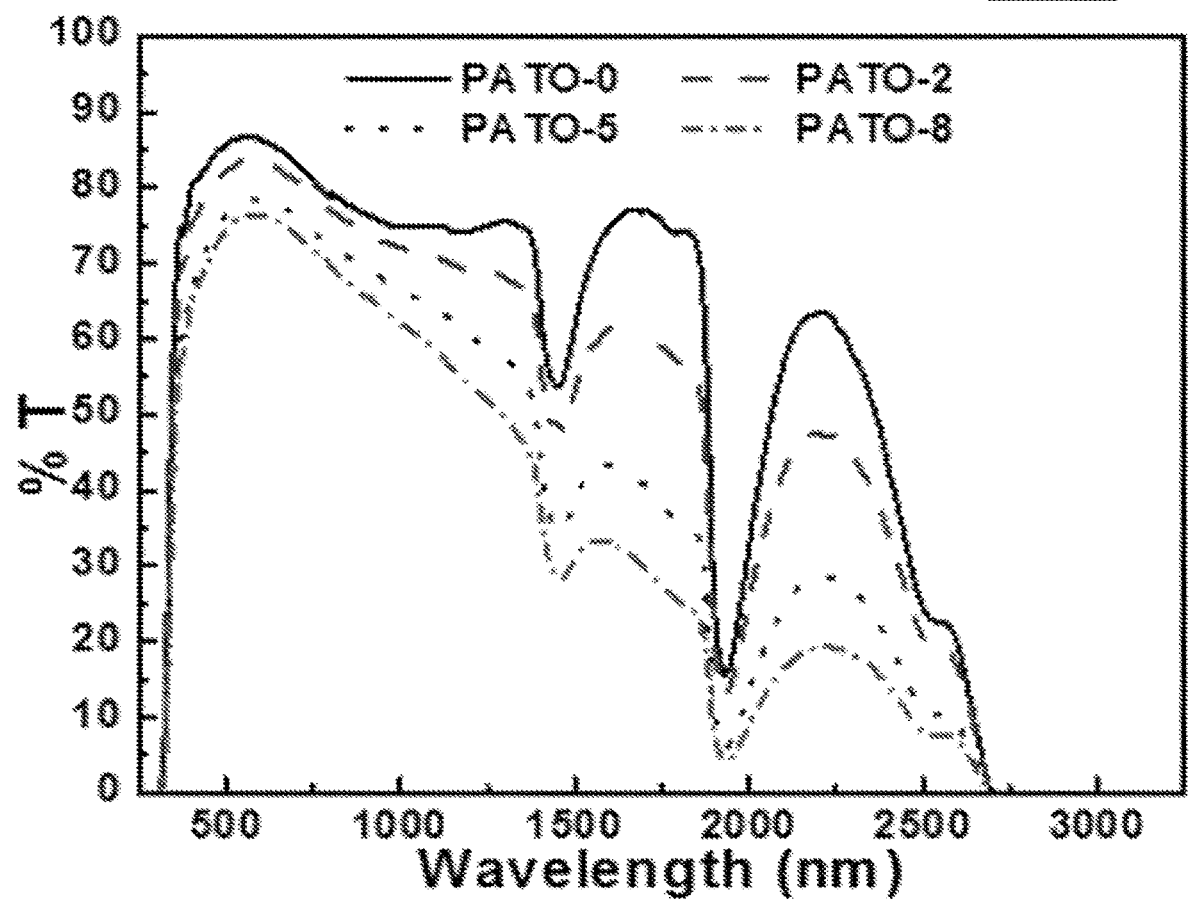
FIG. 16A is a plot of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments in the clear/transparent state.
Figure 16B:
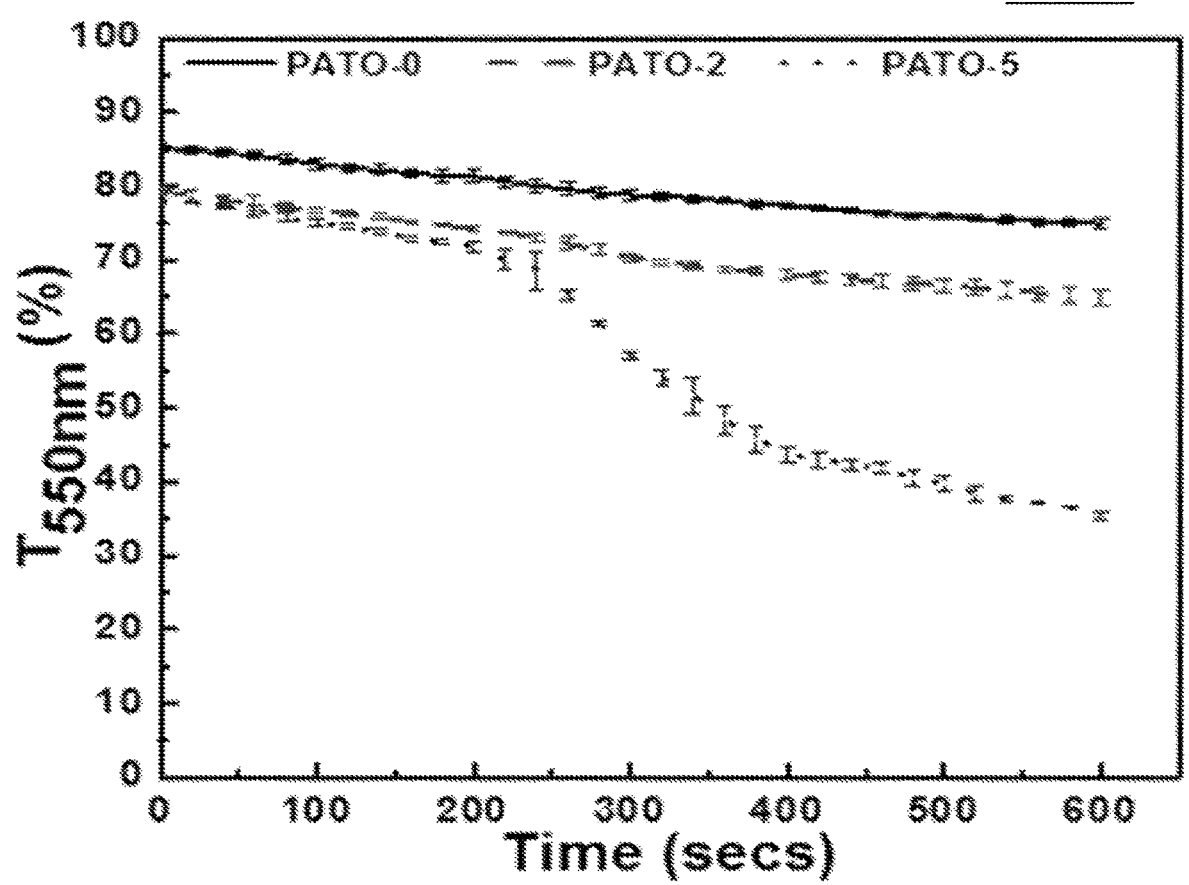
FIG. 16B is a plot of percentage transmittance (% T) as a function of time (in seconds or secs) showing the transmittance of 550 nm light through the nanocomposite films with different antimony tin oxide (ATO) filler content according to various embodiments with time.
Figure 16C:
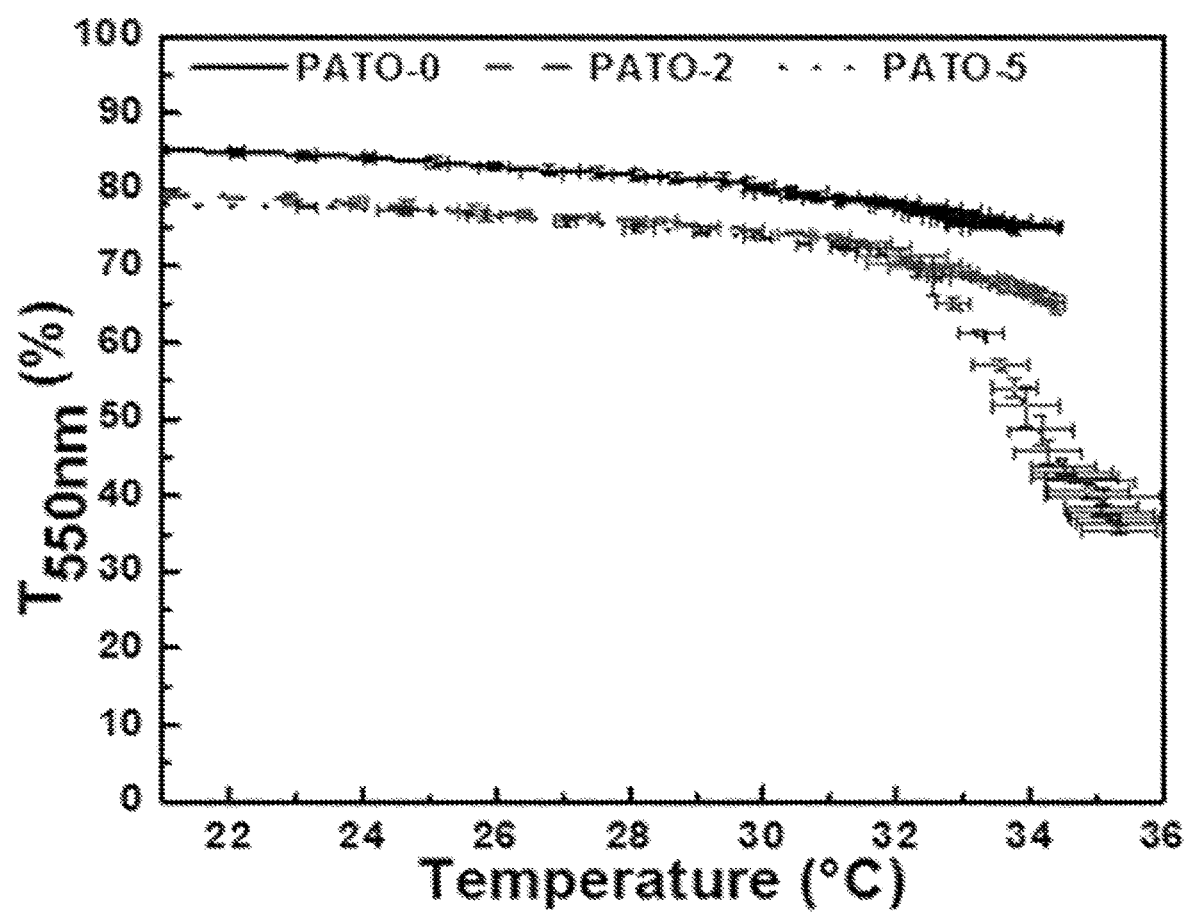
FIG. 16C is a plot of percentage transmittance (% T) as a function of temperature (in degree Celsius or ° C.) showing the transmittance of 550 nm light through the nanocomposite films with different antimony tin oxide (ATO) filler content according to various embodiments at different temperatures.

FIGS. 16A-C relate to optical properties of 80 μm thick neat hydrogel films and composite films including hydrogel incorporated with various filler concentrations of 10 at % Sb doped ATO. The films are irradiated using a xenon (Xe) lamp at 1 sun intensity for 10 minutes.

FIG. 16A is a plot 1600a of percentage transmittance (% T) as a function of wavelength (in nanometers or nm) showing the ultraviolet-visible-near infrared (UV-Vis-NIR) spectra of nanocomposite films with different antimony tin oxide (ATO) filler content according to various embodiments in the clear/transparent state.

FIG. 16B is a plot 1600b of percentage transmittance (% T) as a function of time (in seconds or secs) showing the transmittance of 550 nm light through the nanocomposite films with different antimony tin oxide (ATO) filler content according to various embodiments with time.

FIG. 16C is a plot 1600c of percentage transmittance (% T) as a function of temperature (in degree Celsius or ° C.) showing the transmittance of 550 nm light through the nanocomposite films with different antimony tin oxide (ATO) filler content according to various embodiments at different temperatures.

As seen in FIG. 16A, the 80 μm films in the clear state show high visible transmittance (>75%) at 550 nm. Further, PATO-5-80 shows shielding of 60% of NIR transmittance at 1700 nm. PATO-8-80 in the clear state seems to be able to achieve an even higher degree of NIR shielding effect without compromising the visible transmittance. However, after optical switching, the transmittance of the PATO-8-80 film in the visible range may be sacrificed as seen in FIG. 12. Moreover, as observed from FIGS. 16B-C, PATO-5-80 may demonstrate optical switching with the largest extent of solar modulation ability, compared to PATO-0-80 and PATO-2-80. Therefore, PATO-5-80 may show the best comprehensive performance amongst the nanocomposite films tested.

FIG. 17 shows a table 1700 showing the improvement of composite films according to various embodiments over a neat 80 μm thick poly(N-isopropylacrylamide) (PNIPAM) film. The number indicated in FIG. 17 refers to the improvement multiple over the neat 80 μm thick PNIPAM film, i.e. the number of times the property of the composite film is improved over the corresponding property of the neat 80 μm thick PNIPAM film.

It is clear that from FIG. 17 that with increasing ATO content and film thickness, both solar modulation ability and response rate in the visible and NIR regions have increased. In comparison to PATO-2-180, PATO-5-80 has a filler content of 2.5 times more, while PATO-2-180 shows a film thickness of 2.25 times that of PATO-5-80. Hence, by taking the averages of the VIS and NIR values for the solar modulation ability and response rate improvement, the dominant factor behind these improvements may be compared and elucidated.

It is interesting to note that both PATO-5-80 and PATO-2-180 show a comparable improvement in terms of solar modulation ability and response rate. In fact, for a PATO film of lower thickness but with higher ATO content (i.e. PATO- 5-80), a relatively higher solar modulation can be achieved, which may be due to the enhanced photothermal effect. However, PATO-2-180 still shows a larger response rate improvement over PATO-5-80. The underlying reason for such observations is still unknown and investigation is currently ongoing.

Figure 18:
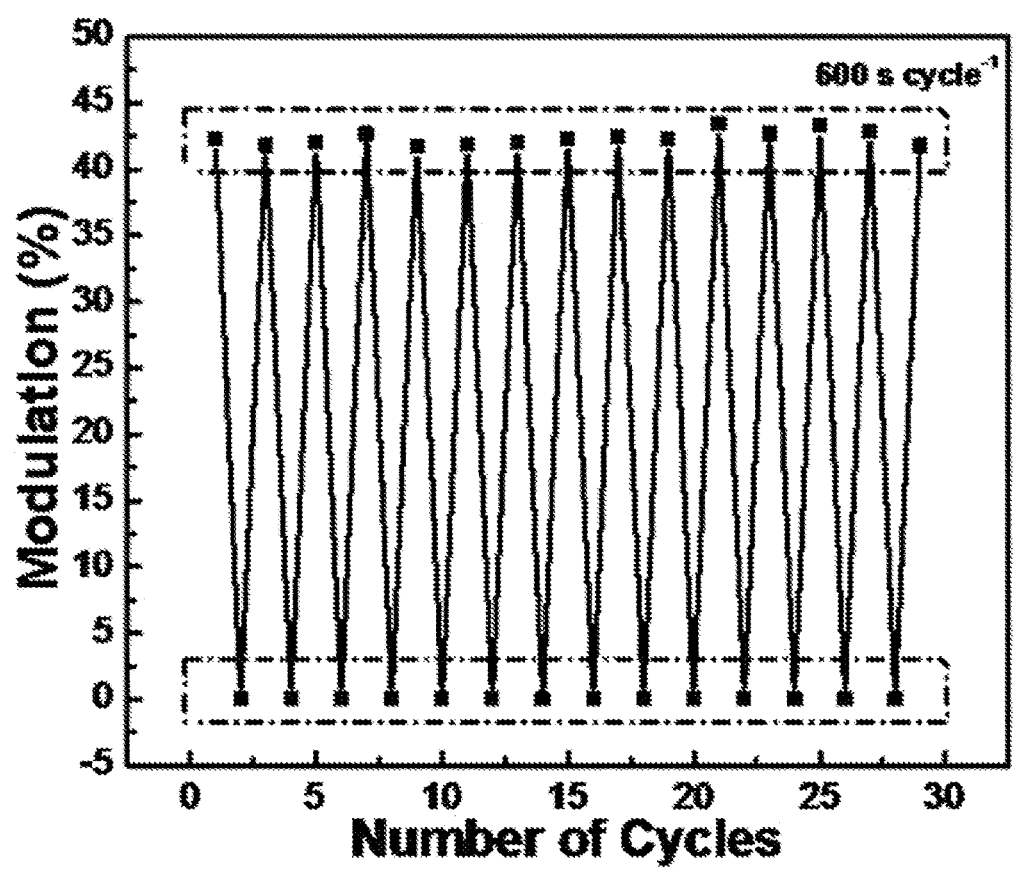
FIG. 18 shows a plot of modulation (in percent or %) as a function of number of cycles showing repeated solar modulation evaluation of 80 µm thick film including hydrogel and 5 mg mL$^{-1}$ antimony tin oxide (ATO) filler content according to various embodiments in the visible region (550 nm).

It may be important for the nanocomposite films to exhibit reversible optical switching for actual field applications. FIG. 18 shows a plot 1800 of modulation (in percent or %) as a function of number of cycles showing repeated solar modulation evaluation of 80 μm thick film including hydrogel and 5 mg mL$^{-1}$ antimony tin oxide (ATO) filler content according to various embodiments in the visible region (550 nm). Each cycle lasts for 600 s under Xe lamp irradiation.

FIG. 18 shows that reversible and repeatable optical properties may be retained after 15 cycles of irradiation. This indicates that the solar modulation ability of such nanocomposite TT system may be reliable for actual field applications. The stability of such aqueous base gel may also depend on the sealing condition of the glazing system. An actual outdoor testing is currently ongoing and further improvements in stability may be implemented in future.

Figure 19:
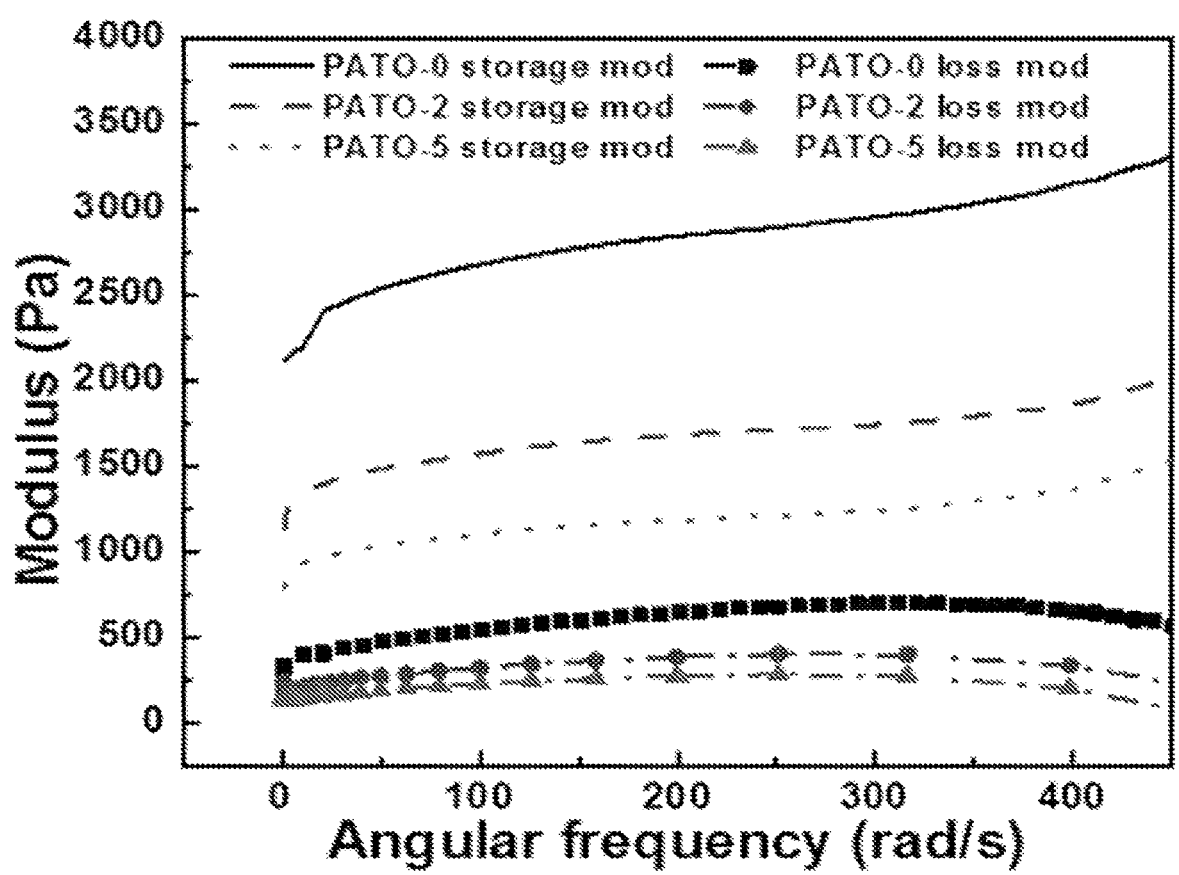
FIG. 19 is a plot of modulus (in Pascals or Pa) as a function of angular frequency (in radians per second or rad/s) showing the storage modulus and the loss modulus of the composite films according to various embodiments.

FIG. 19 is a plot 1900 of modulus (in Pascals or Pa) as a function of angular frequency (in radians per second or rad/s) showing the storage modulus and the loss modulus of the composite films according to various embodiments. FIG. 19 shows that the storage modulus is higher than the loss modulus, indicating that the hydrogel is cross-linked.

Figure 20:
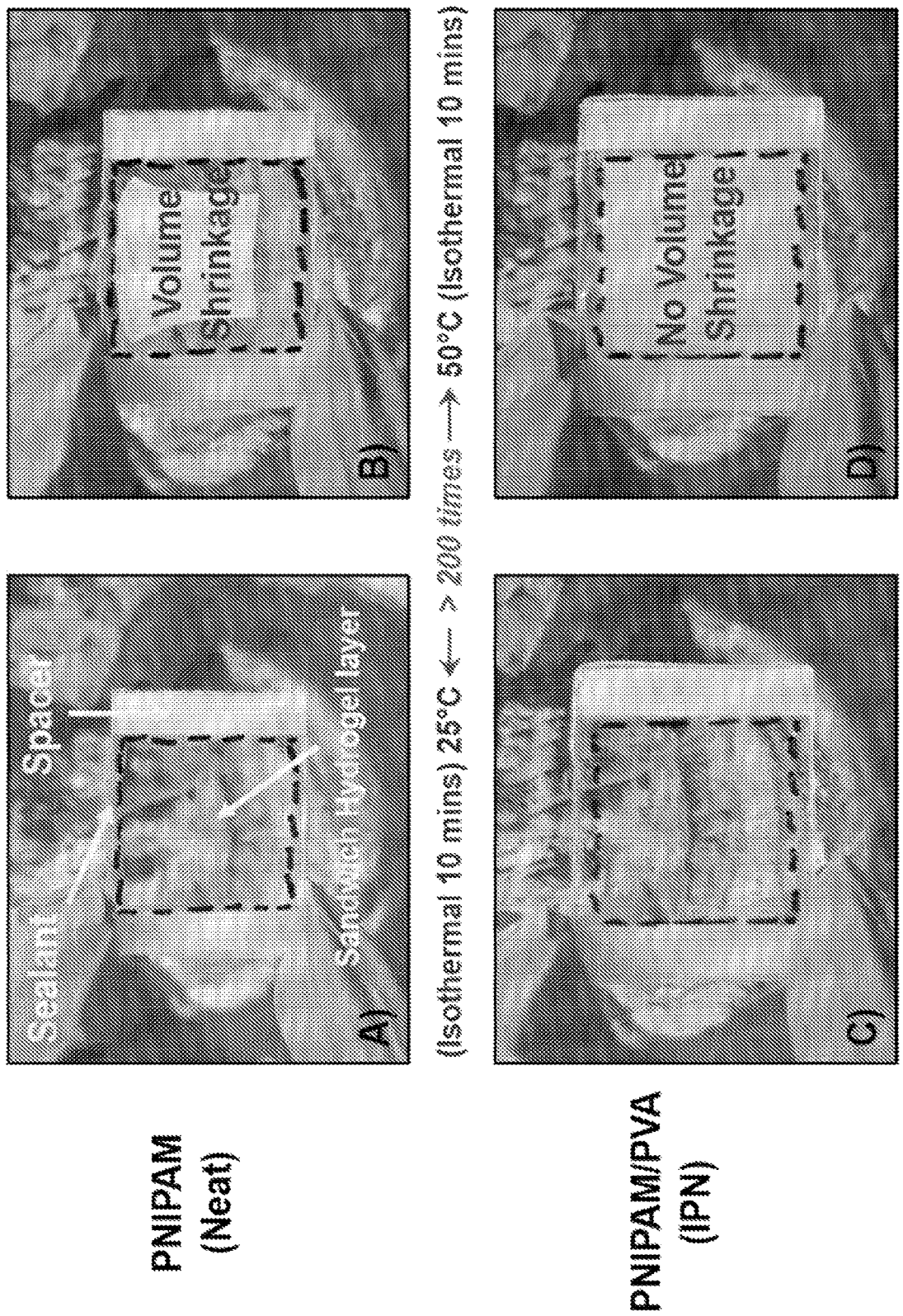
FIG. 20 shows images illustrating the tuning of volume phase transition property of films according to various embodiments using sequential interpenetration polymer network (IPN) technology.

FIG. 20 shows images illustrating the tuning of volume phase transition property of films according to various embodiments using sequential interpenetration polymer network (IPN) technology. Both neat poly(N-isopropylacrylamide) (PNIPAM) film (shown in A-B) and poly(N-isopropylacrylamide)/polyvinyl alcohol (PNIPAM/PVA) IPN film (shown in C-D) may each be encapsulated in between 2 glass slides as smart window prototypes for volume shrinkage evaluation. Both prototypes may be placed on a heating stage and cycled between 25° C. to 50° C. at 5° C. min$^{-1}$ for more than 100 times, with isothermal holding of 10 minutes. Unlike the PNIPAM film (shown in A-B) which exhibits drastic volume shrinkage of the hydrogel, no volume transition has been observed for the PNIPAM/PVA IPN film (shown in C-D).

The LCST phase transition of thermally responsive hydrogel (e.g. PNIPAM) may be accompanied with discrete volume transition at elevated temperature, and such attributes have been commonly utilized for environmental (e.g. solar dewatering) or mechanical (e.g. micro valve) applications.

However, the volume phase transition property may be undesirable for other applications (e.g. membrane or optical display technologies) which require greater dimensional stability of the hydrogel. Hence, the sequential IPN of PVA—PNIPAM may be explored to restrict and constrain the degree of volume phase transition of the hydrogel.

As illustrated in FIG. 20, zero or negligible changes in dimension may be observed for the PNIPAM/PVA IPN hydrogel after thermal cycling for 200 times.

Materials

The following materials may be used for the synthesis of nanocomposite films according to various embodiments and for the experiments carried out in the abovementioned experiments. N-isopropylacrylamide (NIPAM, ≥98%, purchased from Wako Pure Chemical Industries Ltd), N,N'-methylenebis(acrylamide) (≥99%, cross-linker, purchased from Sigma-Aldrich), N,N,N',N'-tetramethylethylenediamine (TEMED, accelerator, 99%, purchased from Sigma-Aldrich), Ammonium peroxydisulfate (initiator, 98%, purchased from Alfa Aesar), and Multipurpose sealant (Selleys All Clear) are used without further purification. Deionized water (18.2 MΩ) is used throughout the experiments. (ATO) Tin(IV) tetrachrloride (≥99%, purchased from Sigma-Aldrich), Antimony(III) trichloride (≥99.0%, purchased from Sigma-Aldrich), Benzyl alcohol (99%, purchased from Alfa Aesar), Tetramethylammonium hydroxide (TMAH, 2.38%—without surfs, purchased from Kanto Kagaku, Singapore) are also used.

Synthesis of Antimony Tin Oxide (ATO)

Antimony tin oxide of different Sb content doping may be synthesized via the benzyl alcohol route. Briefly, for a 10 at % Sb doped ATO, (2.7 mmol) $SnCl_4$ and (0.3 mmol) $SbCl_3$ may be dissolved in (50 mL) of benzyl alcohol. The mixture may be then stirred for 1 h before being transferred to a Teflon-lined autoclave which may be kept at 200° C. for 24 hours. The system may be cooled to room temperature naturally, and the nanoparticles may be separated via centrifugation at 1000 revolutions per minute (rpm) for 15 mins, and may be subjected to repeated washing by re-suspending in ethanol for three times. The ATO nanoparticles may then be dried in a vacuum oven at 70° C. for 24 hours and may be powdered using an agate mortar. The targeted Sb doping concentrations are 0, 5, 10 and 15 at %. To prepare the aqueous dispersions of different solid weight content, TMAH of different ratio may be added accordingly as shown in FIG. 21.

FIG. 21 shows a table 2100 illustrating formulations of 10, 15 and 35 weight percent (wt %) aqueous dispersions of different antimony (Sb)-doped Antimony Tin Oxide (ATO) for use to prepare nanocomposite films according to various embodiments.

Preparation of Antimony Tin Oxide (ATO)/Hydrogel Nanocomposite Films

The nanocomposite may be synthesized by in situ polymerization of NIPAM in deionized (DI) water with the addition of ATO nanoparticles. Monomer solution (4.5 mL) containing 410 mg of NIPAM and 32.5 mg of N,N'-methylenebis(acrylamide) may be mixed with 46.9 μL of aqueous ATO dispersion of different solid weight content.

ATO in the pre gel solution has a final concentration of 1.2, 2 and 5 mg mL$^{-1}$ for 10, 15 and 35 wt % ATO aqueous dispersions respectively.

For graphene oxide (GO) based composites, similar formulation may be adopted except that the amount of swelling agent may be kept at a constant volume. 1 wt % of aqueous GO may be added at 93.8 μL and 140.7 μL of monomer solution, which respectively resulted in concentrations of 0.2 mg mL$^{-1}$ and 0.3 mg mL$^{-1}$ of GO in the pre gel solution.

In order to form a 0.4 mL of degassed pre gel solution, 40 μL of N,N,N',N'-tetramethylethylenediamine and (14 μL) of 5 wt % aqueous ammonium persulfate may be added in sequence in order to initiate the free radical polymerization. The solution may be sandwiched in between 2 clean glass slides and left for reaction to be complete at room temperature for 24 hours.

Samples with thickness of 80 and 180 μm may be fabricated with the aid of a spacer in between the 2 glass slides. The edges of the glass slides may be sealed with a sealant in order to prevent water evaporation from the swollen hydrogel.

A similar fabrication process may be adopted for the neat hydrogel sample except that ATO/DI or GO/DI was not added. For convenience, x and y in the notation PATO-x-y represent respectively the ATO concentration in the film and the film thickness. For instance, PATO-2-80 stands for 2 mg mL$^{-1}$ of ATO content in 80 μm thick PNIPAM film. Similar notation applies for PNIPAM/GO.

Preparation of Poly(N-isopropylacrylamide)/Polyvinyl Alcohol (PNIPAM/PVA) Interpenetrating Polymer Network (IPN) Film A 5 wt % polyvinyl alcohol (PVA) aqueous solution may first be prepared and a 1:1 weight ratio of NIPAM monomers may then be added subsequently. PVA may then be polymerized in the presence of NIPAM monomers. The resulting pH of the solution may be adjusted to 2±0.5 with hydrochloric (HCl) acid for catalyzing the crosslinking of PVA, and 1.2 mL of glutaraldehyde (GA) may be added as cross linker for PVA. 21.6 mg. N,N'-Methylenebisacrylamide (MBA) may subsequently be added to the solution and stirred for 15 minutes to achieve a homogeneous mixture. 106 μL of 5 wt % ammonium persulfate (APS) aqueous solution and 10 μL of tetramethylethylenediamine (TEMED) may be added subsequently and stirred for 15 minutes. The resulting mixture may be dropped casted in between 2 glass slides and sealed with high vacuum grease sealant to prevent solvent evaporation.

X-Ray Diffraction (XRD) Characterization

X-ray diffraction (XRD) analysis of diffraction peaks of the powdered ATO samples may be conducted using XRD Bruker D8 and Cu Kα radiation at 1.542 Å, and the peaks may be compared against the Joint Committee on Powder Diffraction Standards (JCPDS) database and the Powder Diffraction File (PDF) database. The crystallite sizes may be calculated using Scherrer's Equation.

Energy Dispersive X-Ray Spectroscopy (EDS), Scanning Electron Microscopy (SEM) and Transmission Electron Microscopy (TEM) Characterization Energy dispersive X-ray spectroscopy (EDS) of different at % Sb doped ATO may be obtained on INCA X-act system attached to JEOL JSM 7600-F Field Effect Scanning Electron Microscopy (FESEM) field-emission scanning electron microscope.

Characteristic X-rays from individual elements may be collected. The results may be normalized for Tin (Sn) and Antimony (Sb), and tabulated. A small drop of synthesized ATO dispersion may be dripped onto a copper grid.

Imaging may be performed using JEOL JEM 2010 (High Resolution-Transmission Electron Microscopy or HR-TEM) to determine the crystal size of the ATO. The freeze-dried PNIPAM/ATO may be prepared by first subjecting the hydrogel nanocomposite to liquid nitrogen (N$_2$) followed by freeze drying in a SCANVAC CoolSafe freeze dryer at −46° C. The freeze-dried microstructure of ATO nanoparticle dispersion in PNIPAM may be observed by transmission electron microscopy (TEM), and micrographs may be collected using a Carl Zeiss LIBRA® 120 in-column energy filter TEM equipped with an integrated OMEGA filter.

Rheology Characterization

Dynamic rheological tests may be performed with a 25 mm parallel plate using a Discovery hybrid rheometer (DHR-3, TA Instruments, USA) at room temperature of 25° C. Amplitude sweeps may be first performed and a strain of 10% may be chosen for further investigation of linear viscoelastic properties of the samples. Frequency sweep tests may then be conducted from 1 rad s$^1$ to 500 rad s$^1$ with a fixed gap of 500 μm for the hydrogel with different ATO content.

Differential Scanning Calorimetry (DSC) Characterization

The specific heat flow of PNIPAM/ATO composites may be characterized with a N$_2$-protected Q10 differential scanning calorimeter (TA Instruments, USA) with the ramping rate set as 3° C. min$^{-1}$.

Ultraviolet-Visible-Near Infrared (UV-Vis-NIR) Characterization

The transmittance and absorbance spectra in the wavelength range of 250-2500 nm may be collected using a UV-Vis-NIR spectrophotometer (Cary 5000, Agilent, USA) at normal incidence.

Photothermal Test and Photoresponsive Property Test

Photothermal effect of ATO in response to solar radiation may be investigated by measuring the change in temperature of aqueous ATO dispersion exposed to Xenon (Xe) lamp irradiation equipped with an AM 1.5 filter under continuous stirring.

A FLUKE 54-2 thermometer and a Fluke 80 PK-1 Beaded K-Type Probe may be utilized for in situ measurement of the change in temperature with time at 1 sun irradiation intensity. A Xe lamp (Newport 6259, 300 W Xenon, UV Enhanced Arc Lamp (Ozone Free)) with emission wavelengths of 200 to 2400 nm may be utilized as the irradiation light source in the laboratory (constant room temperature of 21° C.) to verify the photothermoresponsive switching mechanism of PATO as well as its response speed and solar modulation ability. 2 different Newport detectors, 918D-SL-OD3R (Silicon Detector, 400 to 1100 nm) and 918D-IR-OD3R (Germanium Detector, 780 to 1800 nm) may be set to detect changes in transmittance at wavelengths of 550 nm and 1700 nm during the experiment.

The changes in power reading may be read off and manually recorded from a Newport Optical Power Meter (1918-R). All background irradiation detected is in nanowatts (nW) and may be zeroed before conducting the experiment.

A Sentry ST677 pyrometer with a high 50:1 distance to spot ratio may be used to detect the changes in temperature of the prototype window during the whole experiment. A stopwatch may also be used to capture the duration of the experiment. The setup is shown in FIGS. 5A-B.

The initial transmittance intensity of the solar simulator detected in both the visible region and near infrared region may be taken to be 100%, and subsequent decreases in power intensity during the measurement may be linearly converted to percentage transmittance. The response rate as well as solar modulation ability may be systematically investigated as a function of time.

Solar modulation ability may be calculated based on the transmittance change at different intervals of the irradiation. The gradient of the visible transmittance (% Tssonm) time graph before optical switching may be used to analyze the specimen response rate. Average visible transmittance may be calculated by taking the average of the initial transmittance value of the specimen initially (at time (t)=0 s) and final transmittance value after 600 s (at time (t)=600 s).

Thermochromic Systems

Various embodiments may relate to a composite film including a metal oxide semiconductor and a thermochromic matrix or system. The metal oxide semiconductor may function as a driver for an optically transparent thermochromic system. In various embodiments, the matrix may be configured to be switched to a first phase or state having a first colour when the matrix receives thermal energy beyond a predetermined level, and may be configured to be switched to a second phase or state having a second colour different from the first colour when the matrix thermal energy is less than the predetermined level.

As an example, leuco dye based golden red pigment (GRP) may be used as a thermochromic additive, and a metal oxide semiconductor such as 10% Sb doped ATO may be used as infrared absorbing particles. The matrix may include a thermochromic material such as a pigment, e.g. GRP. The matrix may further include a material such as poly(methylmethacrylate) (PMMA).

Based on differential scanning calorimetry (DSC), GRP has a phase transition temperature range of about 38° C.-43° C. In one example, acetone may be used as a common solvent for dissolution of PMMA (20 wt %) as well as a dispersing medium for the TC pigment (1 wt %) and ATO particles (20 wt %).

A thermochromic (TC) reference film incorporated with 1.5 wt % GRP (based on PMMA) may be solvent casted in an aluminum dish, and may be left for complete solvent evaporation in a fume hood for 2 days at room temperature before obtaining a free standing transparent TC film of 250 µm thickness. The reference film does not contain a metal oxide semiconductor.

A composite TC film including PMMA and GRP, and further including 0.8 wt % embedded ATO may be prepared in a similar manner.

In an experiment, prepared TC films are placed on a hot stage at 50° C. and the golden red color of the films are observed to fade away, showing the base color (transparent) of the PMMA film, verifying the thermochromic properties of the hybrid films. The films are then subjected to irradiation by the xenon arc lamp at 1 sun intensity with a thermocouple attached to the back of each film (i.e. the surface of the films opposite the surface being irradiated). The optical changes of the composite film and the reference film may then be appraised visually.

Figure 22A:
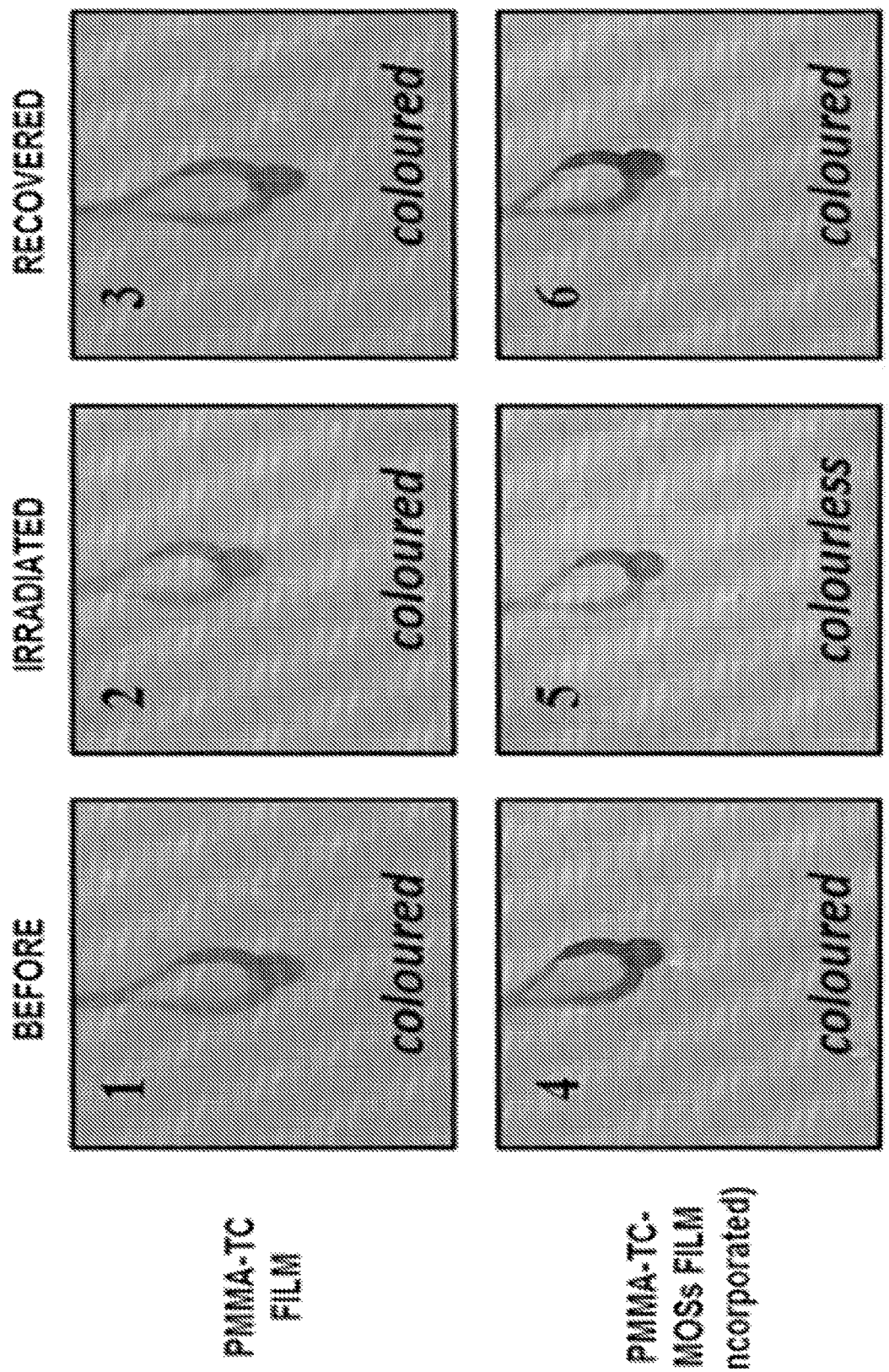
FIG. 22A shows images illustrating the visual changes of the thermochromic composite film (including poly(methylmethacrylate) (PMMA), thermochromic (TC) material, and a metal oxide semiconductor) according to various embodiments and the thermochromic reference film (including poly(methylmethacrylate) (PMMA) and thermochromic (TC) material) before irradiation, after 10 mins of irradiation, and after cooling/recovering.

FIG. 22A shows images illustrating the visual changes of the thermochromic composite film (including poly(methylmethacrylate) (PMMA), thermochromic (TC) material, and a metal oxide semiconductor) according to various embodiments and the thermochromic reference film (including poly(methylmethacrylate) (PMMA) and thermochromic (TC) material) before irradiation, after 10 mins of irradiation, and after cooling/recovering.

Figure 22B:
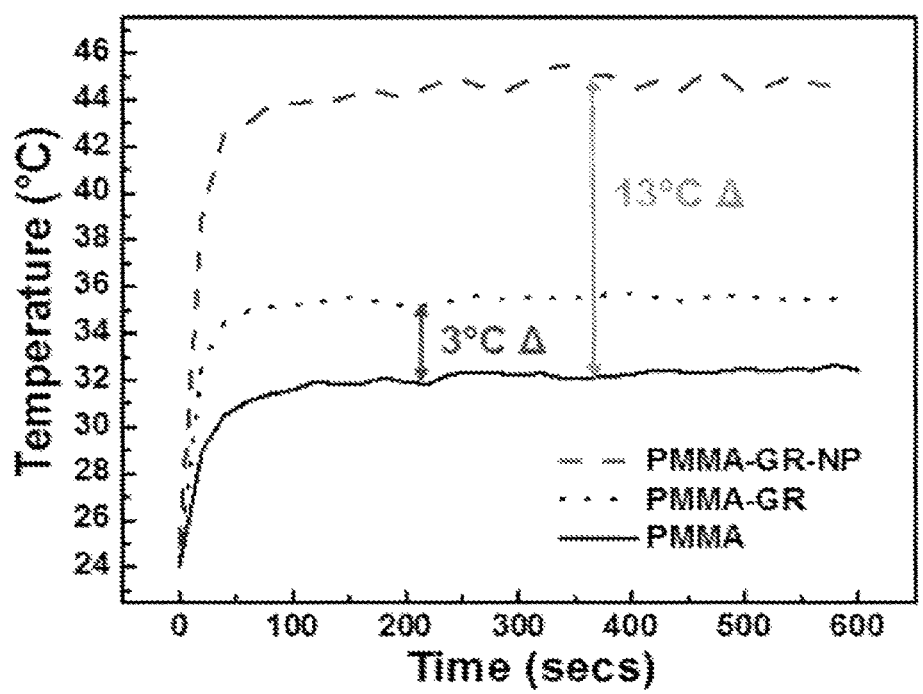
FIG. 22B shows a plot of temperature (in degree Celsius or ° C.) as a function of time (in seconds or secs) showing the temperature profiles of the composite film (including poly(methylmethacrylate) (PMMA), thermochromic (TC) material, i.e. golden red pigment, and metal oxide semiconductor nanoparticles, denoted as PMMA-GR-NP) according to various embodiments, the reference thermochromic film (including poly(methylmethacrylate) (PMMA) and golden red pigment, denoted as PMMA-GR), and a poly(methylmethacrylate) (PMMA) film during irradiation.

FIG. 22B shows a plot 2200 of temperature (in degree Celsius or ° C.) as a function of time (in seconds or secs) showing the temperature profiles of the composite film (including poly(methylmethacrylate) (PMMA), thermochromic (TC) material, i.e. golden red pigment, and metal oxide semiconductor nanoparticles, denoted as PMMA-GR-NP) according to various embodiments, the reference thermochromic film (including poly(methylmethacrylate) (PMMA) and golden red pigment, denoted as PMMA-GR), and a poly(methylmethacrylate) (PMMA) film during irradiation.

As shown in FIG. 22A images 1-3, the TC film without the addition of ATO, i.e. the reference film, shows no significant changes in color, since the film could not reach the phase transition temperature. Images 1-3 show that the reference film remains coloured in red before and after irradiation, and after recovering. The thermal profile of the reference film (PMMA-GR) also shows no appreciable increase in temperature from the thermal profile of the PMMA film.

However, the thermal profile of the composite film (PMMA-GR-NP) shows that a higher saturation temperature of 45° C. could be achieved with the addition of ATO. The addition of the ATO particles may also successfully facilitate the thermochromism process as seen in FIG. 22A images 4-6. Image 4 shows a coloured film before irradiation, and Image 5 shows a clear transparent colorless film. Image 6 again shows a coloured film. The thermochromism process for the composite film with ATO may take place rapidly. In the experiment conducted, it takes only 2 mins for the composite film to turn completely colourless.

In various embodiments, the matrix may include any suitable thermochromic material, such as inorganic thermochromic material or organic thermochromic material. The photo-thermally driven process through IR heating may be applied to these thermochromic materials.

FIG. 23A shows a table 2300a illustrating examples of inherent reversible organic thermochromic materials which may be included in a composite film according to various embodiments. The thermochromic material may be a conjugated polymer such as polyacetylene, polythiophene, or poly (phenylene vinylidene).

FIG. 23B shows a table 2300b illustrating examples of thermochromic (TC) photonic crystals which may be included in a composite film according to various embodiments, the photonic crystals including materials doped with non-thermochromic (TC) additives. Examples of one dimensional (1D) photonic crystals may include poly (N-isopropylacrylamide-co-acrylic acid) doped with non-thermochromic poly (p-methyl styrene), poly (acrylamide)-poly (acrylic acid) doped with non-thermochromic poly (dodecylglyceryl itaconate), or 3-n-pentadecylphenol doped with non-thermochromic polystyrene-block-poly(4-vinylpyridinium methanesulfonate). Examples of three dimensional (3D) photonic crystals may include poly (N-isopropylacrylamide) doped with non-thermochromic polystyrene, or poly (N-isopropylacrylamide-co-acrylic acid) doped with non-thermochromic bisacrylamide.

FIG. 23C shows a table 2300c illustrating examples of thermochromic systems including localized surface plasmon resonance (LSPR) nanoparticles or aggregachromic dyes doped with non-thermochromic (TC) additives according to various embodiments. Examples of systems relating to nanoparticles may include gold (Au) nanoparticles doped with non-thermochromic poly (N-isopropylacrylamide), or silver (Ag) nanoparticles doped with non-thermochromic poly (N-isopropylacrylamide) or polystyrene.

Examples of thermochromic systems relating to aggregachromic dyes may include poly(ethylene terephthalate glycol), poly(methyl methacrylate), or poly(ethylene-co-norbornene) doped with non-thermochromic 1,4-bis(α-cyano-4-octadecyloxystyryl)-2,5-dimethoxybenzene (Cyano OPV). Further examples of systems relating to aggregachromic dyes may include low-density polyethylene doped with N,N'-bis-(R)-(1-phenylethyl)-perylene-3,4,9,10-tetracarboxyldiimide (R-pery), or non-thermochromic poly (ethylene-co-vinyl alcohol) doped with N,N'-bis(2-(1-piperazino)ethyl]-3,4,9,10-perylenetetracarboxylic acid diimide dichloride (PZPER).

FIG. 23D shows a table 2300d illustrating examples of systems involving polymer-dye interactions or charge transfer complexes according to various embodiments. Examples of systems involving polymer-dye interactions may include polyvinylalcohol-sodium borate doped with non-thermochromic 2,6-diphenyl-4-2,4,6-(triphenyl-1-pyridinio)-phenolate (DTPP) or o-cresolsulfonephthalein. Another example may be poly (lactic acid) doped with non-thermochromic cyanidin chloride (E163). An example involving charge transfer complex may be poly (ethylene imine) with non-thermochromic $K_{125}Na_{1.5}[NaP_5W_{30}O_{110}]$ ($NaP_5W_{30}$).

FIG. 23E shows a table 2300e illustrating examples of systems including thermochromic additives according to various embodiments. Examples may include leuco dye developer solvent systems such as polypropylene doped with thermochromic crystal violet lactone or 3,3-bis-(1-n-butyl-2-methyl-3-indolyl)-phthalide, conjugated polymers such as polyvinylalcohol doped with thermochromic polydiacetylenes, or inorganic thermochromic complexes such as poly (vinylidene fluoride) with thermochromic 1-butyl-3-methylimidazolium nickel tetrachloride.

FIGS. 23A-E show non-limiting examples of reversible thermochromic organic materials/systems which may be included in the matrix. The reversible thermochromic organic materials/systems may work with metal oxide semiconductors. The photothermal effect provided by the metal oxide semiconductor may induce colour changes in the thermochromic organic materials/systems.

FIG. 24 shows a table illustrating reversible inorganic thermochromic materials according to various embodiments. The thermochromic materials may include alloys such as copper-zinc, silver-zinc, gold-zinc, silver-cadmium, gold-cadmium, metal halides such as silver, mercury, gold, cobalt, iron, nickel, manganese halides, mercury compounds or halides such as $HgI_2$, $Ag_2HgI_4$, $Cu_2HgI_4$, boracites $(Me_3B_7O_{13}X$, (Me=divalent metal, X=halogen), and oxides such as $VO_2$, $TiO_{1.94}$, $SrMnO_3$, $La_{0.7}Ca_{0.3-x}Sr_xMnO_3$ (x is any value from 0 to 1), or $La_{1-x}A_xMnO_3$ (A=Ca, Ba, x is any value from 0 to 1).

Similarly, the concept of utilizing IR plasmonic heating has been demonstrated as an effective means to drive mechanical motion in thermoresponsive system, i.e. a thermoresponsive shape memory polymer (SMP). In various embodiments, the matrix may include a thermomechanical system, such as a shape memory polymer (SMP). In various embodiments, the matrix may be configured to be switched to a first phase or state having a first shape when the matrix receives thermal energy beyond a predetermined level, and may be configured to be switched to a second phase or state having a second shape different from the first shape when the matrix thermal energy less than the predetermined level.

In this specific example, polyvinyl alcohol (PVA) with an activation temperature of about 80° C. (Tg) is chosen as the SMP and 10% Sb doped ATO is used as the IR active plasmonic heater.

8 wt % of aqueous PVA solution is first prepared by dissolving PVA in deionized (DI) water followed by stirring at 98° C. for 1 hour to achieve a homogeneous clear solution. The PVA solution is then coated onto a glass panel substrate with a film applicator (draw down thickness of 200 µm). The coating is then left at room temperature for 3 days for evaporation of the solvent to take place, in order to achieve a transparent free-standing reference film having a thickness of about 100 µm. A composite film with 6 wt % ATO embedded in PVA is prepared using a similar method.

Figure 25:
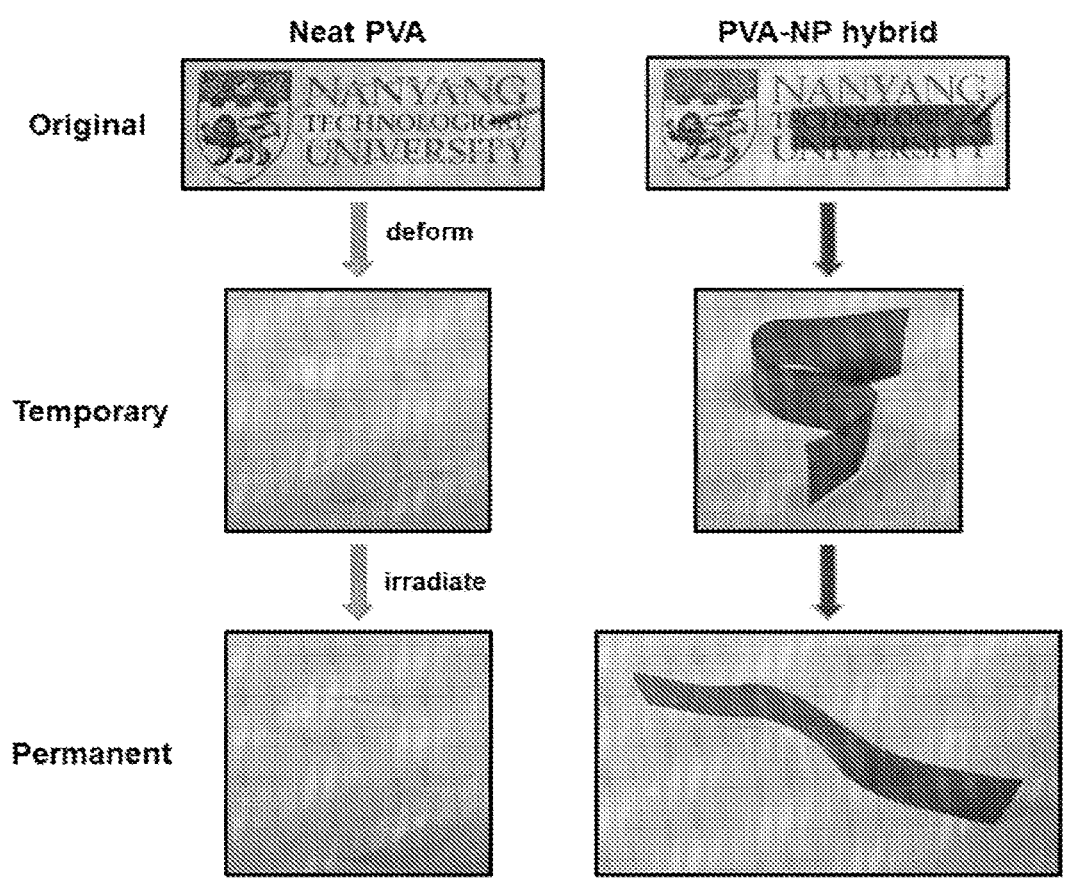
FIG. 25 shows photos illustrating the shape memory behavior of the reference film, i.e. neat polyvinyl alcohol (PVA) film, and the composite film, i.e. polyvinyl alcohol (PVA)-nanoparticles (NP) film, according to various embodiments.

The PVA films of 40×10 mm are placed on a heating stage at 90° C. and are folded into a 'S' shape before cooling it down at room temperature in order to induce the temporary fixated shape. The films are then irradiated with a xenon arc lamp at 2 sun intensity in order to induce temperature rise. Upon exposing the films to solar irradiation for 3 mins, only the PVA-ATO hybrid films are observed to exhibit an almost full shape recovery process, as evident from FIG. 25. FIG. 25 shows photos illustrating the shape memory behavior of the reference film, i.e. neat polyvinyl alcohol (PVA) film, and the composite film, i.e. polyvinyl alcohol (PVA)-nanoparticles (NP) film, according to various embodiments.

6 wt % of NPs in PVA and neat PVA films of 100 µm thickness are prepared using a film applicator and both films are heated up to 85° C. and bent to desired shape before cooling down to room temperature to fix temporary shape. Upon xenon lamp irradiation at 2 sun intensity for 3 mins, the PVA-ATO hybrid film shows a near complete recovery state. No significant changes have been observed for the neat PVA film under the same irradiation condition.

These observations may be attributed to the enhanced temperature rise due to the addition of IR absorbing ATO particles.

Similarly, the addition of such IR absorbing semiconducting oxide or transparent conducting oxide particles to other thermoresponsive mechanical systems such as actuators may also form composite structures or films which may be activated by photothermal means.

FIG. 26 shows a table 2600 illustrating non-limiting examples of thermomechanical systems according to various embodiments. The thermomechanical systems may be for instance shape memory polymers (SMPs) such as polyurethane, polyvinyl alcohol, polyimide, poly(ε-caprolactone), or poly(ethylene-co-vinyl-acetate), or polymeric actuator materials such as volume phase transition hydrogels (e.g. poly(N-isopropylacryamide)), liquid crystal elastomers (e.g. polymethylhydrosiloxane, (4-methoxyphenyl-4-(1-buteneoxy)benzoate), or biopolymers (e.g. elastin like polypeptides (ELPs)).

Various embodiments may also relate to composite films or structures including metal oxide semiconductor and various thermally responsive materials or systems. Various embodiments may relate to a composite in which the metal oxide semiconductor provides photothermal driving or tuning to the various thermally responsive materials or systems. Various thermally responsive systems may include a first material (material A) and a second material (material B) with or without other additives.

In various embodiments, the first material may be cross-linked or non-crosslinked polymers, copolymers, interpenetrating networks (IPNs), semi-IPNs, including poly ionic liquids (PIL).

In various embodiments, the second material may be a solvent (e.g. water, organic solvent, or ionic liquid), small molecular compounds, oligomers, polymers, or copolymers.

FIGS. 27A-J provide some exemplary systems which may be included in the matrix of a composite film or structure.

FIG. 27A is a table 2700a showing non-limiting examples of thermotropic (lower critical solution temperature or LCST) polymer gel systems, including hydrogels, which may be included in the matrix of a composite film according to various embodiments. For instance, for synthetic systems, the first material, i.e. polymer A, may be vinyl or acrylic polymers (e.g. polyvinylmethylether, polyvinylalcohol, poly (N-isopropylacrylamide), poly (N-vinylcaprolactames), poly-2-isopropyl-2-oxazoline, polymethyl-2-acetamidoacrylate), polyethers (e.g. polyalkoxide (ethyleneoxide/propyleneoxide)—Pluronic®, polyglycidols), or others (e.g. polyethyleneglycol). For biopolymer systems, polymer A may be a cellulose, e.g. hydroxypropylcellulose. The second material may be a solvent, e.g. an aqueous solvent, a non-aqueous solvent, an ionic liquid, or a multi-component solvent system.

FIG. 27B is a table 2700b showing non-limiting examples of thermotropic (lower critical solution temperature or LCST) polymer blends according to various embodiments. For acrylate based polymer blends, the first material may be a polymer (Polymer (A)) such as polymethylmethacrylate or polyisobutylmethacrylate, and the second material may be a polymer (Polymer (B)) such as chlorinated rubber. For styrene based polymer blends, the first material may be a polymer (Polymer (A)) such as poly(styrene-hydroxyethylmethacrylate), and the second material may be a polymer (Polymer (B)) such as polypropyleneoxide.

FIG. 27C is a table 2700c showing non-limiting examples of thermotropic (lower critical solution temperature or LCST) polymer systems with fixed domains according to various embodiments. In one example of an amorphous thermoplastic polymer system, the first material may be a polymer (Polymer (A)) such as copolyesters while the second material may be a compound (Compound (B)) such as octadecane. In another example of an amorphous thermoplastic polymer system, the first material may be a polymer (Polymer (A)) such as polystyrene while the second material may be compounds (Compounds (B)) such as ester types. For semi-crystalline thermoplastic polymer systems, the first material may be a polymer (Polymer (A)) such as thermoplastic polyamide, while the second material may be compounds (Compounds (B)) such as ester types or poly (Methacrylate-butadiene-styrene). For silicone systems, the first material may be silicone while the second material may be waxy polymers such as $(C_2F_3Cl)_x$. For thermoset systems, the first material may be a polyester, while the second material may be an ester type. For peroxide curable resins, the first material may be epoxy, while the second material may be eiosane. For ultraviolet (UV) curable resins, the first material may be polyesteracrylate, while the second material may be eicosane.

FIG. 27D is a table 2700d showing non-limiting examples of atypical thermotropic (lower critical solution temperature or LCST) systems according to various embodiments. In one example of a core-shell system, the first material (i.e. shell material) may be poly (N-isopropylacrylamide), while the second material (i.e. core material) may be, for example, polystyrene, PMMA or another suitable particle. In one example of an aggregation system, the first material may be Pluronic®, while the second material may be sodium dodecyl sulfate. In one example of a salt solution, the first material may be an inorganic salt, while the second material may be a solvent.

FIG. 27E is a table 2700e showing non-limiting examples of thermotropic (lower critical solution temperature or LCST) ionic liquid or poly ionic liquid and solvent systems according to various embodiments. In an example of an ionic liquid-solvent system, the first material may be an ionic liquid such as 1-butyl-3-methylimidazolium hexafluorophosphate ($[C_4mim]PF_6$), and the second material may be a solvent such as water-ethanol solution. In another example of an ionic liquid-solvent system, the first material may be an ionic liquid such as tetrabutylphosphonium styrenesulfonate ($[P_{444}][SS]$), and the second material may be a solvent such as water. In yet another example of an ionic liquid-solvent system, the first material may be an ionic liquid such as tetrabutylammonium Bromide ($[N_{4444}]Br$), and the second material may be a solvent such as toluene.

In an example of a homo-poly ionic liquid (PIL)-solvent system, the first material may be a PIL such as poly [(1,8-octanediyl-bis(tri-n-butylphosphonium) 4-styrene sulfonate] [poly (SS-P2)], and the second material may be a solvent such as water. In another example of a homo-poly ionic liquid (PIL)-solvent system, the first material may be a PIL such as poly [2-(vinyloxy)ethyl-1-butylimidazolium chloride] (poly [BuIm][Cl]), and the second material may be a solvent such as chloroform. In yet another example of a homo-poly ionic liquid (PIL)-solvent system, the first material may be a PIL such as poly (benzylbutylimidazolium-chloride) (poly [BBI-Cl], and the second material may be a solvent such as chloroform-ethanol. For copo-PIL system, the first material may be poly (ILBr)-b-PPO-b-poly(ILBr) or poly (NIPAAm)-b-Poly (PVI-Br), and the second material may be water.

FIG. 27F is a table 2700f showing non-limiting examples of thermotropic (lower critical solution temperature or LCST) ionic liquid and polymer systems according to various embodiments. In one example, the first material may be poly benzyl methacrylate (PBnMA), and the second material may be 1-alkyl-3-methylimidazolium bis(trifluoromethane sulfonyl)imide $[Cnmim][NTf_2]$. In another example, the first material may be poly (ethyl glycidyl ether) (PEGE), and the second material may be 1-butyl-2,3-dimethylimidazolium bis(trifluoromethylsulfonyl)imide ($[C4dmim][NTf_2]$). In yet another example, the first material may be poly propylene oxide (PPO), and the second material may be 1-butyl-3-methylimidazolium bis(trifluoromethylsulfonyl)amide $[C4mim][NTf_2]$ FIGS. 27G-I show the specific examples of thermotropic (upper critical solution temperature or UCST) systems with different combinations of materials. Examples of combinations of polymers with non-aqueous solvents, aqueous solvents as well as co-solvents are shown in FIGS. 27G-H. For IL and PIL systems, FIG. 27I shows the combination of polymers with IL, IL and PIL with solvents.

FIG. 27G is a table 2700g showing non-limiting examples of thermotropic (upper critical solution temperature or UCST) polymer systems according to various embodiments. In examples of polymer-alcohol systems, a first material may include a polymer (polymer (A)) such as poly (methyl 4-(2-(acryloyloxy)propanamido) butanoate, poly (1-(benzylamino)-1-oxopropan-2-ylacrylate), polyethylene glycol, or poly ((isobutyl vinyl ether)-r-(2-4,4,5,5,6,6,7,7,8,8,9,9,9-tridecafluorononyloxy) ethyl vinyl ether)), and a second material may include a solvent (Solvent (B) such as ethanol). In other examples of polymer-alcohol systems, a first material may include a polymer (polymer (A)) such as poly [di (ethylene glycol) methyl ether methacrylate] or poly [N-(4-vinyl benzyl)-N,N-dibutylamine, and a second material may include a solvent (Solvent (B)) such as isopropanol.

In examples of polymer-water systems, the first material may be a polymer (Polymer (A)) such as poly (vinyl methyl ether), poly (ethylene-co-vinyl alcohols), poly (hydroxyethylmethacrylate), poly-3-dimethyl(metharyloyloxyethyl) ammonium propane sulfonate, poly (6-acryloyloxymethyluracil), poly (N-acryloylglycinamide), or polyethylene glycol, and a second material may be water.

FIG. 27H is a table 2700h showing further non-limiting examples of thermotropic (upper critical solution temperature or UCST) polymer systems according to various embodiments. In examples of polymer-cosolvent systems, the first material may be a polymer (Polymer (A)) such as poly (N-isopropylacrylamide), poly (methylmethacrylate), poly (methylacrylate-b-polystyrene), poly(2-alkyl/aryl-2-oxazoline), poly (acetoacetoxyethyl methacrylate), or poly (N-alkyl-2-cyanohex-4-enamide), and a second material may be a co-solvent (Solvent (B)) such as ethanol-water. In another example, the first material may be a polymer such as poly [N-(4-vinyl benzyl)-N,N-dibutylamine, and the second material may be a co-solvent such as propanol-water.

FIG. 27I is a table 2700i showing non-limiting examples of thermotropic (upper critical solution temperature or UCST) ionic liquid (IL)/poly ionic liquid (PIL) systems according to various embodiments. A exemplary polymer-IL system may include a polymer such as poly (N-isopropylacrylamide), and an ionic liquid such as 1-Ethyl-3-methylimidazolium bis(trifluoromethylsulfonyl)imide [C2mim] [NTf2]. In examples of IL-solvent systems, the first material may include an ionic liquid such as betaine bis-(triflimide) [Bet][Tf2N] or tetra-n-butylphosphonium fumarate [P444] [Fum], and the second material may be water. In another example of IL-solvent systems, the first material may be an ionic liquid such as 1-butyl-3-methylimidazolium bis(trifluoromethylsulfonyl)imide [C4mim][NTf2], and the second material may be chloroform. In yet another example of IL-solvent systems, the first material may be an ionic liquid such as 1-decyl-3-methylimidazolium bis(trifluoromethylsulfonyl)imide [C10mim][NTf2], and the second material may be benzene. In examples of PIL-solvent systems, the first material may be a poly ionic liquid such as poly (N-acryloylasparaginamide) or poly (acrylamide-co-acrylonitrile), and the second material may be water. In another example of PIL-solvent systems, the first material may be a poly ionic liquid such as poly [2-(vinyloxy)ethyl-4-methylpyridinium chloride] [poly ([MePy][Cl])], and the second material may be chloroform-methanol.

FIG. 27J is a table 2700j showing non-limiting examples of thermotropic liquid crystal systems according to various embodiments. Nematic (opaque-transparent) liquid crystal systems may include para-azoxyanisole, N-(p-methoxybenzylidene)-p'-butylaniline, p-pentyl-p'-cyanobiphenyl (5-CB), p-pentylphenyl-trans-p'-pentylcyclohexylcarboxylate, 4-(4-pentylcyclohexyl)benzonitrile (5-PCH), 4'(hexyloxy)-4-biphenylcarbonitrile (HOBC), or N-(4-ethoxybenzylidene)-4-butylaniline (EBBA). Chiral nematic (thermochromic) liquid crystal systems may include N-(p-ethoxybenzylidene)-p'-(-β-methylbutyl) aniline, cholesteryl myristate, cholesteryl chloride, cholesteryl benzoate, cholesteryl pelargonate, or cholesteryl oleyl carbonate. Sematic liquid crystal systems may include p,p'-dinonylazobenzene, p,p'-diheptyloxyazoxybenzene (HOAB), or terephthalylidene-bis-(p-butylaniline) (TBBA).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A composite film comprising:
   a matrix; and
   one or more nanostructures comprising a metal oxide semiconductor configured to convert radiant energy to thermal energy,
   wherein the matrix comprises poly(N-isopropylacrylamide) hydrogel, the poly(N-isopropylacrylamide) hydrogel having a property which is changeable based on the thermal energy received by the matrix from the metal oxide semiconductor,
   wherein the poly(N-isopropylacrylamide) hydrogel is configured to be switched to a first phase allowing less visible light to pass through in response to the thermal energy received by the poly(N-isopropylacrylamide) hydrogel greater than a predetermined level, and to a second phase allowing more visible light to pass through in response to the thermal energy received by the poly(N-isopropylacrylamide) hydrogel less than the predetermined level, and
   wherein the metal oxide semiconductor is tin oxide with a doping of antimony in an amount from 5 atomic percent to 10 atomic percent.

2. The composite film according to claim 1, wherein the poly(N-isopropylacrylamide) hydrogel is configured to undergo a phase transition based on the thermal energy received by the matrix from the metal oxide semiconductor.

3. The composite film according to claim 1, wherein the one or more nanostructures are embedded in the matrix.

4. The composite film according to claim 1, wherein the one or more nanostructures are coated or laminated onto the matrix.

5. The composite film according to claim 1, wherein the metal oxide semiconductor is configured to convert radiant energy of electromagnetic waves in infrared region.

6. The composite film according to claim 1, wherein the metal oxide semiconductor is configured to convert radiant energy of electromagnetic waves in ultraviolet region.

7. The composite film according to claim 1, wherein the metal oxide semiconductor is configured to convert radiant energy to thermal energy based on a localized surface plasmon resonance effect.

8. The composite film according to claim 1, wherein the composite film is configured to allow at least some visible light to pass through.

9. A device comprising a composite film comprising:
   a matrix; and
   one or more nanostructures comprising a metal oxide semiconductor configured to convert radiant energy to thermal energy;
   wherein the matrix comprises poly(N-isopropylacrylamide) hydrogel, the poly(N-isopropylacrylamide) hydrogel having a property which is changeable based on the thermal energy received by the matrix from the metal oxide semiconductor,
   wherein the poly(N-isopropylacrylamide) hydrogel is configured to be switched to a first phase allowing less visible light to pass through in response to the thermal energy received by the poly(N-isopropylacrylamide) hydrogel greater than a predetermined level, and to a second phase allowing more visible light to pass through in response to the thermal energy received by the poly(N-isopropylacrylamide) hydrogel less than the predetermined level, and
   wherein the metal oxide semiconductor is tin oxide with a doping of antimony in an amount from 5 atomic percent to 10 atomic percent.

10. The device according to claim 9, wherein the device is any one selected from a group consisting of a smart window, a thermochromic device, and a shape memory device.

11. A method of forming a composite film, the method comprising:
   forming a matrix; and
   forming one or more nanostructures comprising a metal oxide semiconductor configured to convert radiant energy to thermal energy;
   wherein the matrix comprises poly(N-isopropylacrylamide) hydrogel, the poly(N-isopropylacrylamide) hydrogel having a property which is changeable based on the thermal energy received by the matrix from the metal oxide semiconductor,
   wherein the poly(N-isopropylacrylamide) hydrogel is configured to be switched to a first phase allowing less visible light to pass through in response to the thermal energy received by the poly(N-isopropylacrylamide) hydrogel greater than a predetermined level, and to a second phase allowing more visible light to pass through in response to the thermal energy received by the poly(N-isopropylacrylamide) hydrogel less than the predetermined level, and wherein the metal oxide semiconductor is tin oxide with a doping of antimony in an amount from 5 atomic percent to 10 atomic percent.

12. The method according to claim 11, further comprising:

dispersing the one or more nanostructures in the matrix.

13. The method according to claim 11, further comprising:

coating or laminating the one or more nanostructures onto the matrix.

14. The method according to claim 11, wherein the poly(N-isopropylacrylamide) hydrogel is formed via free-radical polymerization.

* * * * *